United States Patent
Kazi et al.

(10) Patent No.: US 9,451,025 B2
(45) Date of Patent: Sep. 20, 2016

(54) DISTRIBUTED STORAGE NETWORK WITH ALTERNATIVE FOSTER STORAGE APPROACHES AND METHODS FOR USE THEREWITH

(71) Applicant: CLEVERSAFE, INC., Chicago, IL (US)

(72) Inventors: Asimuddin Kazi, Naperville, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 14/287,401

(22) Filed: May 27, 2014

(65) Prior Publication Data

US 2015/0039936 A1 Feb. 5, 2015

Related U.S. Application Data

(60) Provisional application No. 61/860,456, filed on Jul. 31, 2013.

(51) Int. Cl.

| | |
|---|---|
| G06F 11/00 | (2006.01) |
| H04L 29/08 | (2006.01) |
| G06F 3/06 | (2006.01) |
| G06F 11/10 | (2006.01) |
| G06F 9/48 | (2006.01) |

(Continued)

(52) U.S. Cl.
CPC ......... *H04L 67/1097* (2013.01); *G06F 3/0604* (2013.01); *G06F 3/065* (2013.01); *G06F 3/067* (2013.01); *G06F 3/0619* (2013.01); *G06F 3/0646* (2013.01); *G06F 3/0689* (2013.01); *G06F 9/4881* (2013.01); *G06F 9/5066* (2013.01); *G06F 11/1092* (2013.01); *G06F 17/30067* (2013.01); *G06F 2003/0697* (2013.01); *G06F 2209/5017* (2013.01)

(58) Field of Classification Search
CPC ..................... G06F 11/1088; G06F 11/1092
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Yolanda L Wilson
(74) *Attorney, Agent, or Firm* — Garlick & Markison; Timothy W. Markison

(57) ABSTRACT

A method includes encoding input data into a plurality of slices. The plurality of slices are sent to a plurality of distributed storage and task execution units for storage, the plurality of distributed storage and task execution units being located at a corresponding plurality of sites A storage failure is detected corresponding to at least one of the plurality of slices corresponding to at least one of the plurality of the distributed storage and task execution units and at least one of the corresponding plurality of sites A foster storage approach is determined. At least one alternative distributed storage and task execution unit is selected in accordance with the foster storage approach. At least one foster slice is generated corresponding to the at least one of the plurality of slices. The at least one foster slice is sent to the at least one alternative distributed storage and task execution unit.

17 Claims, 52 Drawing Sheets

(51) Int. Cl.
*G06F 17/30* (2006.01)
*G06F 9/50* (2006.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1* | 4/2007 | Gladwin ............... | G06F 11/1076 711/154 |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0183975 A1* | 7/2008 | Foster ................... | G06F 11/1076 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0029809 A1* | 2/2011 | Dhuse ................... | G06F 11/1076 714/6.1 |
| 2011/0106904 A1* | 5/2011 | Resch ................... | G06F 11/1076 709/207 |
| 2011/0264717 A1* | 10/2011 | Grube ................... | G06F 11/0727 707/827 |
| 2011/0289122 A1* | 11/2011 | Grube ................... | G06F 11/2094 707/812 |
| 2013/0232378 A1* | 9/2013 | Resch ................... | G06F 21/64 714/6.24 |
| 2014/0351625 A1* | 11/2014 | Resch ................... | G06F 11/1076 714/6.2 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Appears in Proceedings of the Ninth International Conference on Architectural Support for Programming Languages and Operating Systems (ASPLOS 2000); Nov. 2000; pp. 1-12.

* cited by examiner

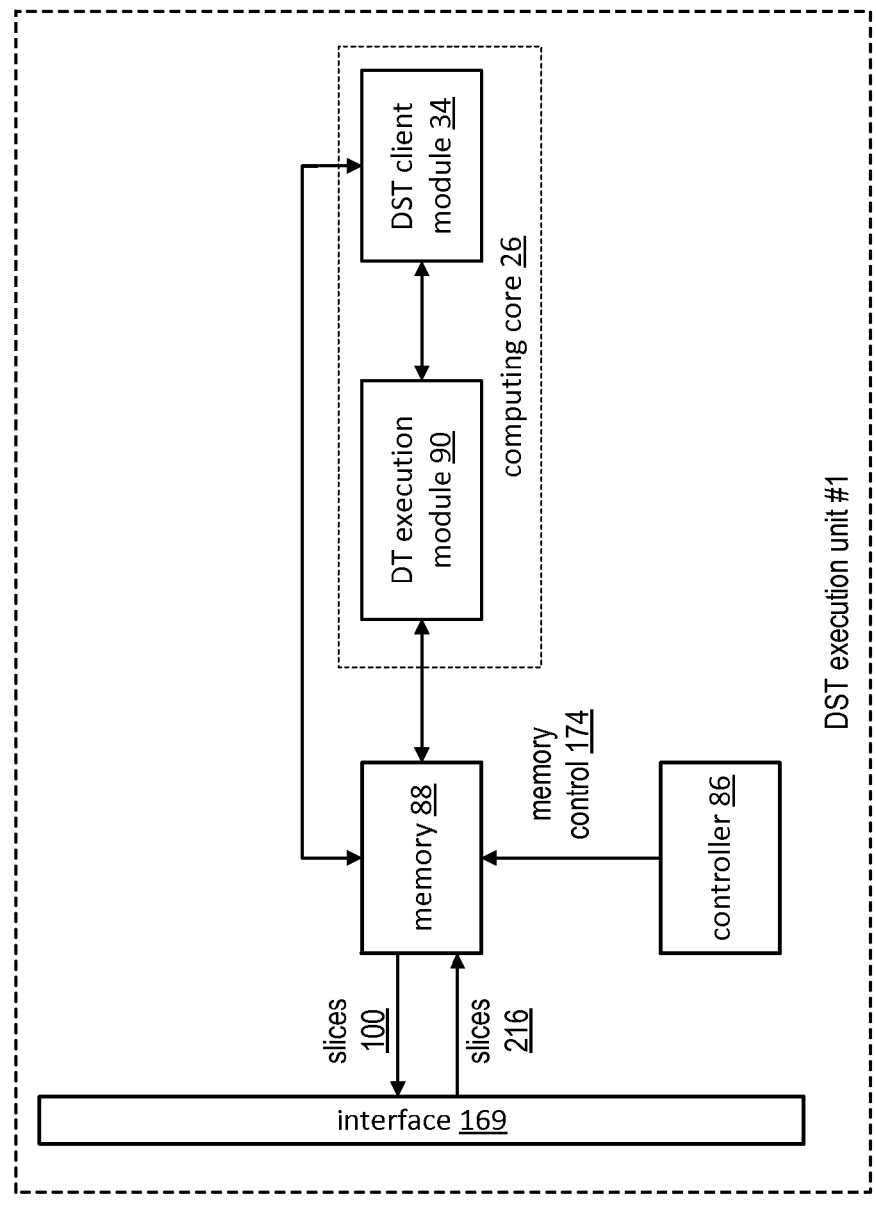
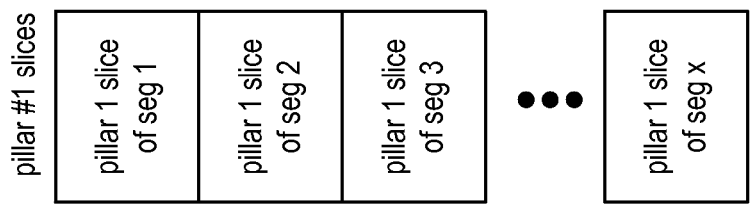
FIG. 24

| DST allocation info 242 | data partition info 320: data ID; No. of partitions; Addr. info for each partition; format conversion indication | | | | | | | |
|---|---|---|---|---|---|---|---|---|
| | task execution info 322 | | | | intermediate result info 324 | | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 2_4, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 2_4, 4_2, & 5_2 | R3-2 | DST unit 5 | DST unit 5 | DST units 5,6, 1-3 |

FIG. 32

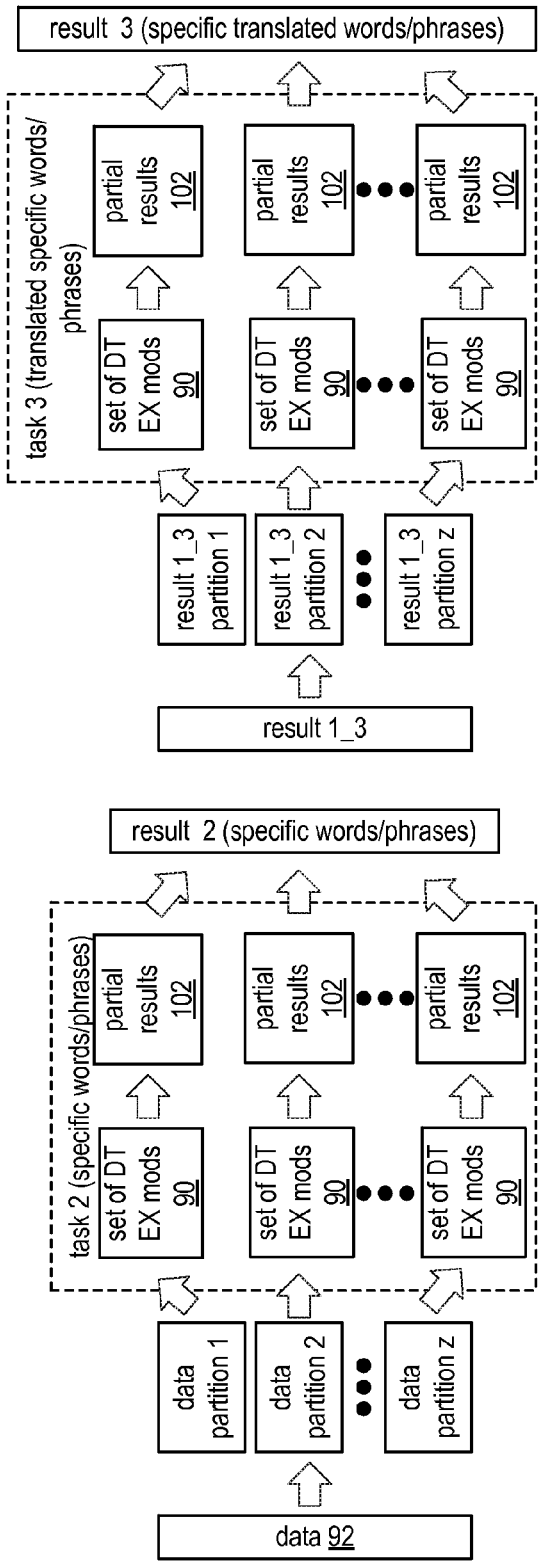
FIG. 38
FIG. 37
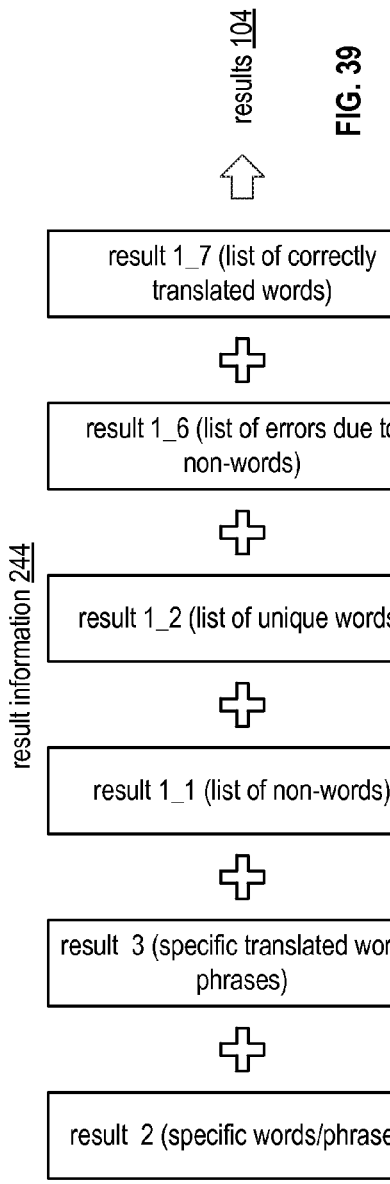
FIG. 39

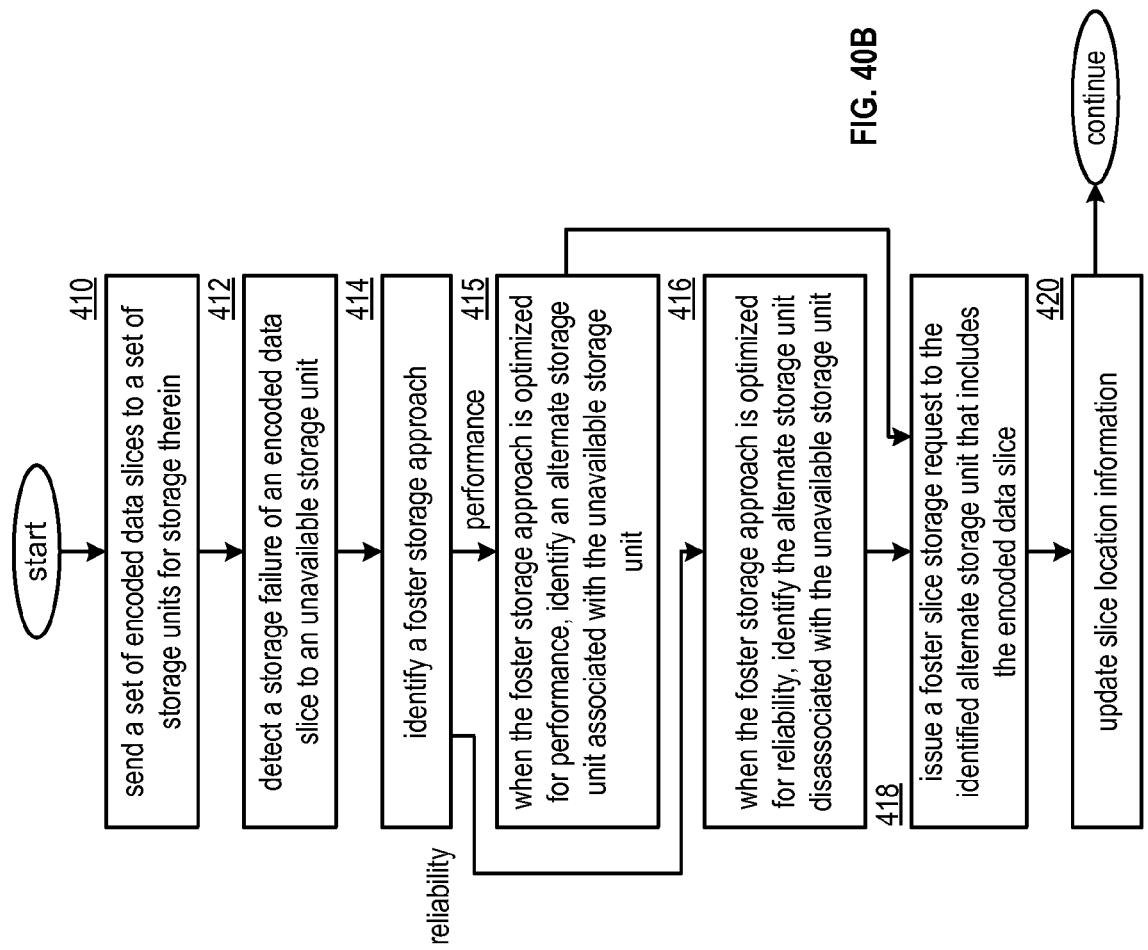

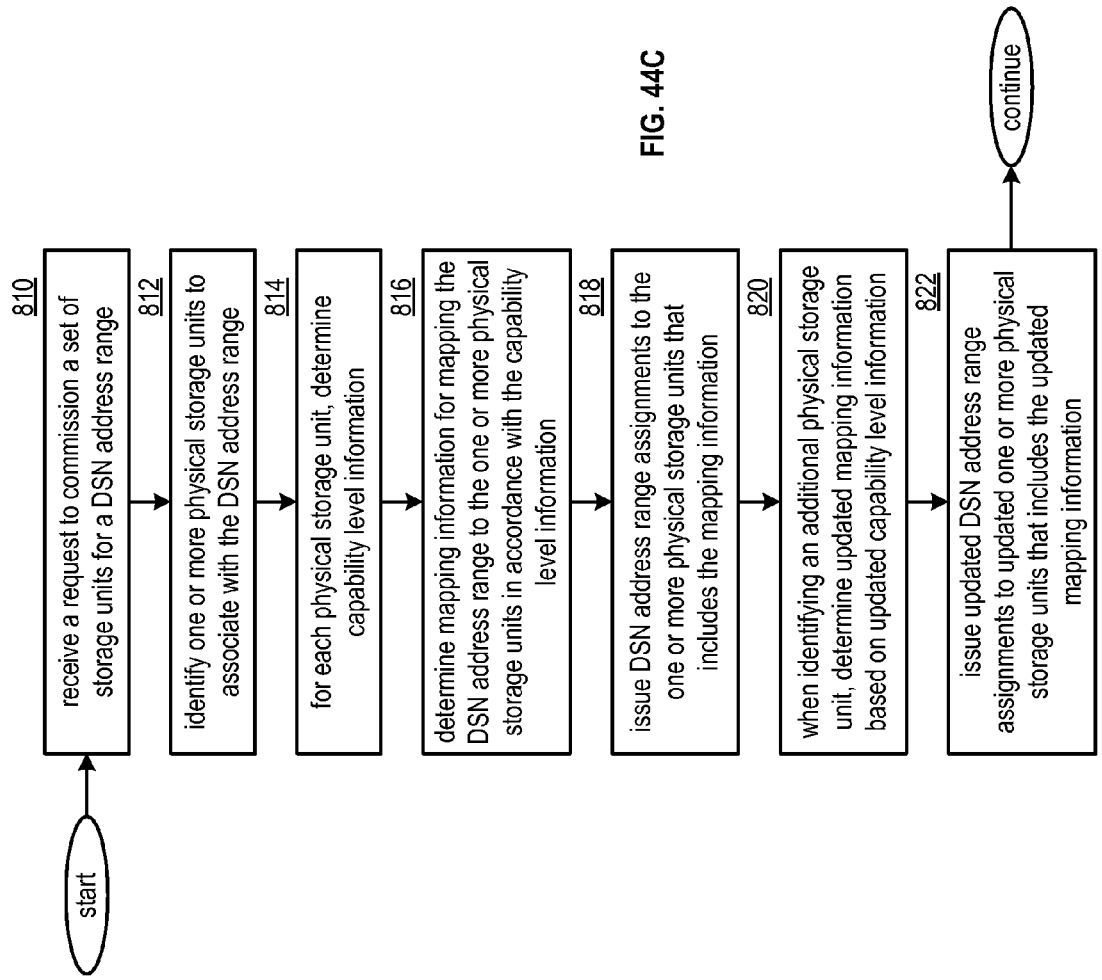

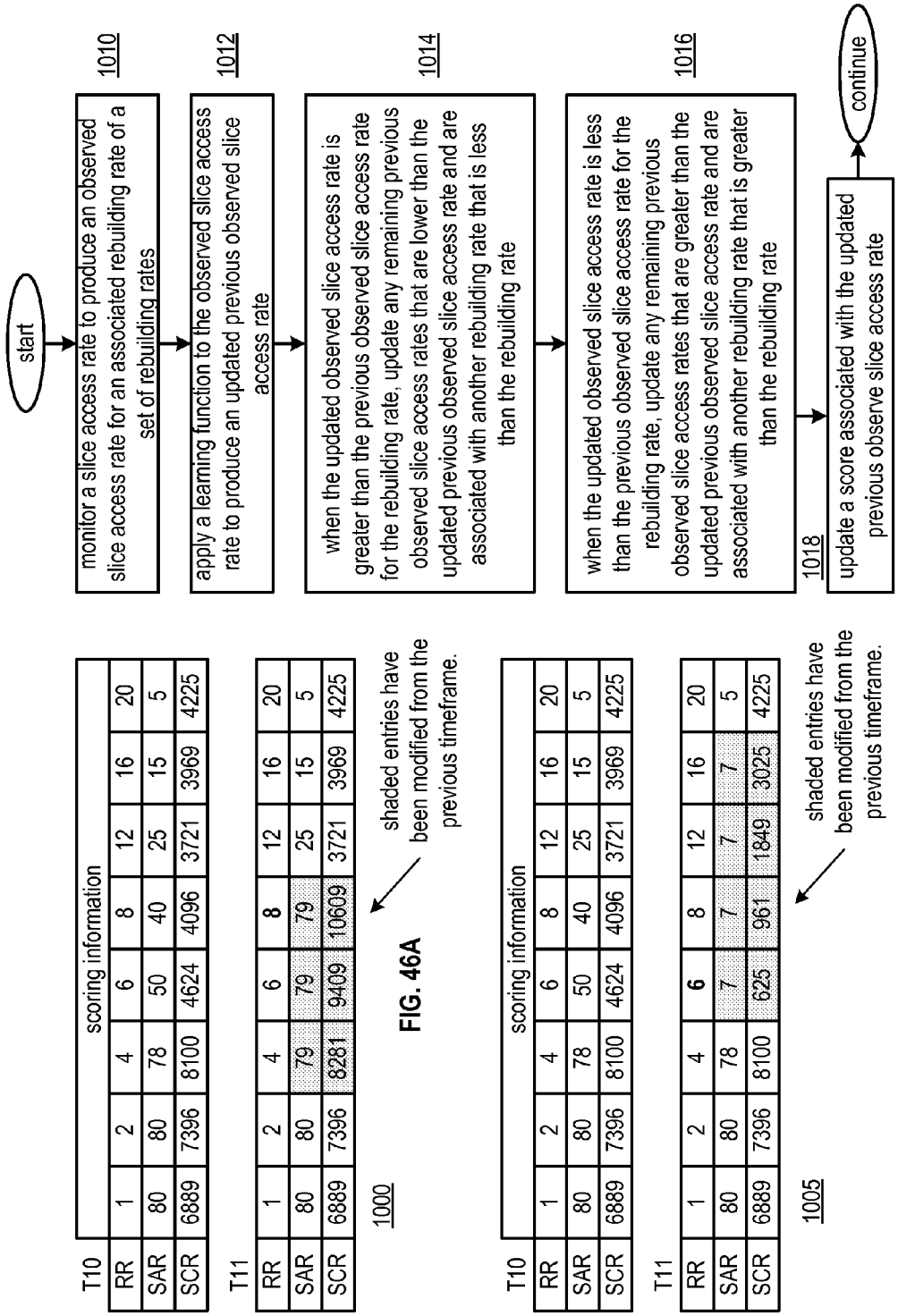

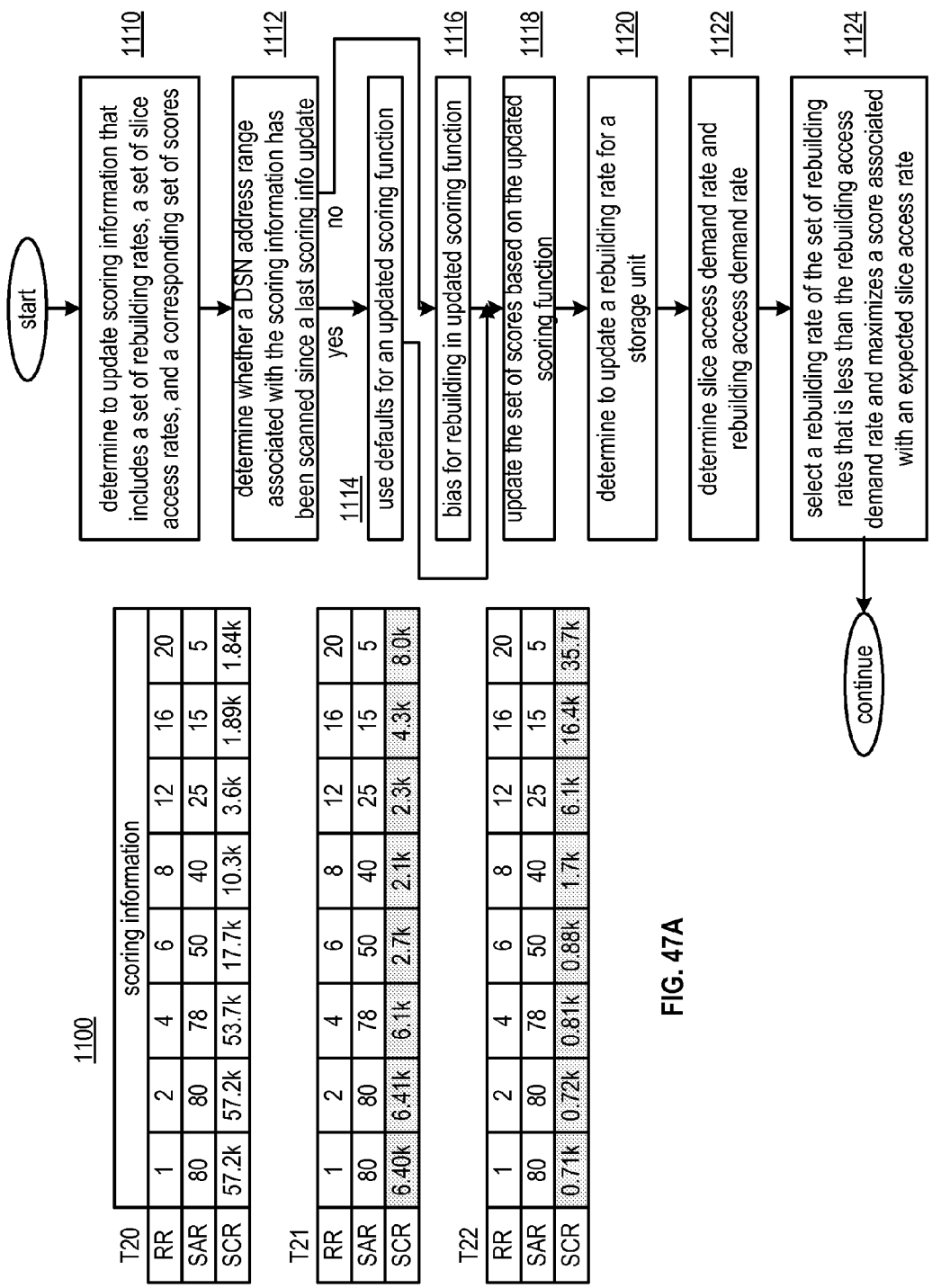

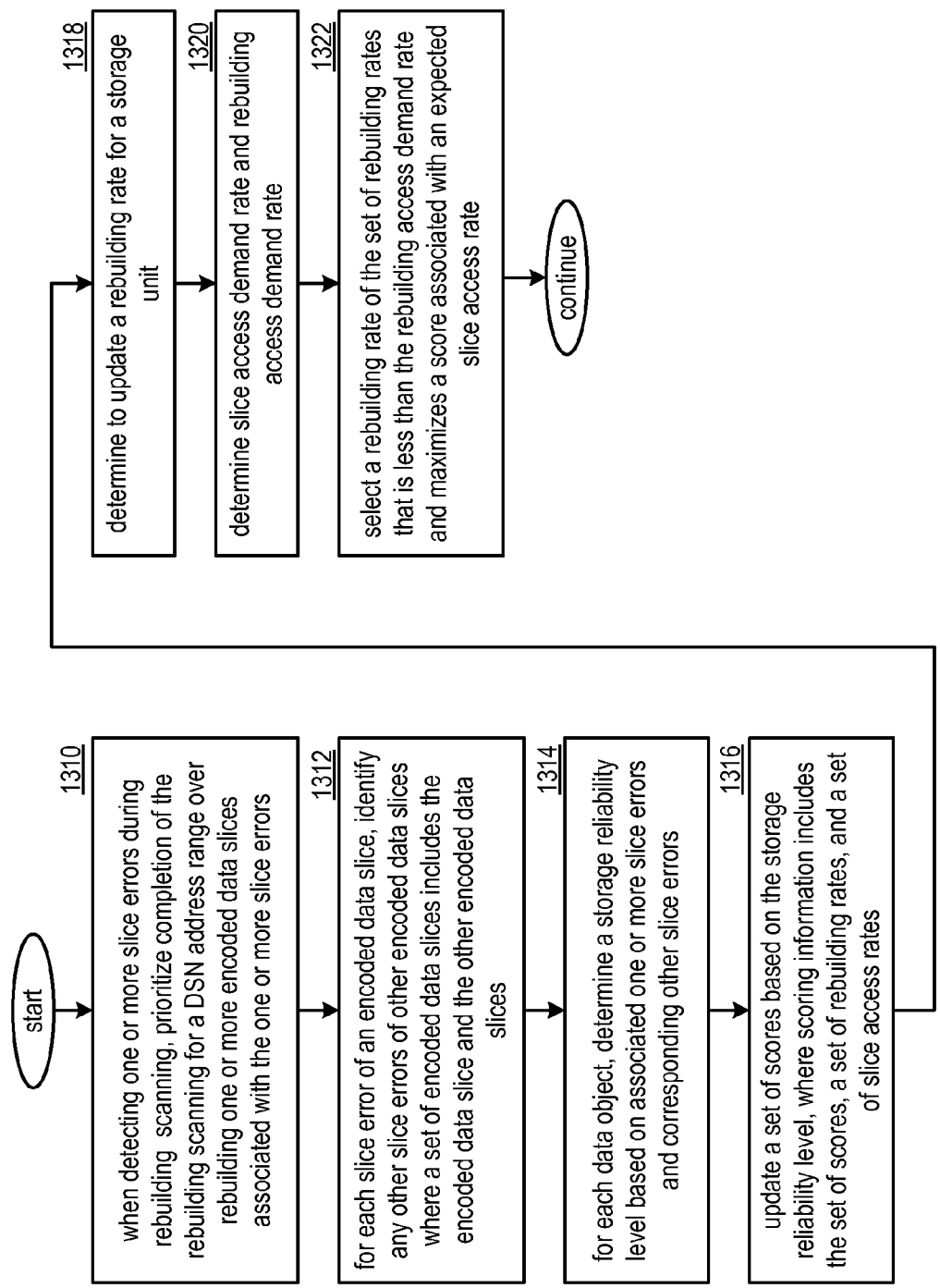

DISTRIBUTED STORAGE NETWORK WITH ALTERNATIVE FOSTER STORAGE APPROACHES AND METHODS FOR USE THEREWITH

CROSS REFERENCE TO RELATED PATENTS

The present U.S. Utility Patent Application claims priority pursuant to 35 U.S.C. §119(e) to U.S. Provisional Application No. 61/860,456, entitled "ESTABLISHING A SLICE REBUILDING RATE IN A DISPERSED STORAGE NETWORK", filed Jul. 31, 2013, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40B is a flowchart illustrating an example of identifying alternate storage in accordance with the present invention;

FIG. 44C is a flowchart illustrating an example of commissioning storage units in accordance with the present invention;

FIG. 46A is a diagram illustrating an example of modifying scoring information in accordance with the present invention;

FIG. 46B is a diagram illustrating another example of modifying scoring information in accordance with the present invention;

FIG. 46C is a flowchart illustrating an example of updating scoring information in accordance with the present invention;

FIG. 47A is a diagram illustrating another example of modifying scoring information in accordance with the present invention;

FIG. 47B is a flowchart illustrating another example of updating scoring information in accordance with the present invention;

FIG. 49 is a flowchart illustrating another example of updating scoring information in accordance with the present invention.

DETAILED DESCRIPTION OF THE INVENTION

Figure 1:
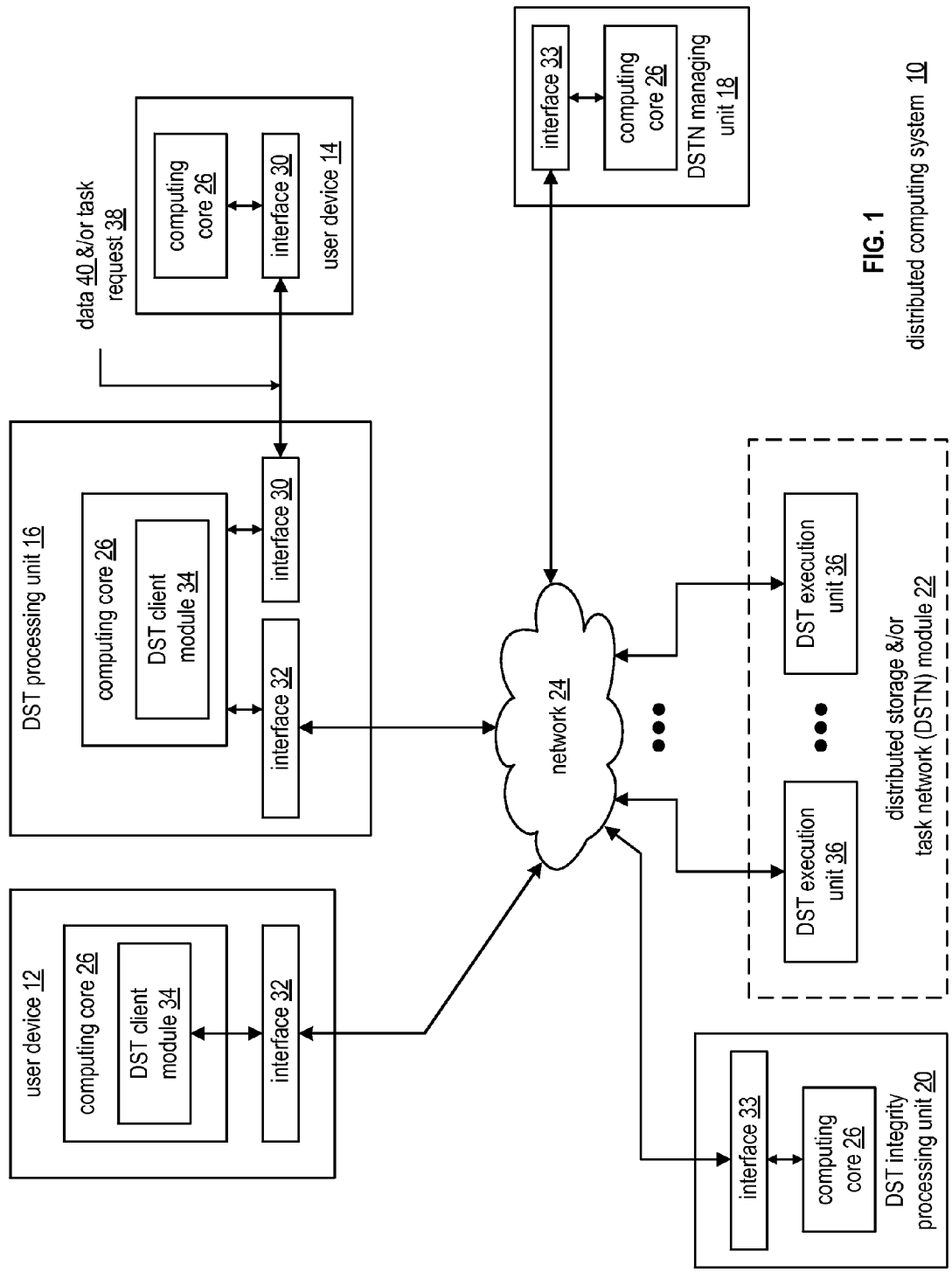
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
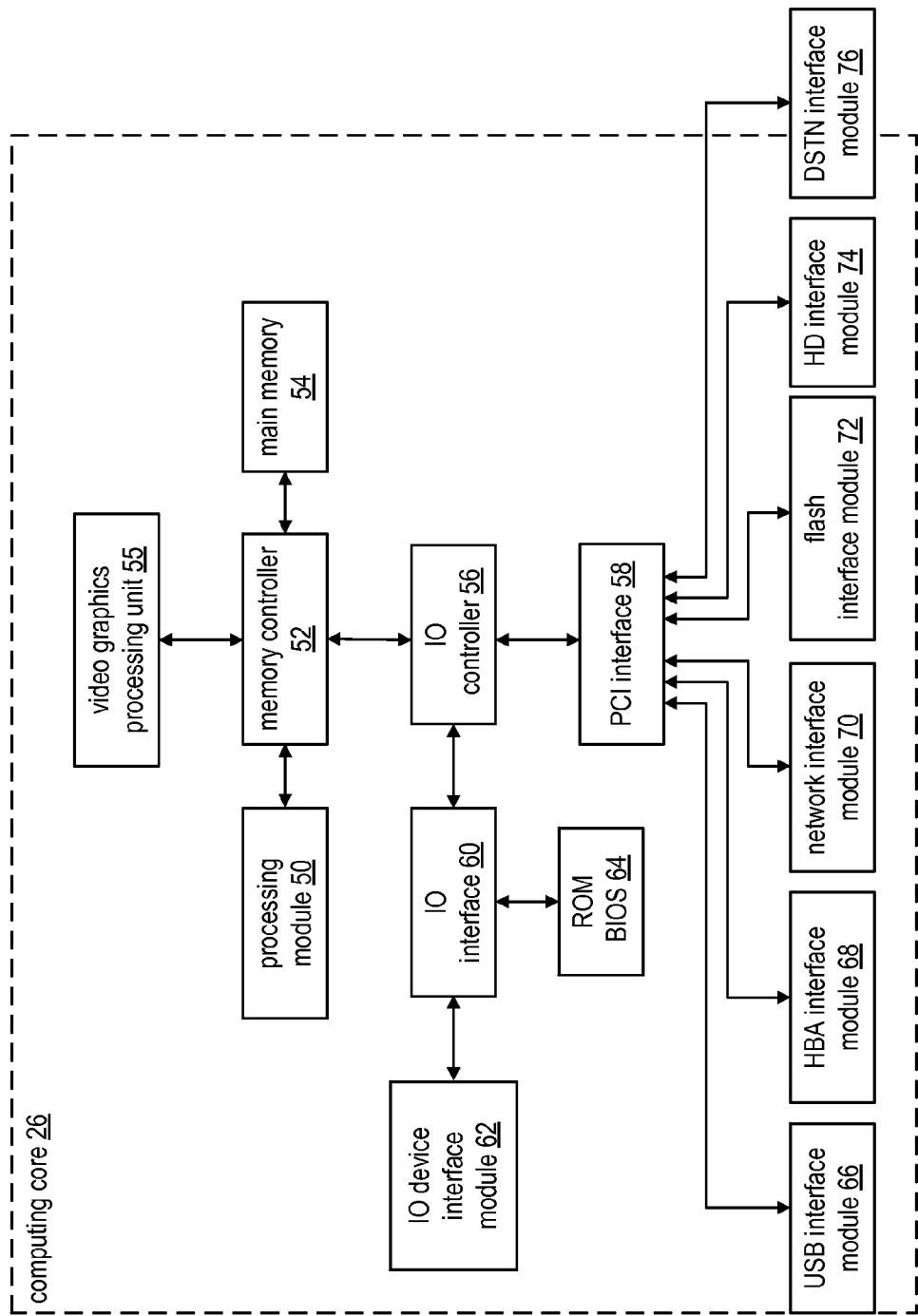
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
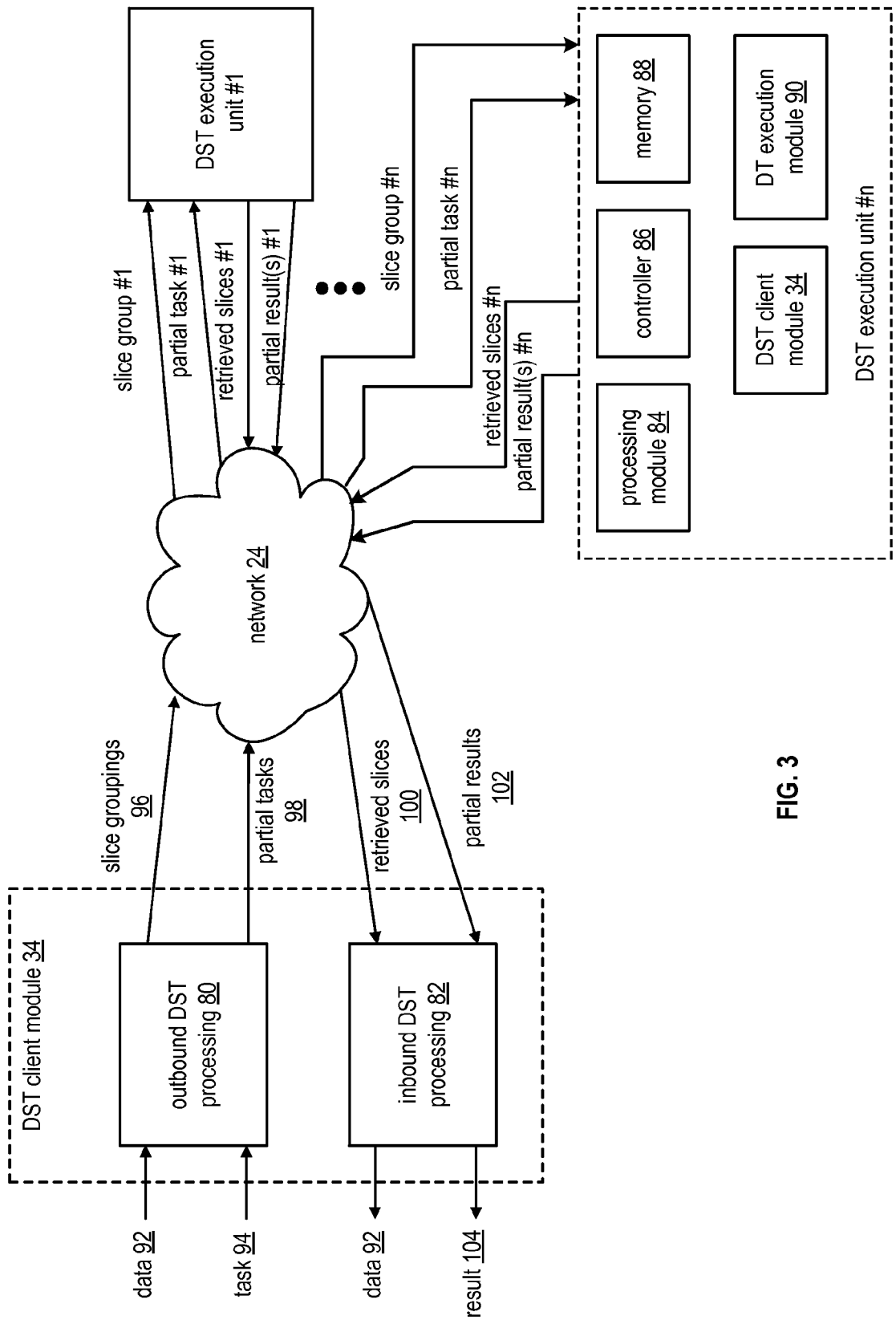
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
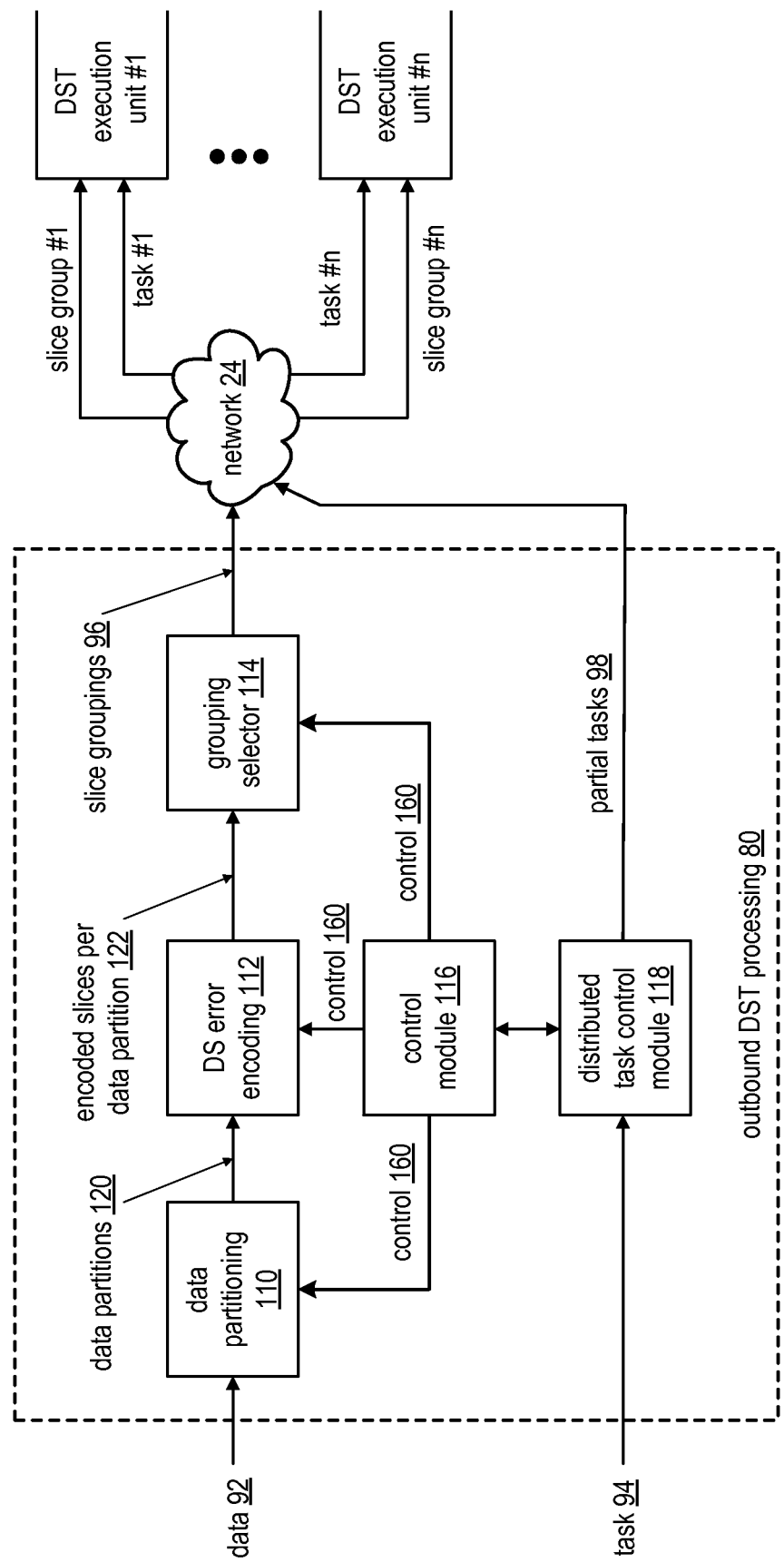
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
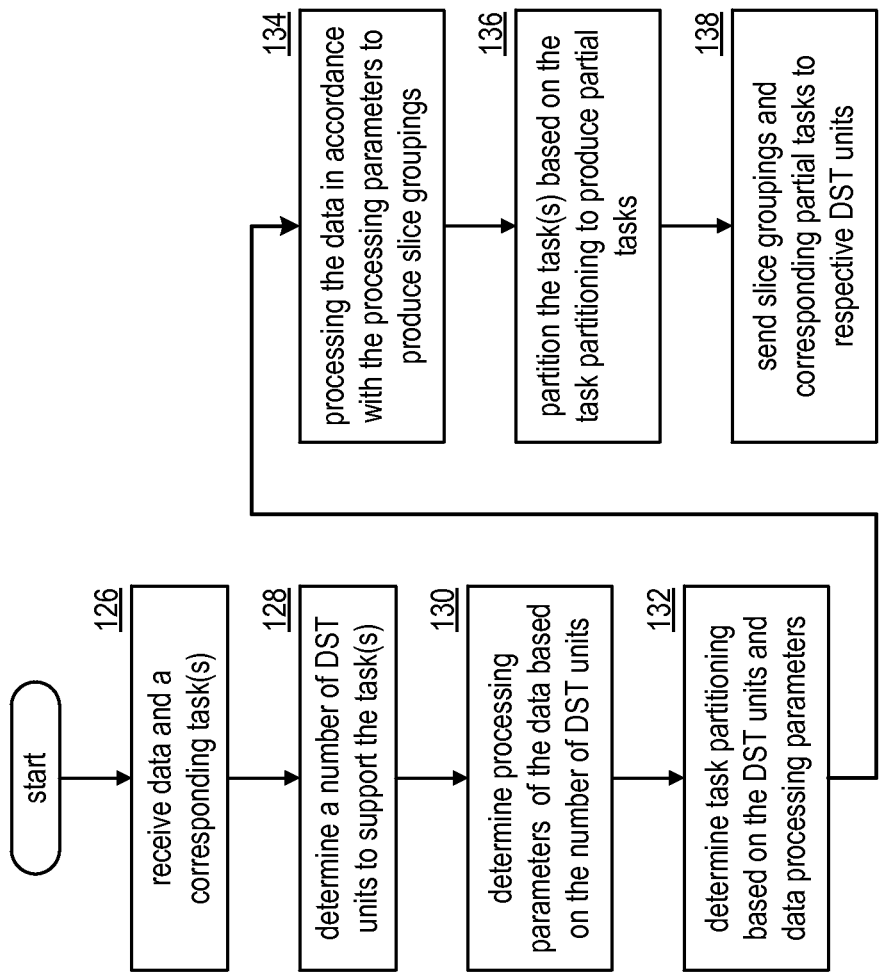
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
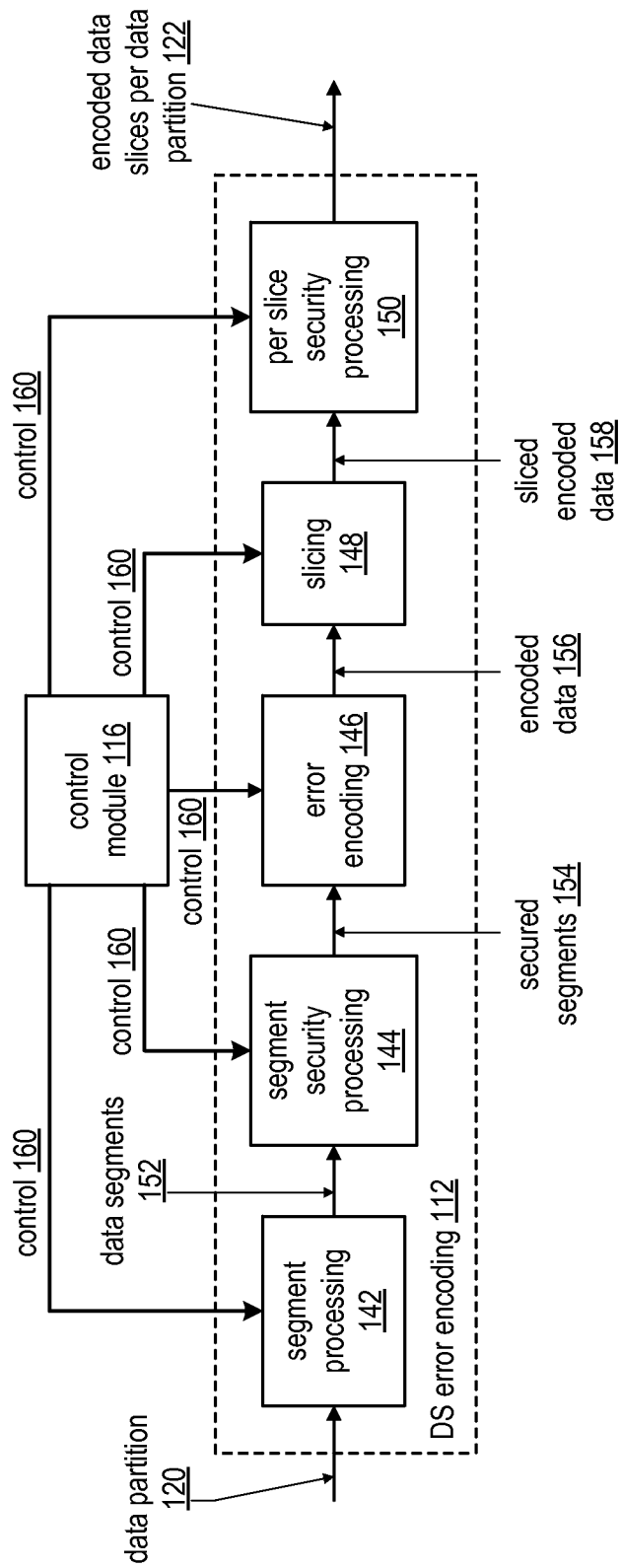
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
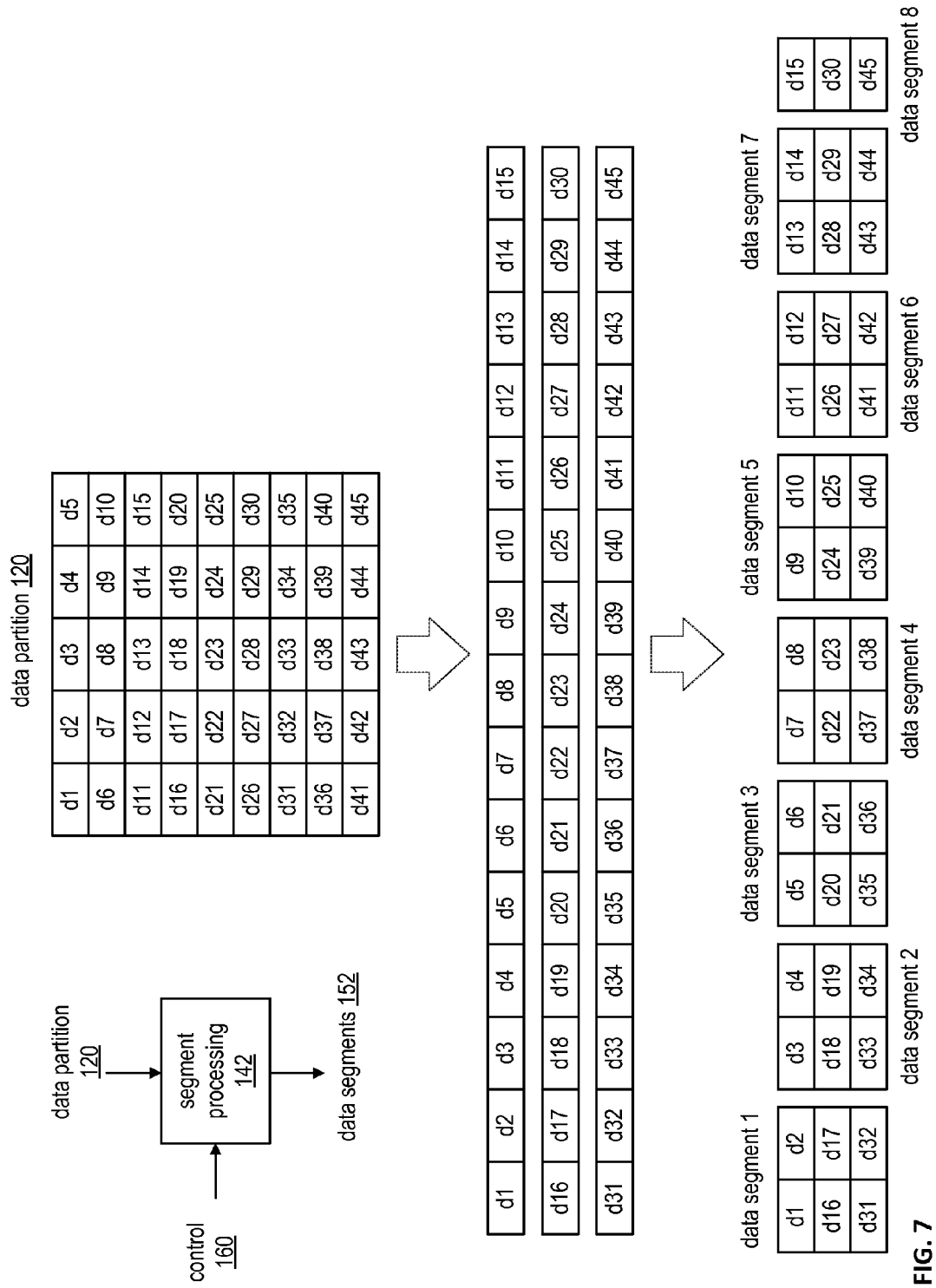
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
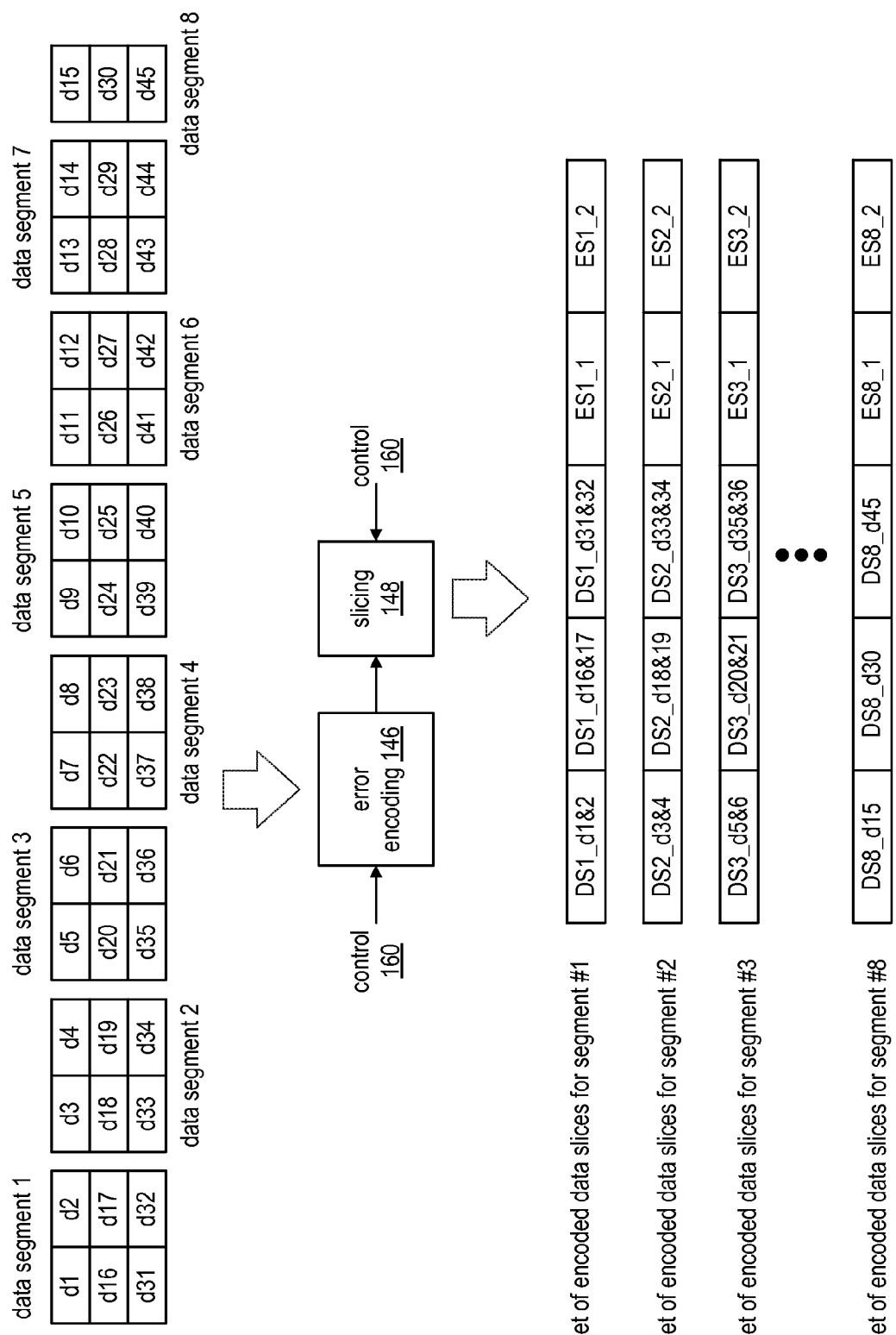
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
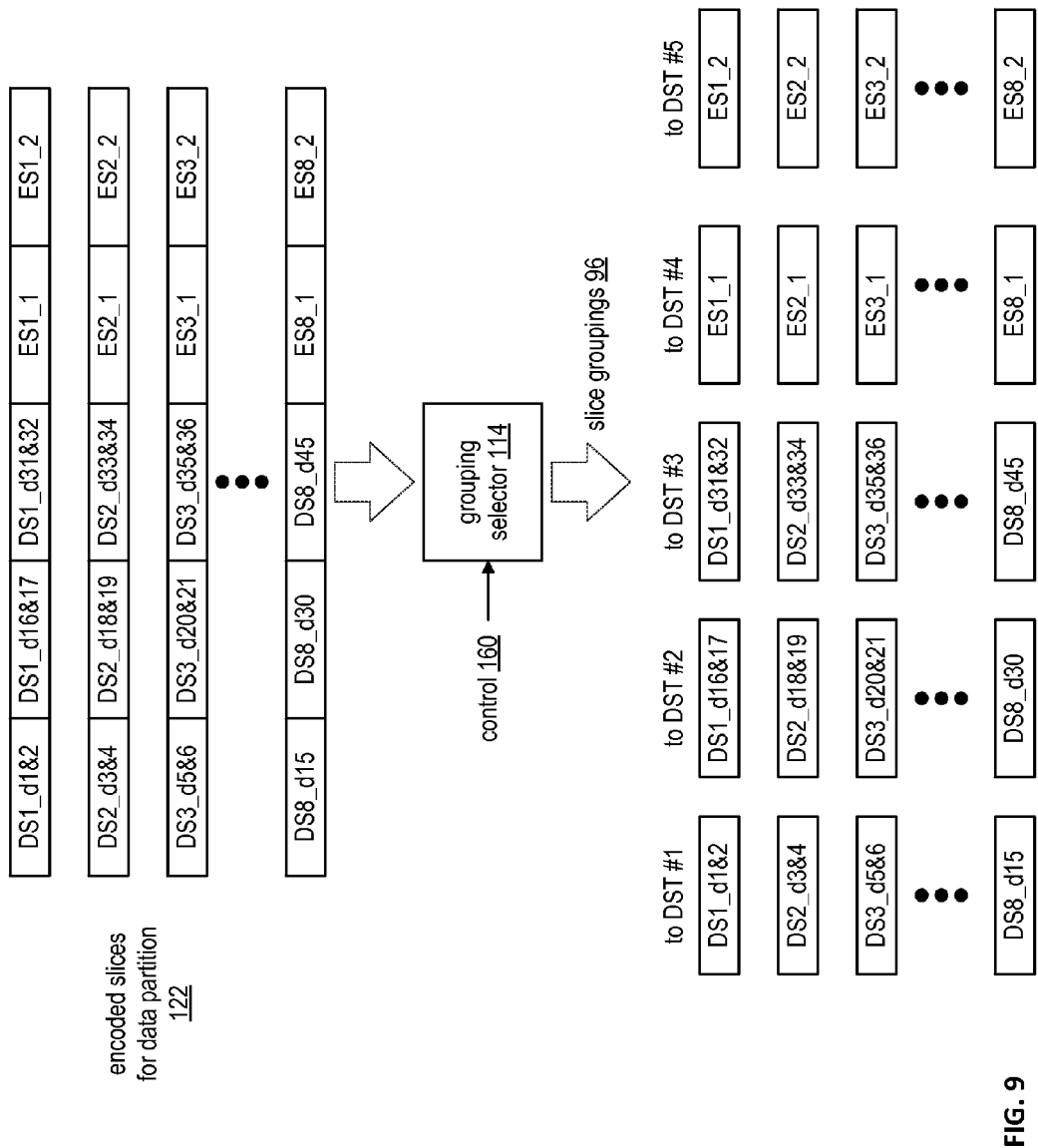
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
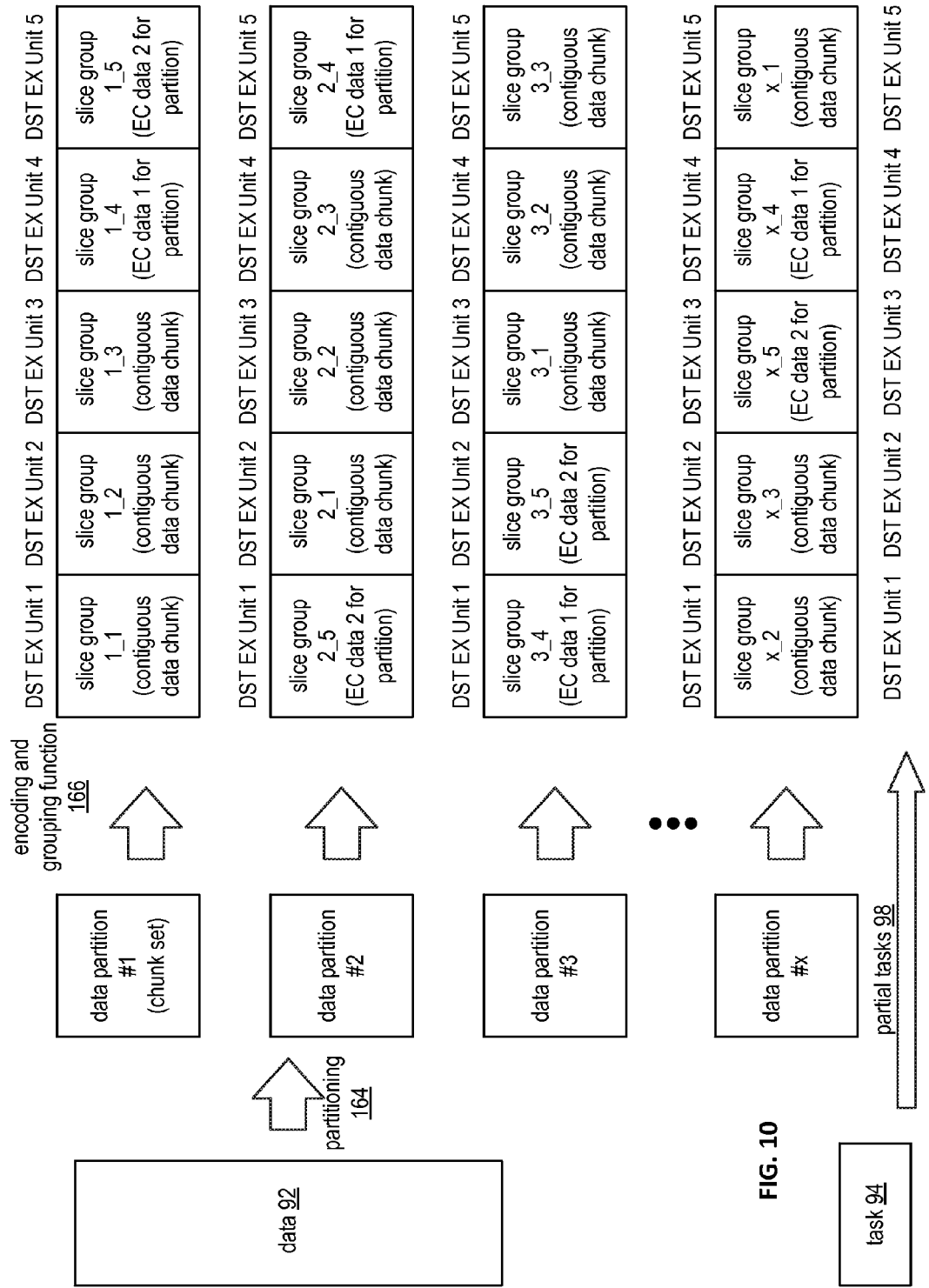
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
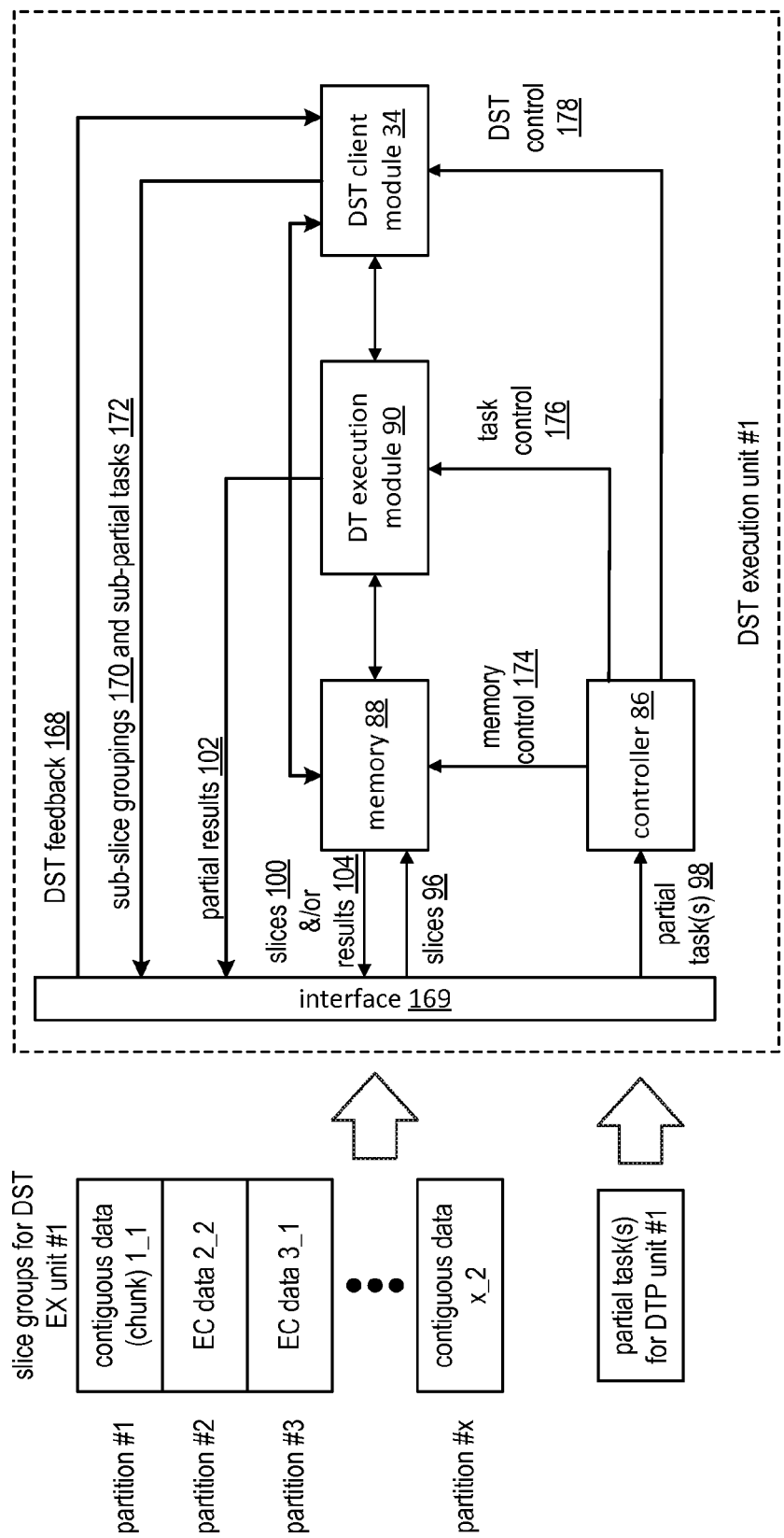
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
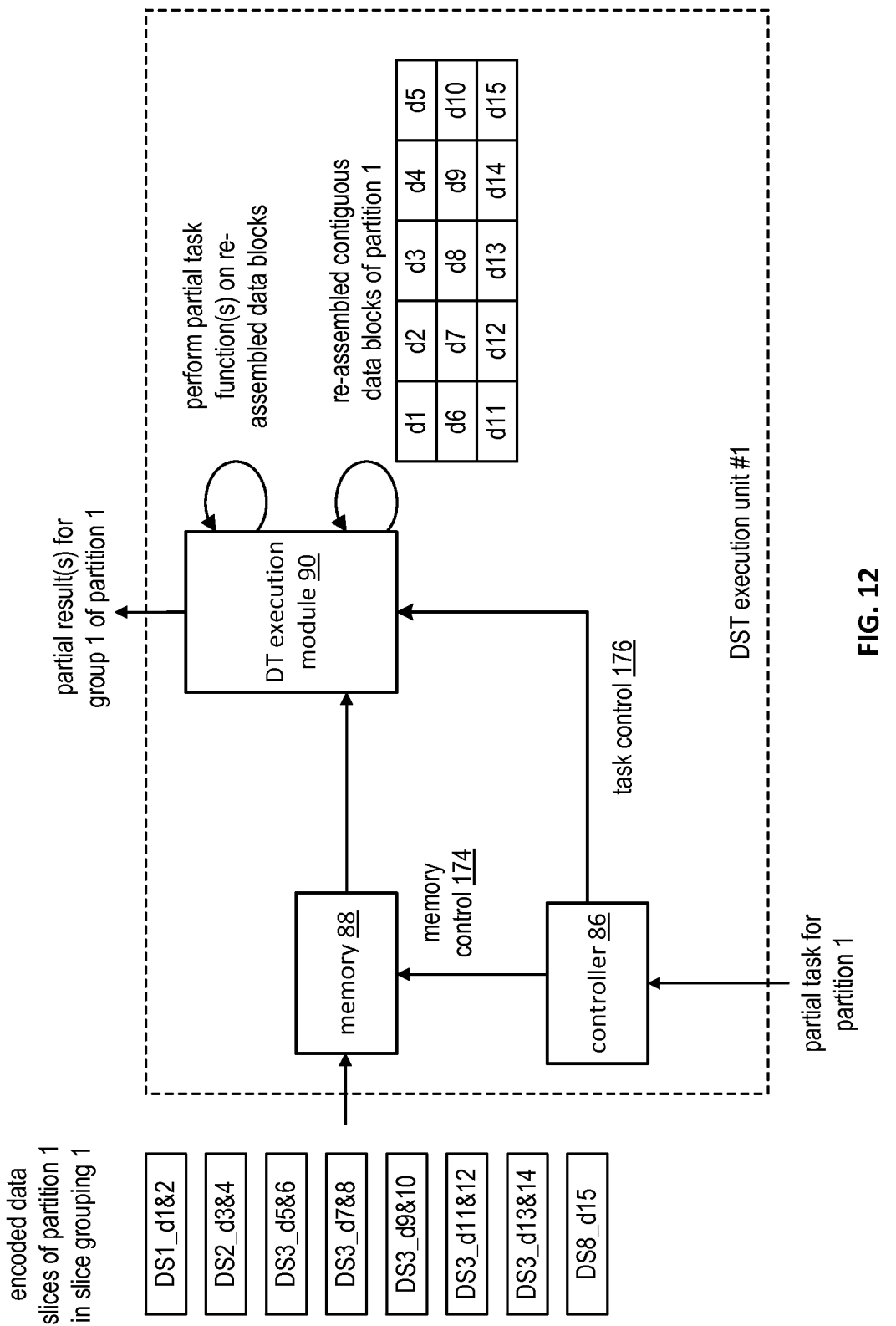
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
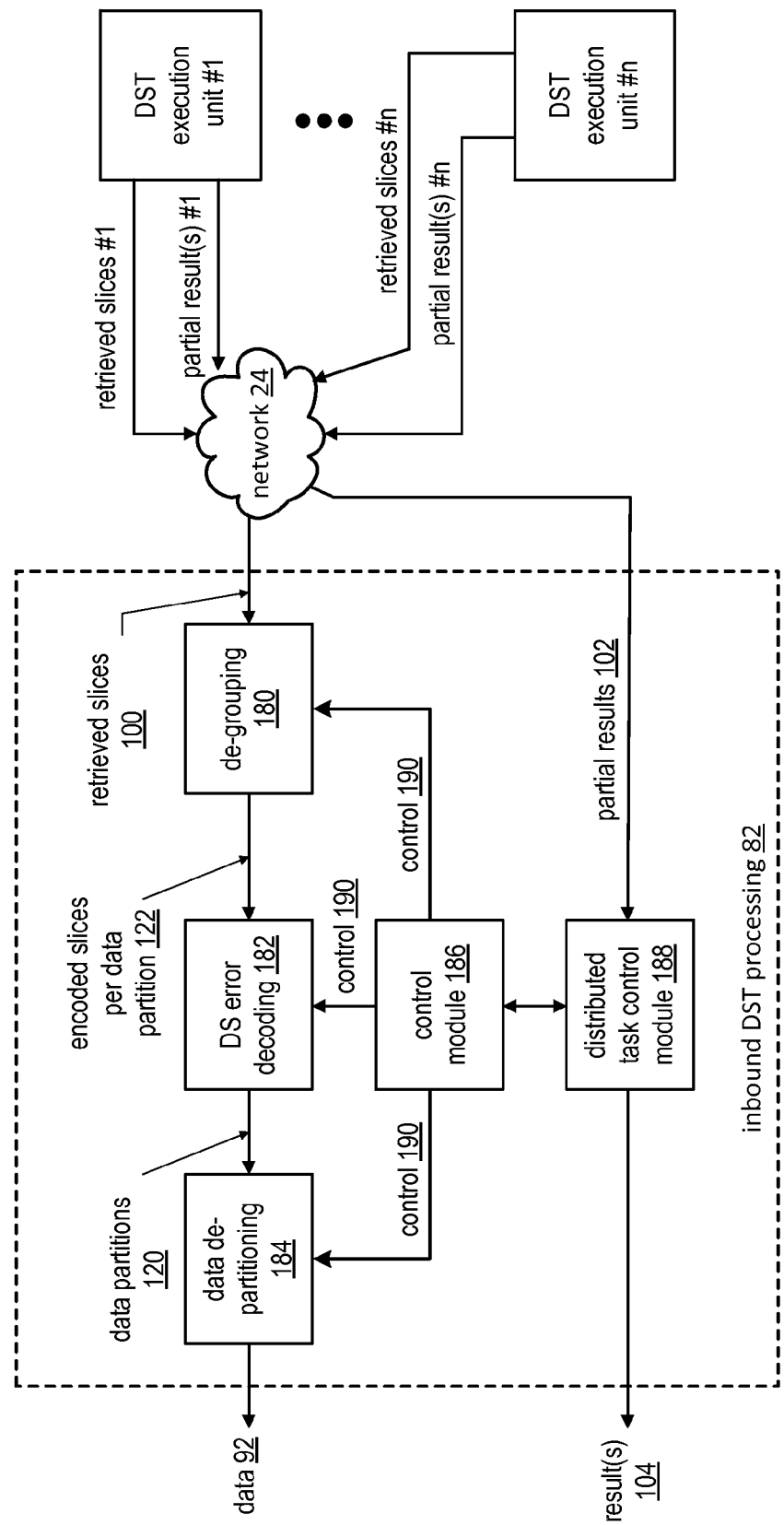
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
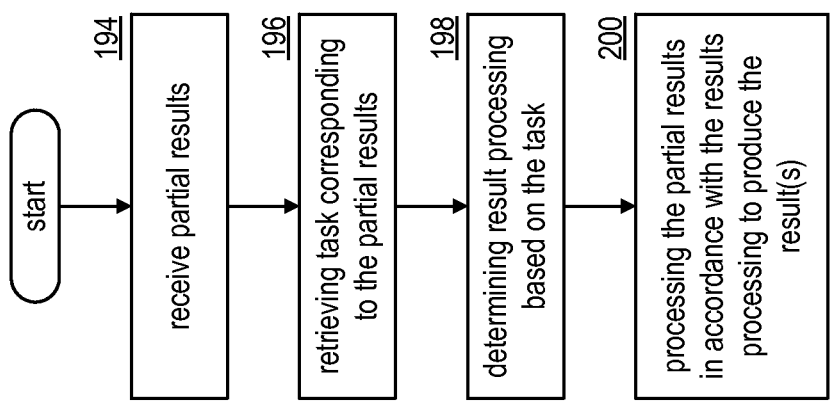
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
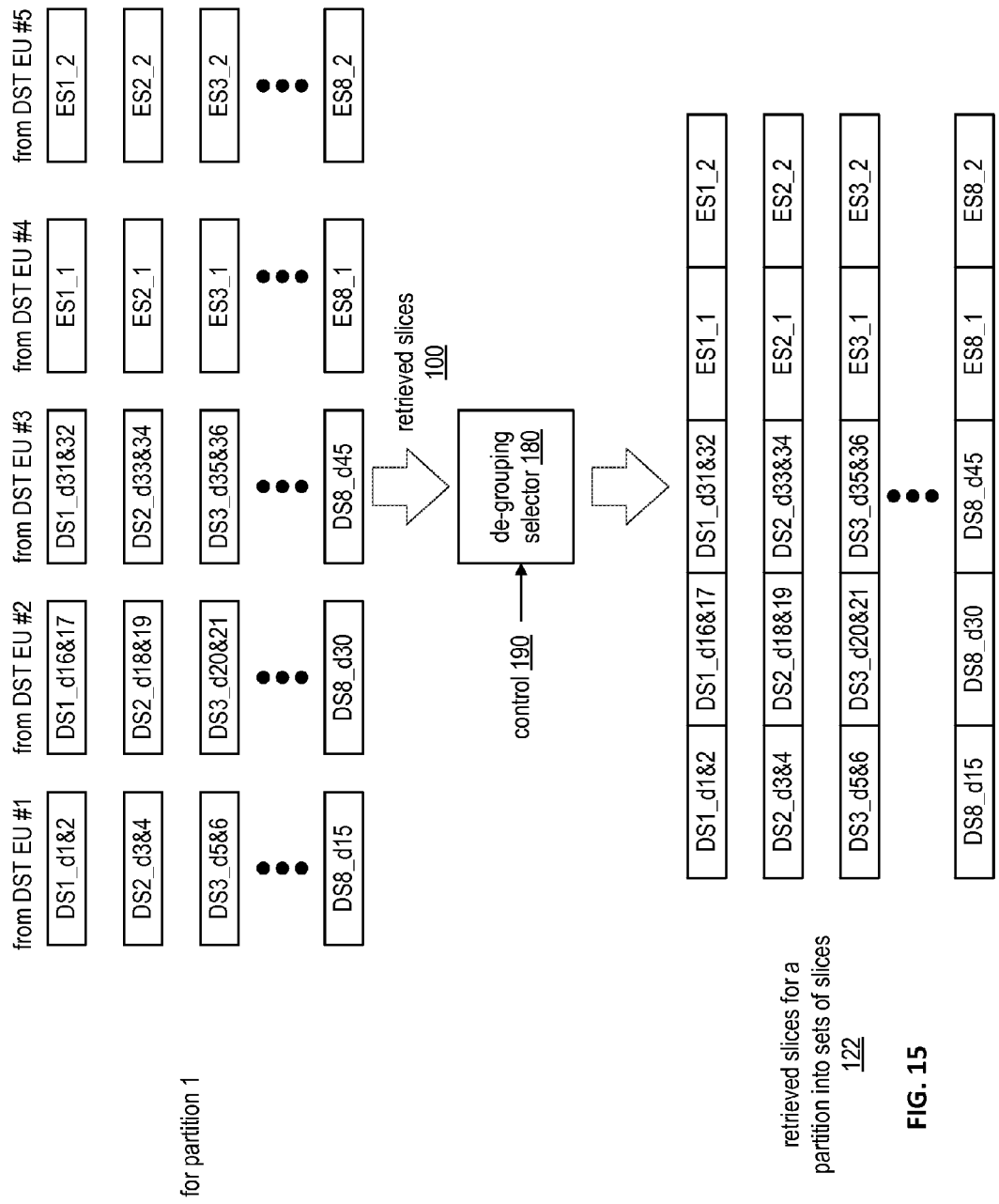
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
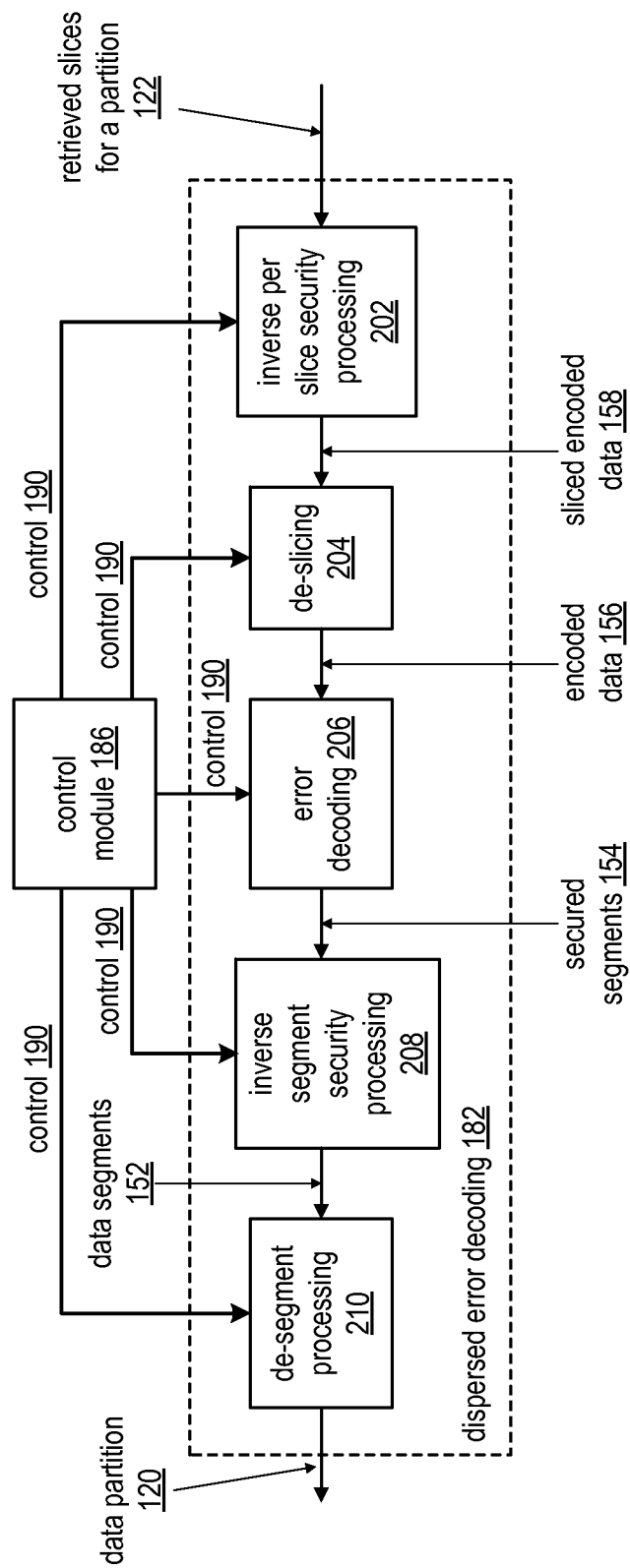
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
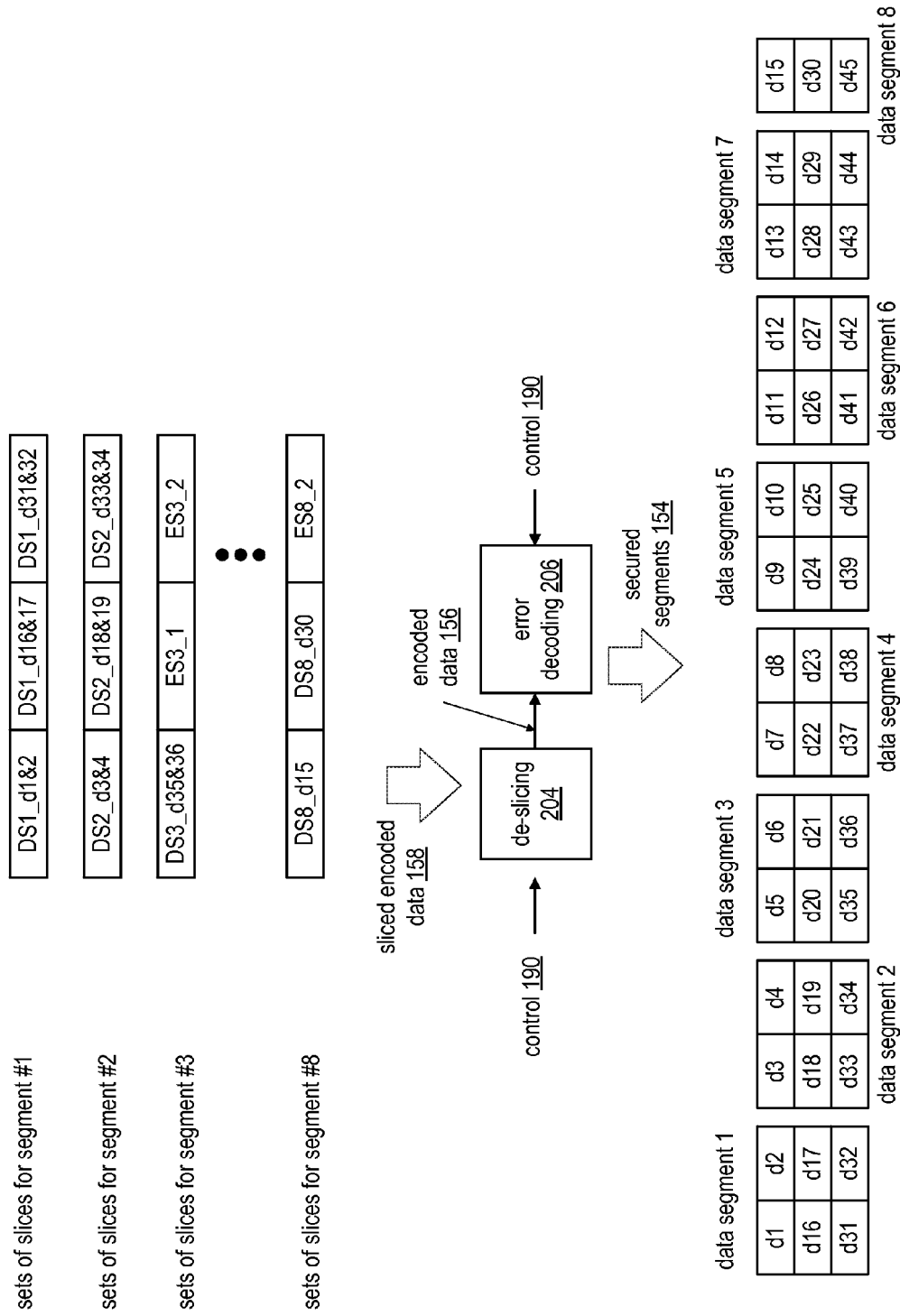
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
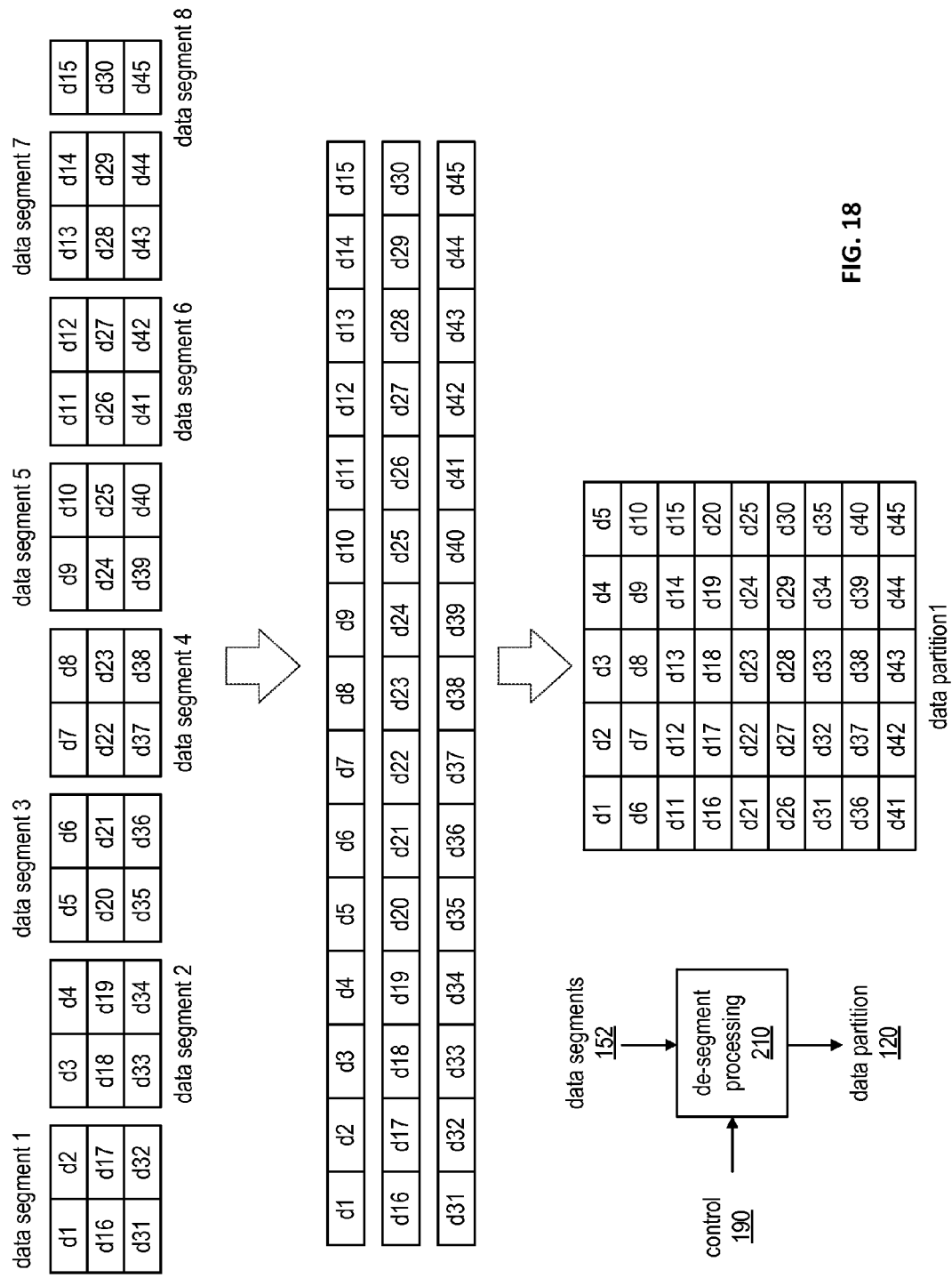
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
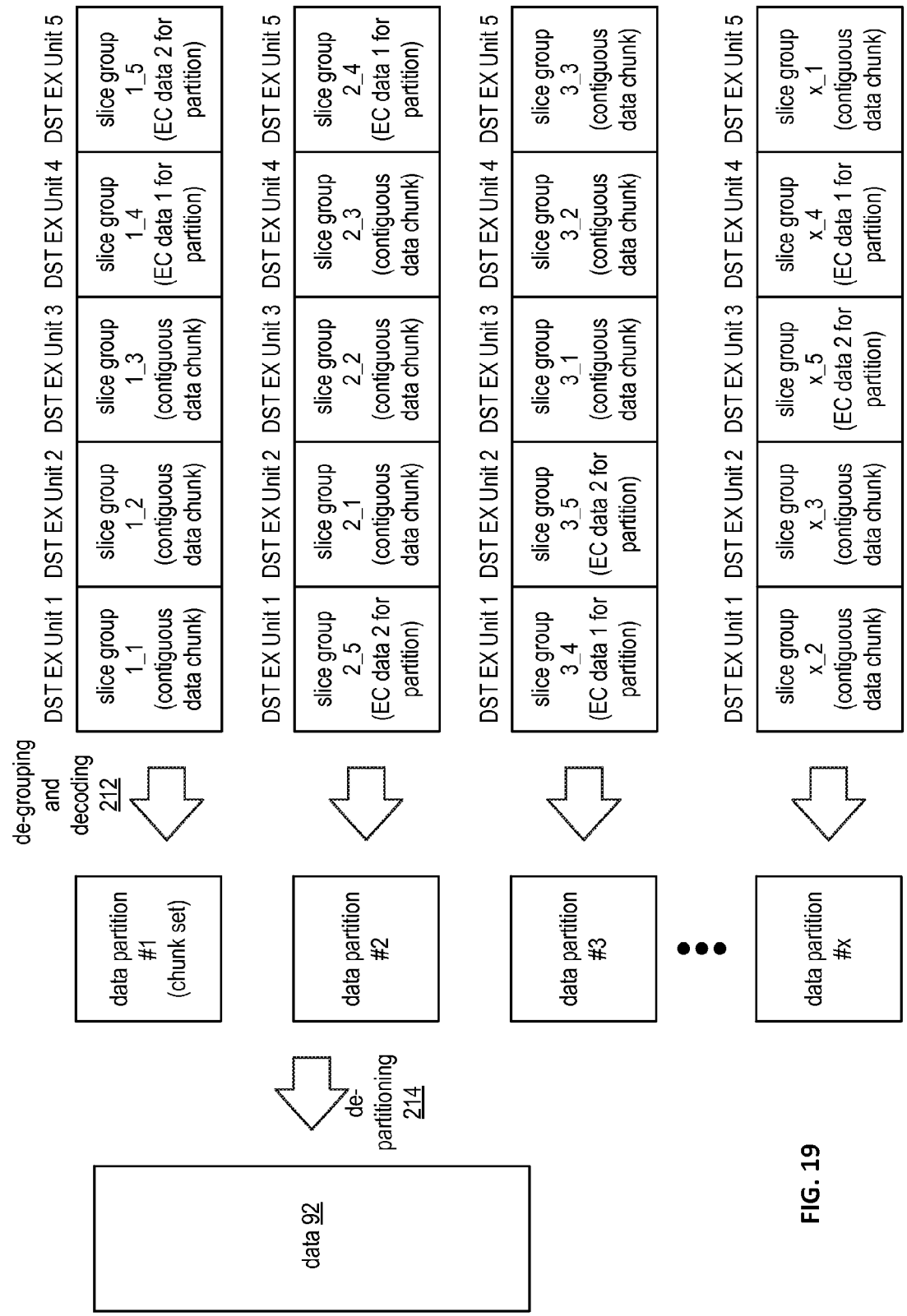
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
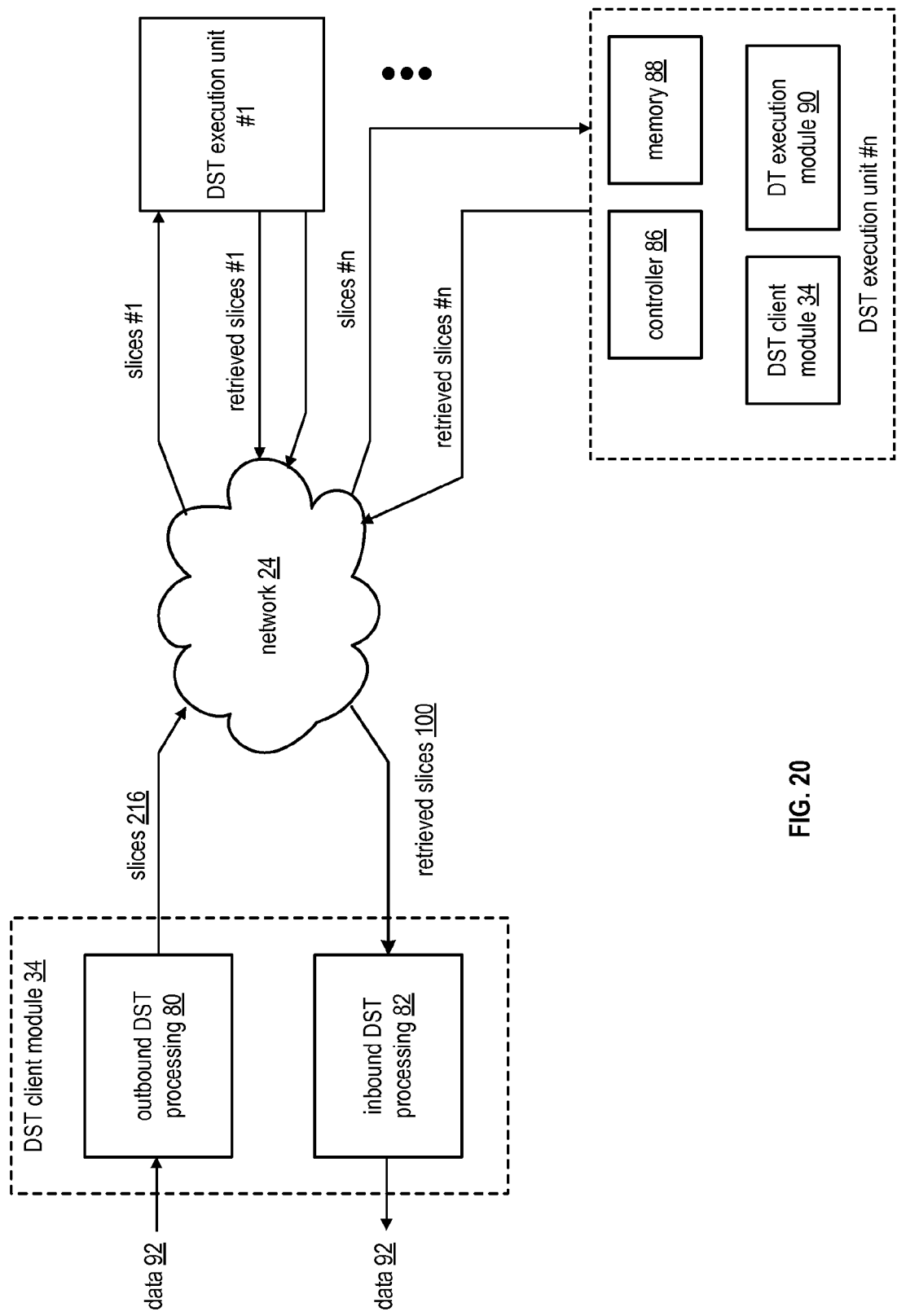
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
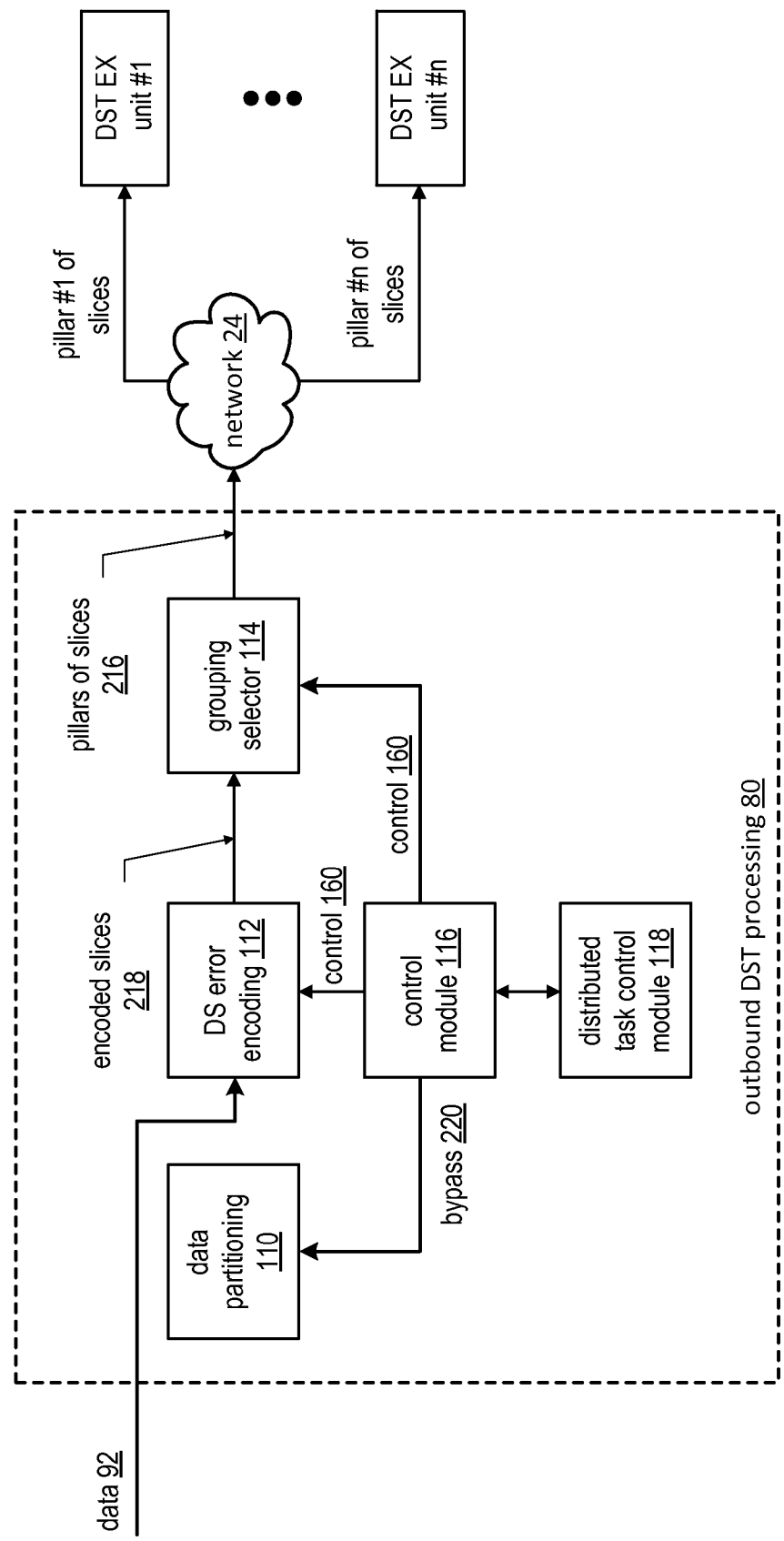
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
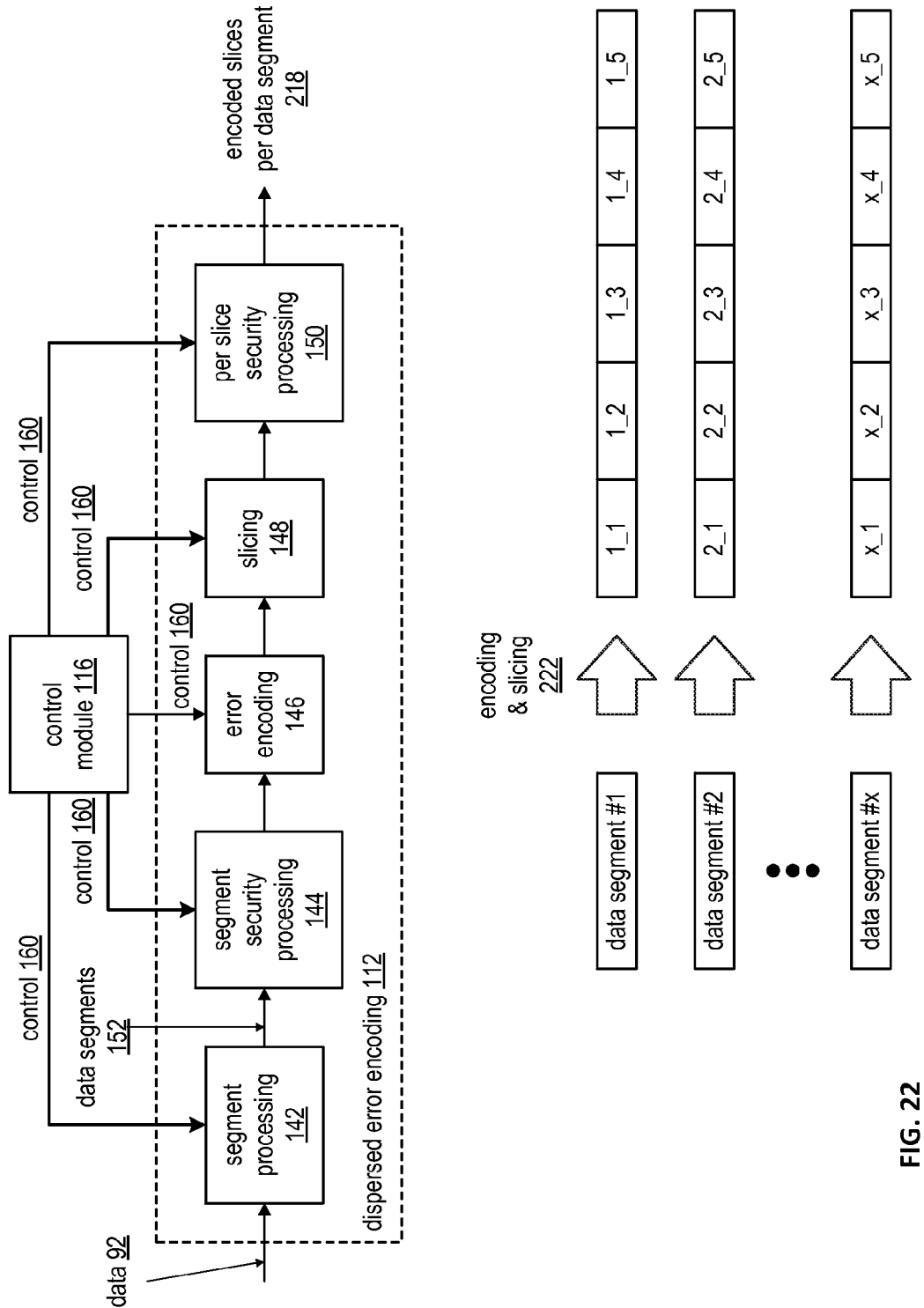
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
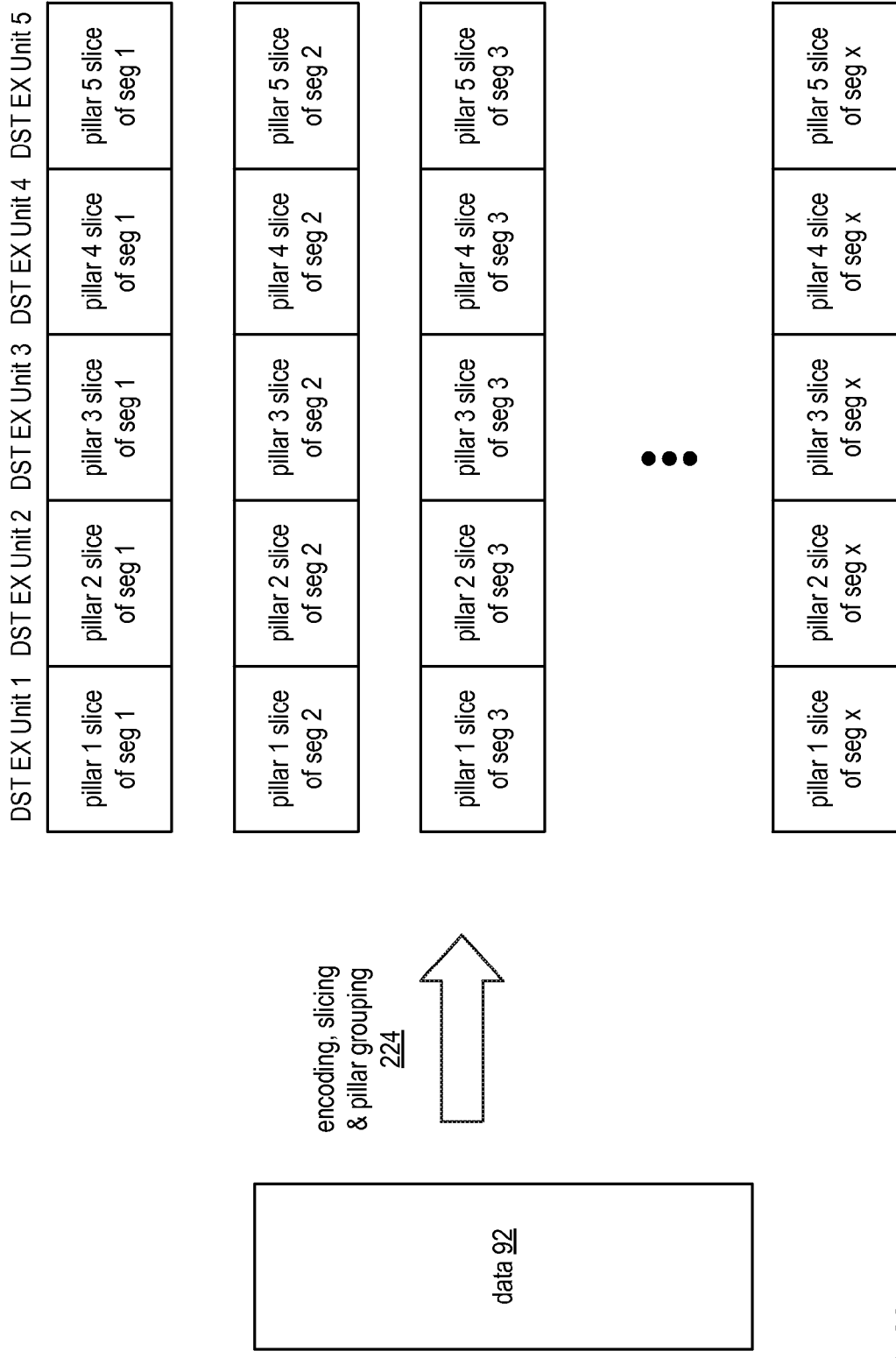
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
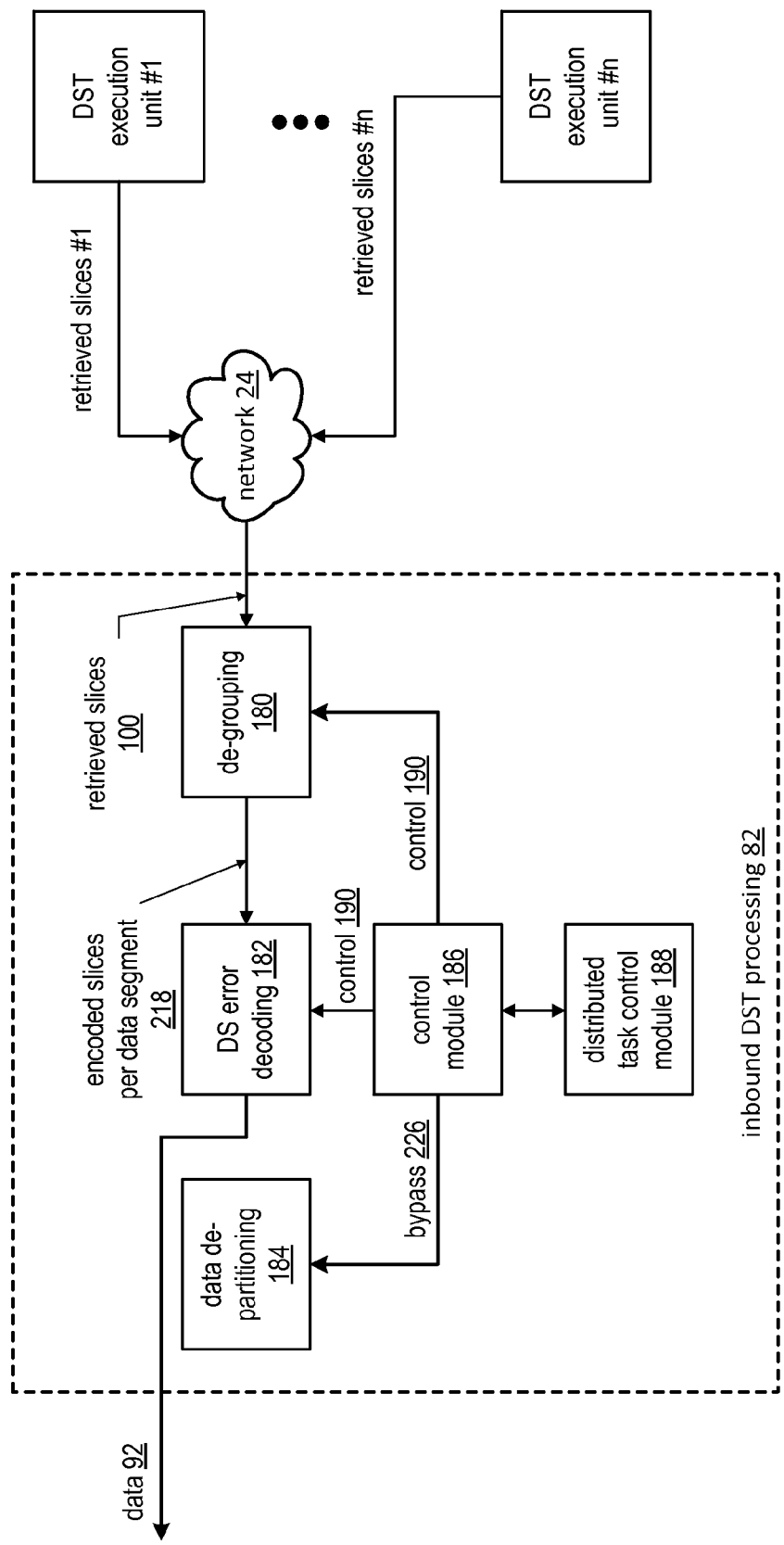
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
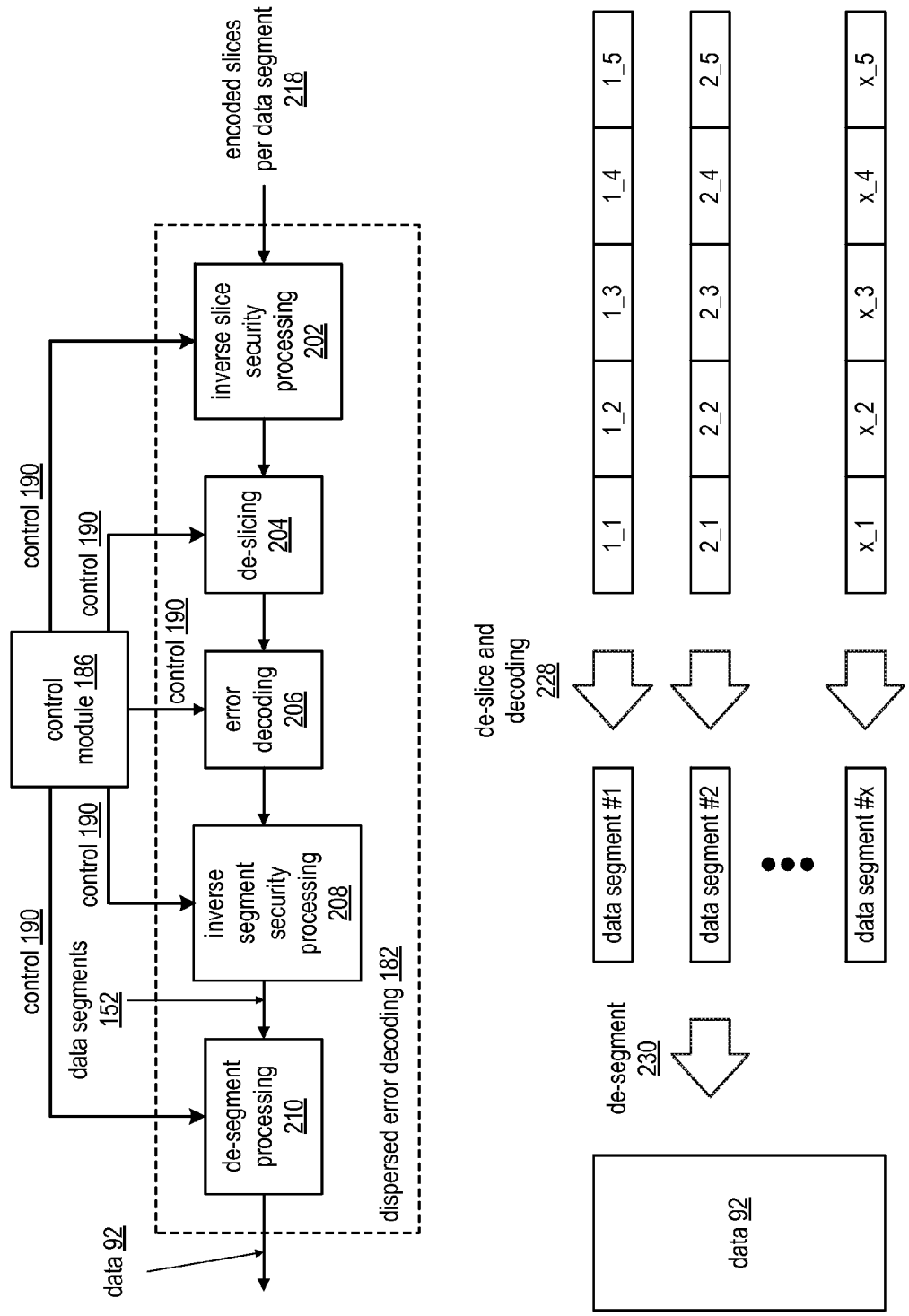
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
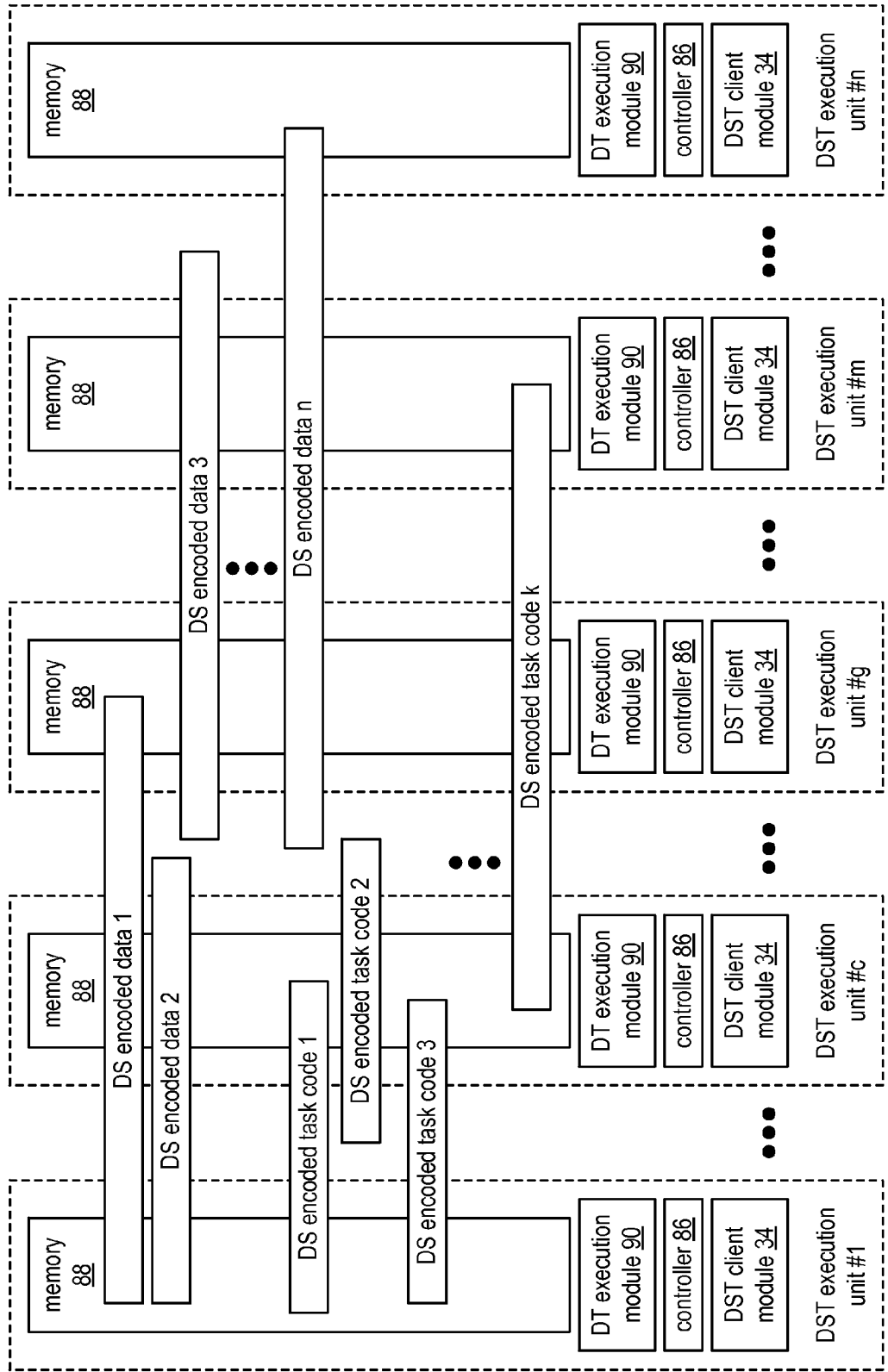
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
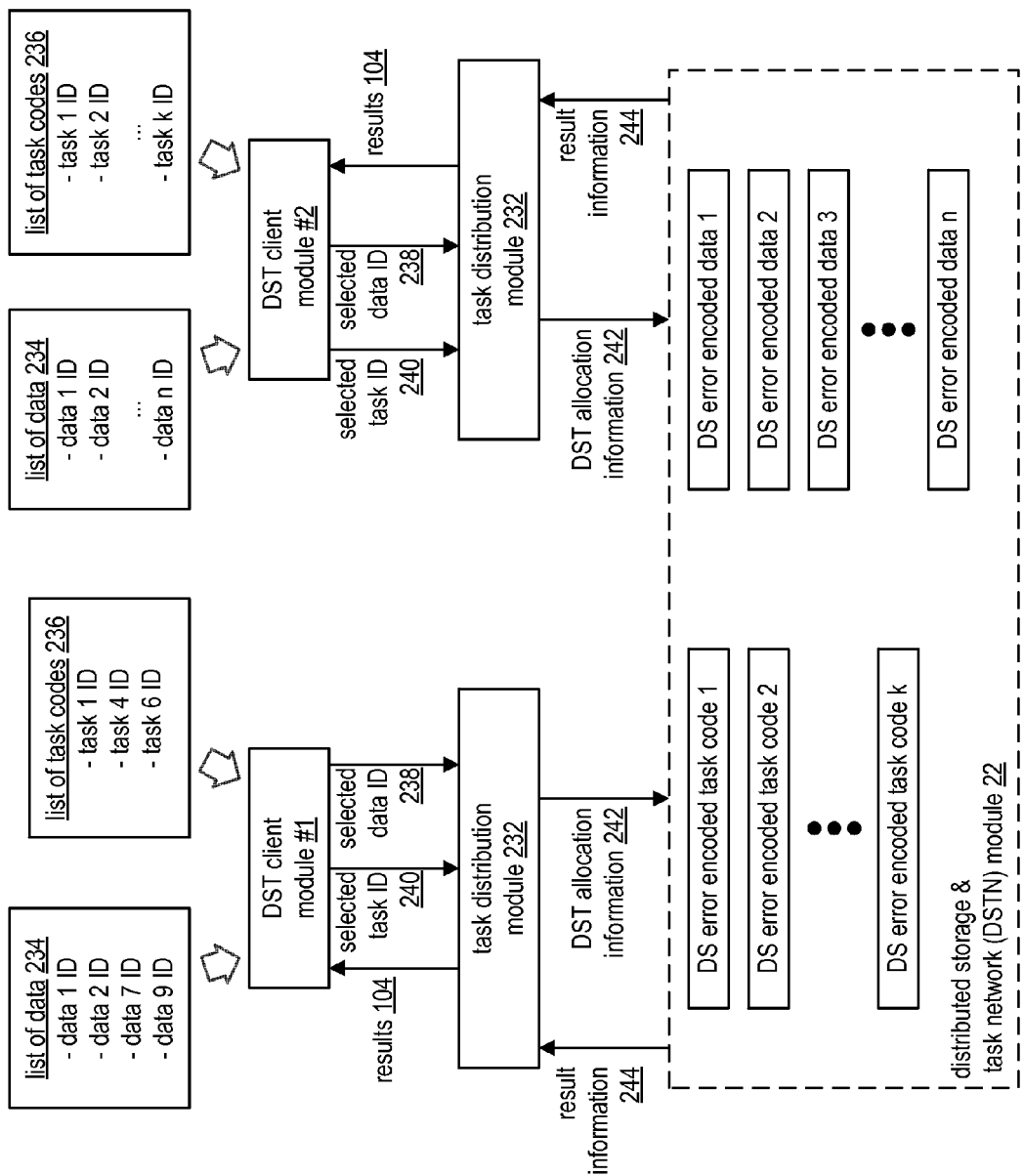
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
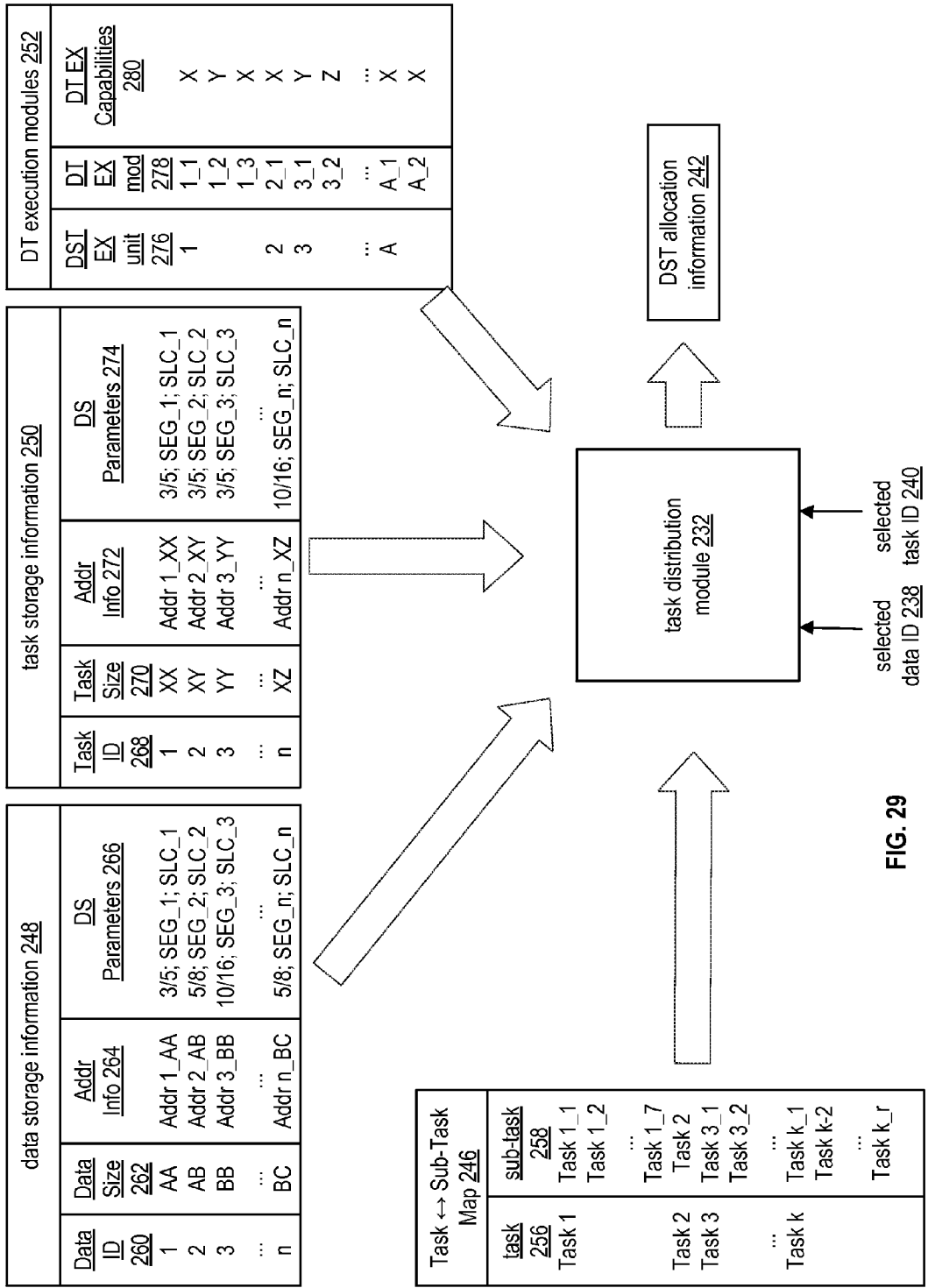
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/ pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
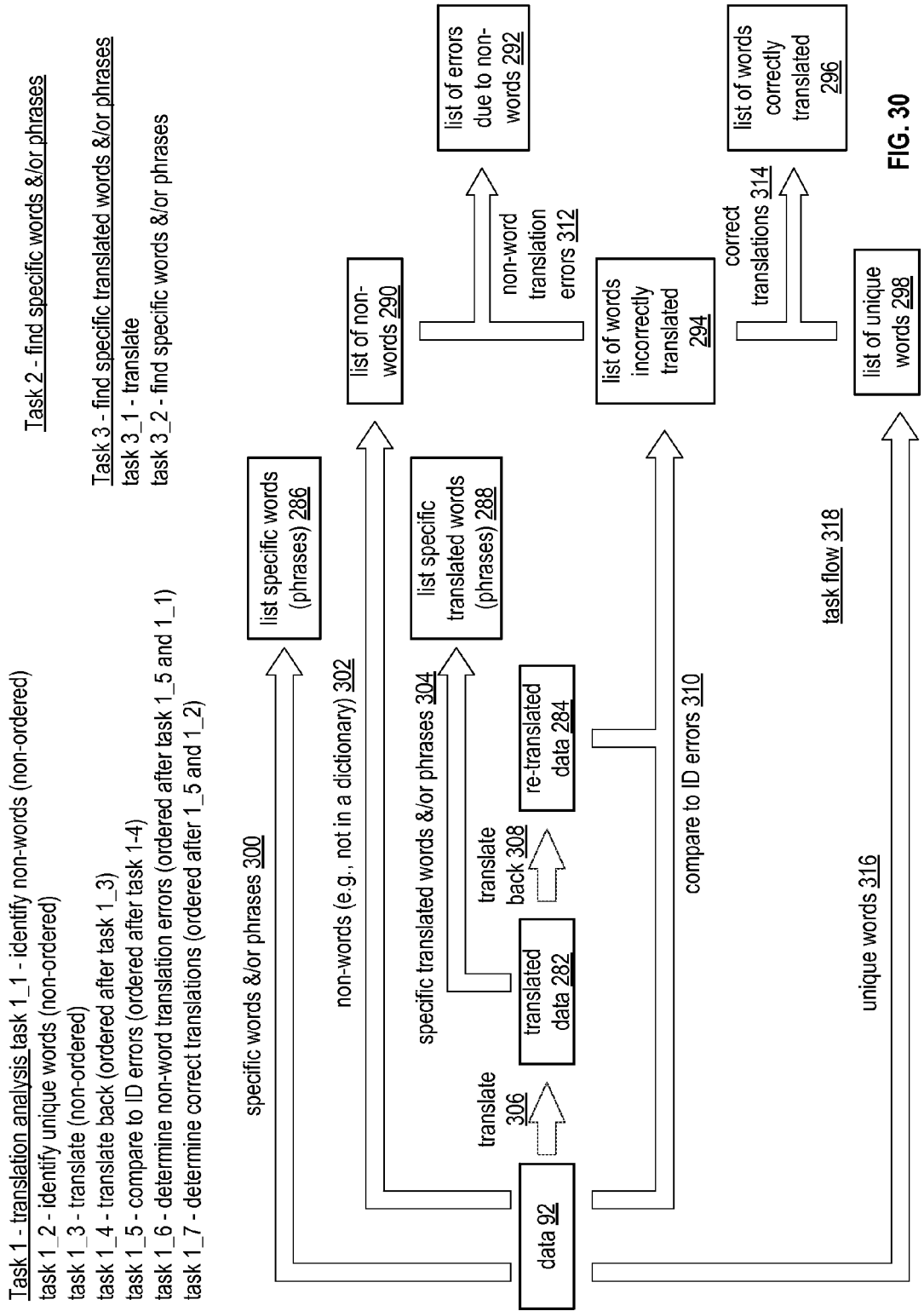
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
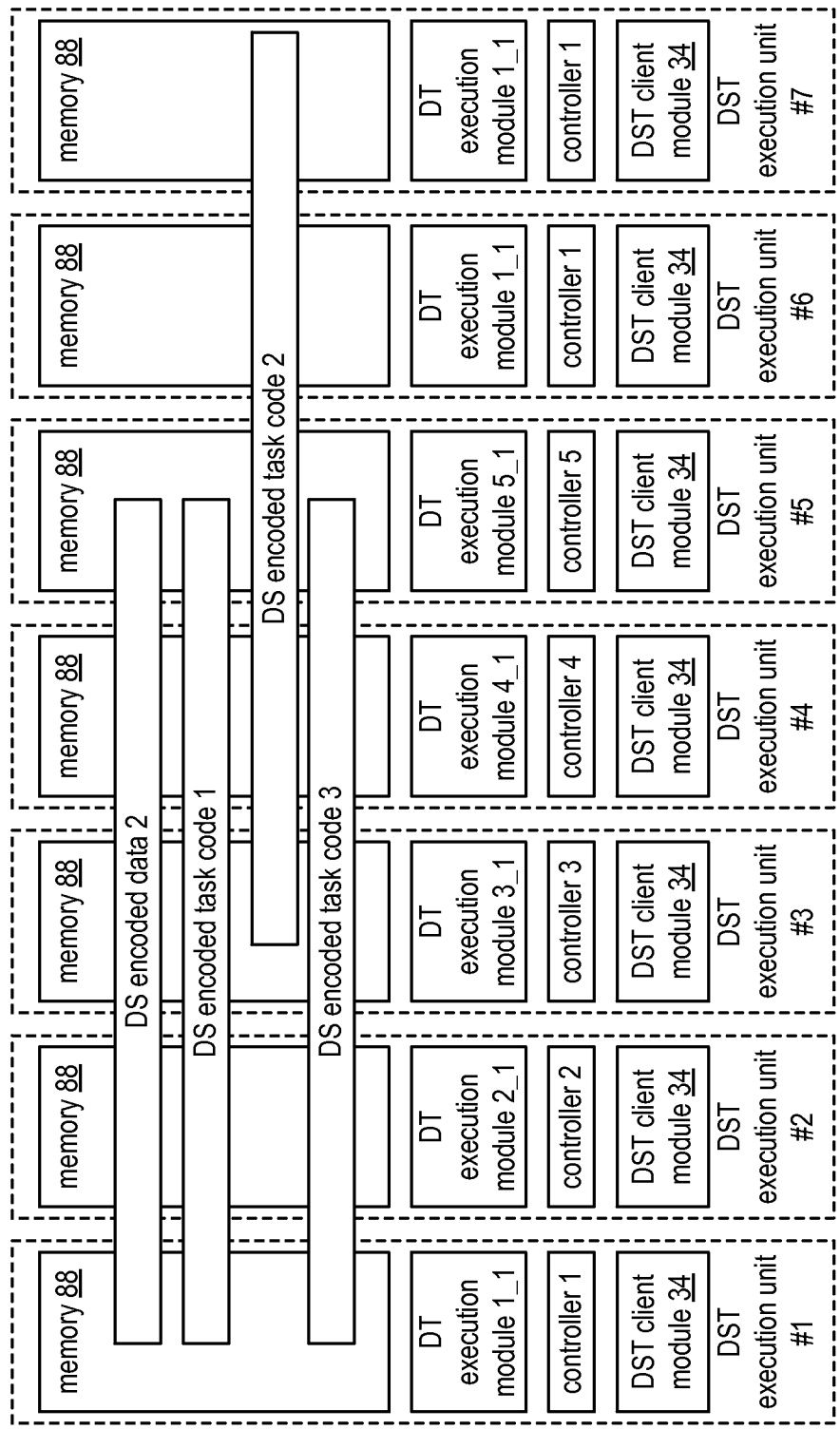
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figure 33:
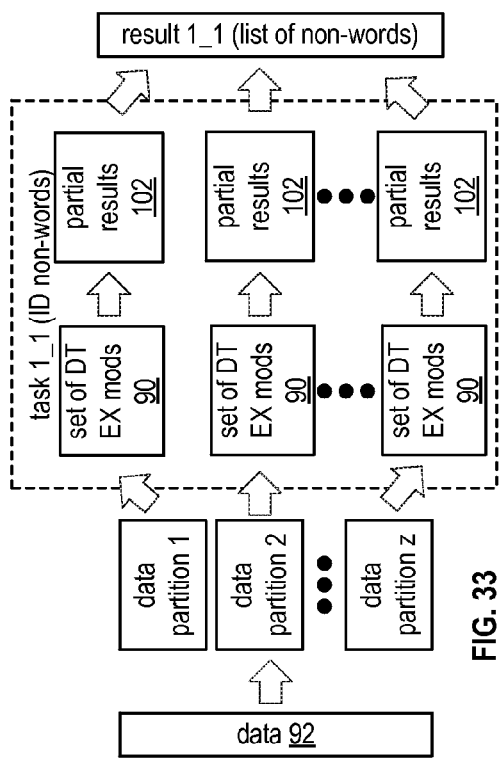

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DSTN) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabytes). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 34:
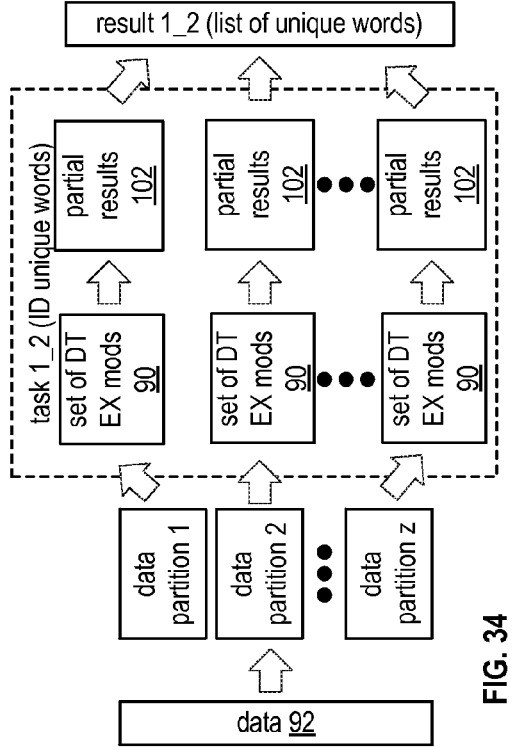

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabytes). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 35:
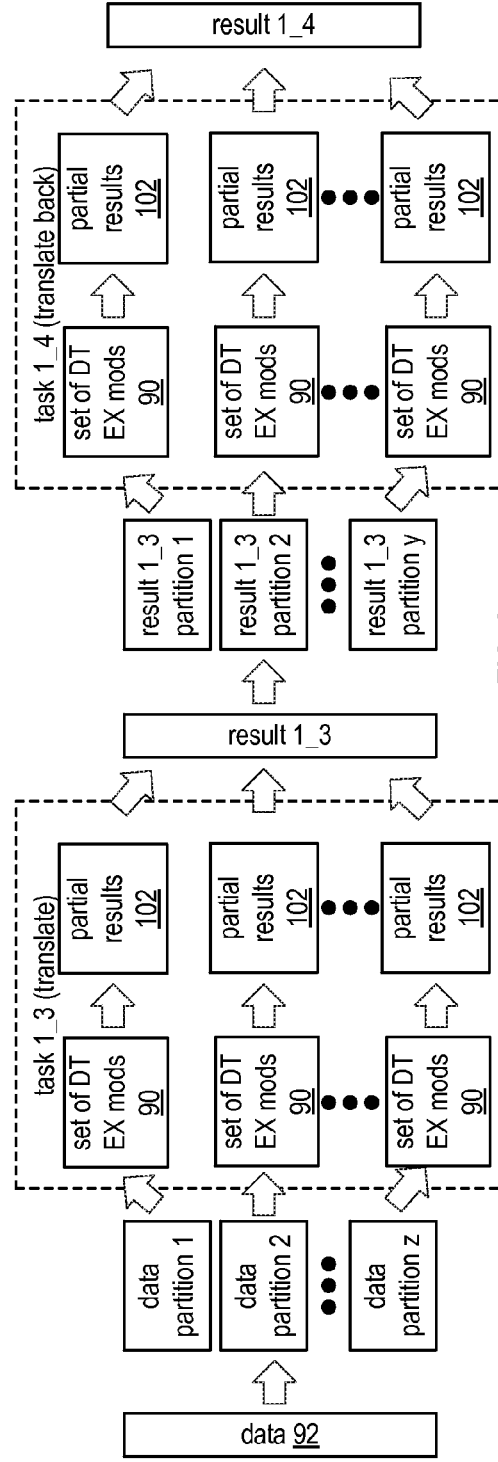

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
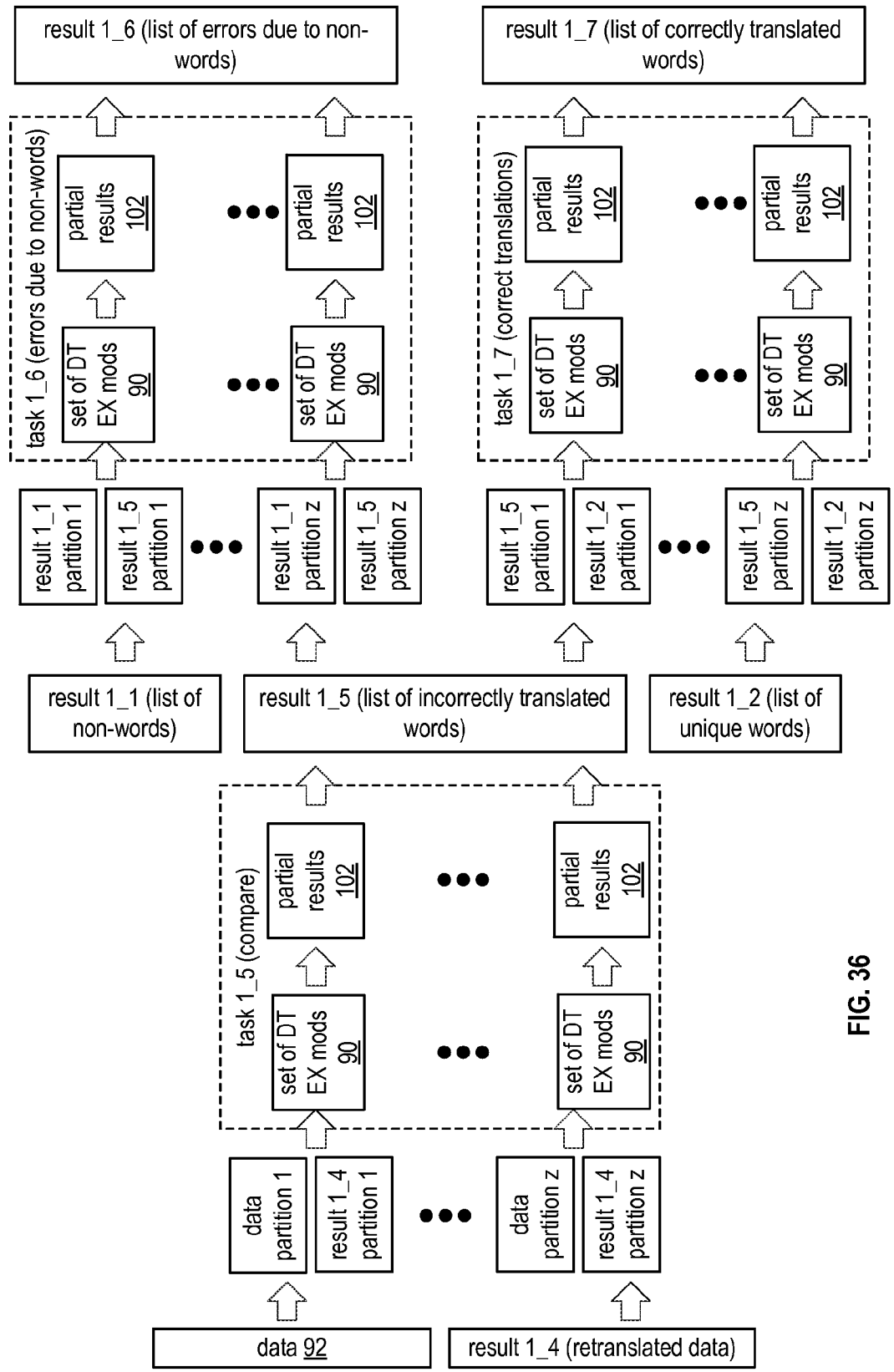

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabytes). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabytes). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
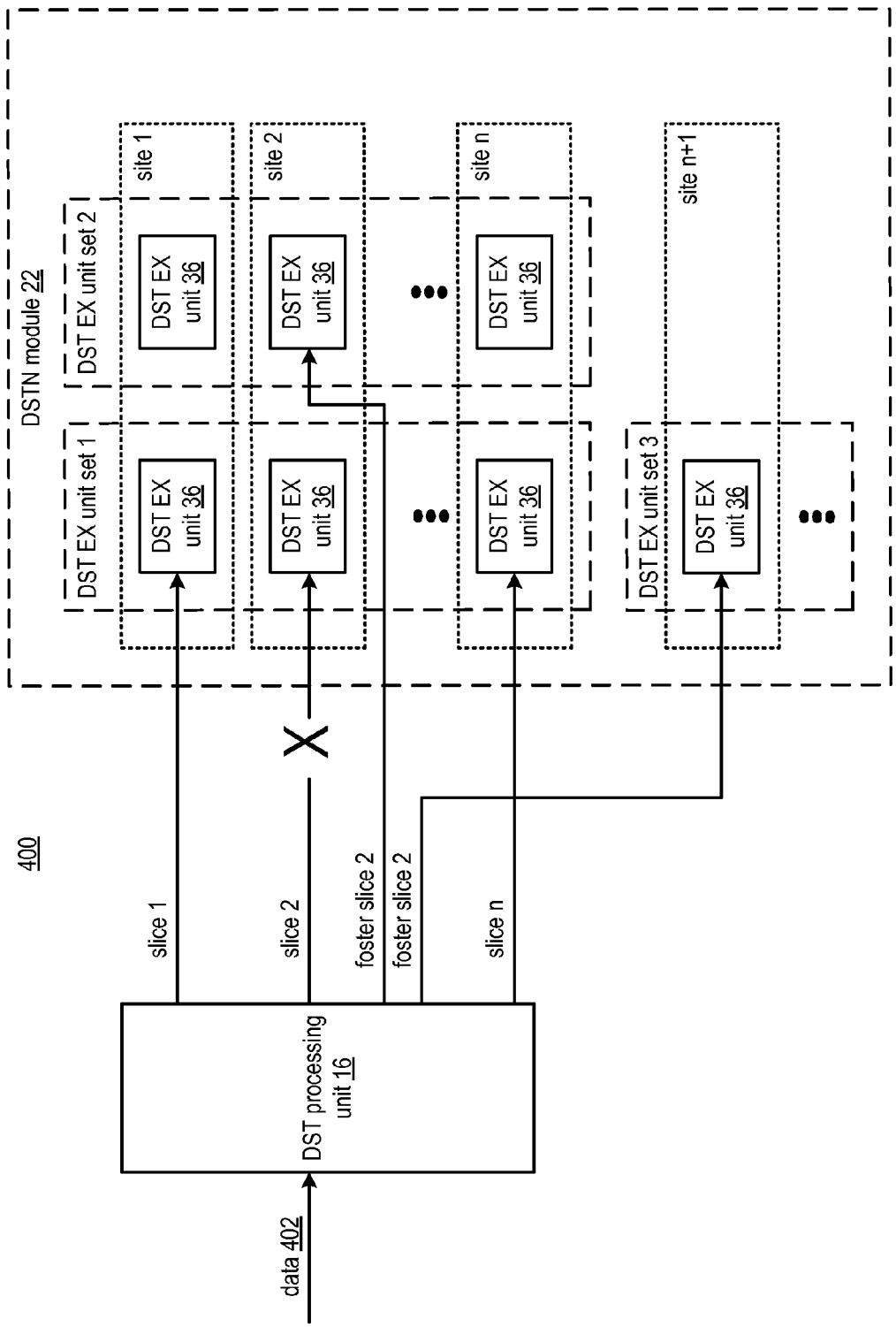
FIG. 40A is a schematic block diagram of an embodiment of a dispersed storage network (DSN) system in accordance with the present invention.

FIG. 40A is a schematic block diagram of an embodiment of a dispersed storage network (DSN) system 400 that includes the distributed storage and task (DST) processing unit 16 and the distributed storage and task network (DSTN) module 22 of FIG. 1. The DSTN module 22 includes a plurality of sets of DST execution units 36 (e.g., DST EX unit sets 1-3, etc.). The DST execution units 36 may be implemented at a site or a plurality of sites utilized for implementation of DST execution units 36 of the DSTN module 22. One or more DST execution units 36 of one or more DST execution unit sets may be implemented at a common site. For example, a first DST execution unit 36 of DST execution unit set 1 and a first DST execution unit 36 of DST execution unit set 2 are implemented at site 1, a second DST execution unit 36 of DST execution unit set 1 and a second DST execution unit 36 of DST execution unit set 2 are implemented at site 2, etc. through an nth DST execution unit 36 of DST execution unit set 1 and an nth DST execution unit 36 of DST execution unit set 2 are implemented at an nth site, and a first DST execution unit 36 of DST execution unit set 3 is implemented at site n+1.

In an embodiment, the dispersed storage and task (DST) processing unit 16 includes at least one module, when operable within a computing device, that causes the computing device to perform the following method steps: encode input data 402 into a plurality of slices; send the plurality of slices to a plurality of distributed storage and task execution units for storage, the plurality of distributed storage and task execution units 36 that are located at a corresponding plurality of sites; detect a storage failure corresponding to at least one of the plurality of slices corresponding to at least one of the plurality of the distributed storage and task execution units 36 and at least one of the corresponding plurality of sites; determine a foster storage approach for selecting a foster slice to replace the slices where storage failed; select at least one alternative distributed storage and task execution unit 36 in accordance with the foster storage approach; generate at least one foster slice corresponding to the at least one of the plurality of slices; and to send the at least one foster slice to the at least one alternative distributed storage and task execution unit 36.

The method described above in conjunction with the DST processing unit 16 can alternatively be performed by other modules of a dispersed storage network, of a dispersed storage and tracking network or by other devices. In addition, at least one memory section that stores operational instructions that can, when executed by one or more processing modules of one or more computing devices of a dispersed storage network (DSN), cause the one or more computing devices to perform any or all of the method steps described above.

In an embodiment, determining the foster storage approach includes determining one of: a performance optimized mode, and a reliability optimized mode. When the foster storage approach corresponds to the performance optimized mode, the at least one alternative distributed storage and task execution unit can be selected as the at least one of corresponding plurality of sites. When the foster storage approach corresponds to the reliability optimized mode, the at least one alternative distributed storage and task execution unit can be selected as at least one alternative site that is disassociated from the corresponding plurality of sites.

In an embodiment the method described above further includes updating slice location information corresponding to the input data when the at least one foster slice is successfully stored in the at least one alternative distributed storage and task execution unit 36. Detecting a storage failure corresponding to at least one of the plurality of slices can include at least one of: detecting a device failure in the at least one of the plurality of the distributed storage and task execution units 36; and detecting a communication failure to the at least one of the plurality of the distributed storage and task execution units 36. The foster storage approach can be determined based on at least one of: a predetermined mode selection; a vault identifier, a data type corresponding to the input data, an estimated time of storage of the input data, an estimated frequency of retrieval of the input data, a reliability requirement of the input data, and a retrieval performance requirement of the input data.

The further operation of the dispersed storage network (DSN) system 400, including several optional functions and features can be described in conjunction with the examples that follow.

In an example of storing data in the DSTN module 22, the DST processing unit 16 receives the data and encodes the data using a dispersed storage error coding function to produce a set of encoded data slices 1-n. The DST processing unit 16 selects a DST execution unit set for storage of the set of encoded data slices based on one or more of a DST execution unit availability indicator, a DST execution unit performance level indicator, a data identifier, and an association of the data identifier with a set of DST execution units. As a specific example, the DST processing unit 16 selects DST execution unit set 1 for storing the set of encoded data slices 1-n when a storage location table lookup indicates that the data identifier of the data is associated with the DST execution unit set 1.

Having selected the DST execution unit set, the DST processing unit 16 sends each encoded data slice of the set of encoded data slices to a corresponding DST execution unit 36 of the DST execution unit set 1. As a specific example, the DST processing unit 16 sends encoded data slice 1 to the first DST execution unit 36 of the DST execution unit set 1, the DST processing unit 16 sends encoded data slice 2 to the second DST execution unit 36 of the DST execution unit set 1, etc.

The DST processing unit 16 detects a storage failure of storage of an encoded data slice in an associated DST execution unit 36. The detecting may be based on one or more of receiving an unfavorable response from the DST execution unit 36, not receiving a favorable storage response from the DST execution unit 36 within a response timeframe, detecting a network failure, receiving an error message, and detecting that the DST execution unit 36 is inoperable. As a specific example, the DST processing unit 16 detects the storage failure of storage of slice 2 to the second DST execution unit 36 of DST execution unit 1 (represented by the large "X") when the favorable storage response was not received within the response timeframe.

Having detected the storage failure, the DST processing unit 16 selects a foster storage approach based on one or more of a predetermination, the data identifier, a vault identifier, a data type indicator, an estimated time of storage, an estimated frequency of retrieval, a storage reliability requirement, and a retrieval performance requirement. The foster storage approach includes a variety of approaches. A first approach includes generating and storing a foster slice for storage in another DST execution unit 36 of the DSTN module 22 to realize a performance optimization. A second approach includes storing the foster slice in yet another DST execution unit 36 to realize a reliability optimization. For example, the DST processing unit 16 selects the performance optimization foster storage approach when the estimated frequency of retrieval is higher than average frequency of retrieval and the retrieval performance requirement is higher than an average retrieval performance. As another example, the DST processing unit selects the reliability optimization foster storage approach when the estimated time of storage is greater than an average time of storage and the storage reliability requirement is higher than an average storage reliability requirement.

When the foster storage approach is optimized for performance, the DST processing unit 16 selects an alternate DST execution unit 36 affiliated with the DST execution unit 36. The alternate DST execution unit affiliation includes at least one of co-location at a common site, co-location in a common rack, and sharing a common network access connection. As a specific example, the DST processing unit 16 selects the second DST execution unit 36 of DST execution unit set 2 implemented at site 2 in common with the second DST execution unit 36 of DST execution unit set 1.

When the foster storage approach is optimized for reliability, the DST processing unit 16 selects the alternate DST execution unit 36 to be disassociated with the DST execution unit 36. The disassociation provides high failure independence and includes at least one of implemented at another site, included in another set of DST execution units, powered by a different power source, utilizing a unique device, and utilizing a unique network access connection. As a specific example, the DST processing unit 16 selects the first DST execution unit 36 of DST execution unit set 3 implemented at site n+1.

Having selected the alternate DST execution unit 36, the DST processing unit 16 issues a foster slice storage request to the alternate DST execution unit 36. The issuing includes one or more of generating a temporary DSN address to associate with the encoded data slice, generating the foster storage request to include the encoded data slice and the temporary DSN address, and sending the foster slice storage request to the alternate DST execution unit 36. The DST processing unit 16 updates slice location information (e.g., a slice location table) to associate one or more of the encoded data slice, the temporary DSN address, and the alternate DST execution unit 36.

FIG. 40B is a flowchart illustrating an example of identifying alternate storage. In particular a method is presented for use in conjunction with one or more functions and features described in conjunction with FIGS. 1-39 and also FIG. 40A. The method includes step 410 where a processing module (e.g., of a distributed storage and task (DST) client module) sends a set of encoded data slices to a set of storage units for storage therein. The sending includes issuing a set of write slice requests to the set of storage units that includes the set of encoded data slices. The method continues at step 412 where the processing module detects a storage failure of an encoded data slice to an unavailable storage unit. The detecting includes at least one of determining that a favorable write slice responses that the received from the unavailable storage unit within a response timeframe, receiving an unfavorable write slice response from the unavailable storage unit, and receiving an error message.

The method continues at step 414 where the processing module identifies a foster storage approach. The identifying may be based on one or more of a requesting entity identifier, a data type, a data identifier, a vault identifier, an amount of estimated storage required, an estimated retrieval frequency, a reliability requirement, and a retrieval performance requirement. The method branches to step 416 where the processing module identifies the alternate storage unit disassociated with the unavailable storage unit when the foster storage approach is optimized for reliability. The method continues to step 415 when the foster storage approach is optimized for performance. The method continues at step 415 when the foster storage approach is optimized for performance, where the processing module identifies an alternate storage unit associated with the unavailable storage unit. For example, the processing module selects the alternate storage unit based on a high degree of affinity with the unavailable storage unit. For instance, the processing module selects the alternate storage unit for at least one of a similar performance level, implemented at a common site, implemented in a common rack, a common model, and a common software version. The method branches to step 418 where the processing module issues a foster slice storage request.

When the foster storage approach is optimized for reliability, the method continues at step 416 where the processing module identifies the alternate storage unit disassociated with the unavailable storage unit. The identifying includes selecting the alternate storage unit based on a low level of affinity with the unavailable storage unit. For example, implemented at a different site, a different model, utilizing a different power source, utilizing a different communication path under a different management domain, and utilizing a different software version.

The method continues at step 418 where the processing module issues a foster slice storage request to the identified alternate storage unit that includes the encoded data slice associated with the storage failure. The issuing includes generating the foster slice storage request to include one or more of the encoded data slice, a slice name, a temporary slice name, an estimated time of storage, a temporary access control list, and temporary access credentials. The method continues at step 420 where the processing module updates slice location information. For example, the processing module updates a dispersed storage network (DSN) address-to-slice location table to associate the slice name to the identified alternate storage unit and to disassociate the unavailable storage unit and the slice name.

Figure 41A:
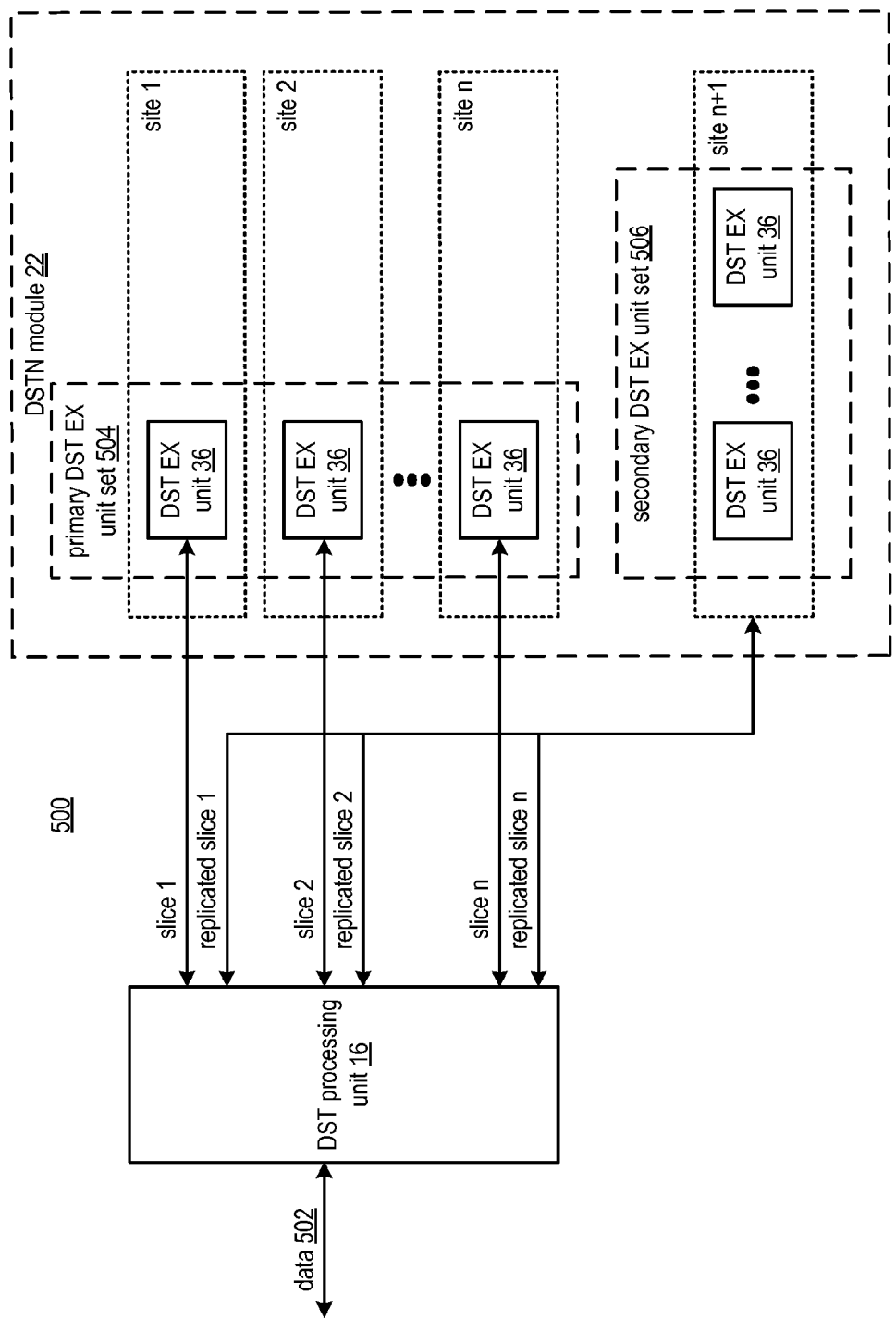
FIG. 41A is a schematic block diagram of another embodiment of a dispersed storage network (DSN) system in accordance with the present invention.
Figure 41B:
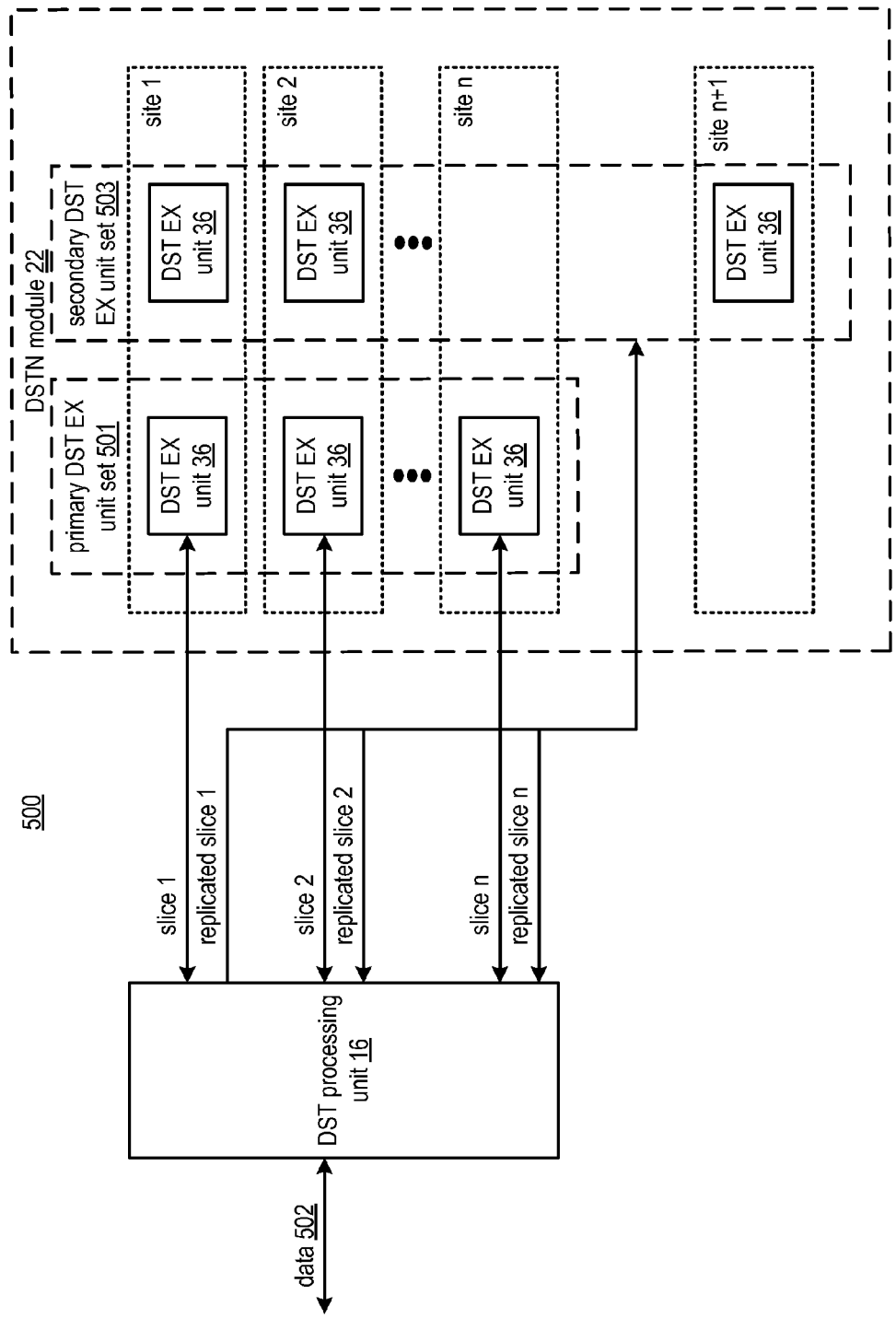
FIG. 41B is a schematic block diagram of another embodiment of a dispersed storage network (DSN) system in accordance with the present invention.

FIGS. 41A and 41B are schematic block diagrams of other embodiments of a dispersed storage network (DSN) system 500 that includes the distributed storage and task (DST) processing unit 16 and the distributed storage and task network (DSTN) module 22 of FIG. 1. The DSTN module 22 includes a primary DST execution unit set 504 and a secondary DST execution unit set 506. Each of the primary and secondary DST execution unit sets includes a set of DST execution units 36 of FIG. 1. The DST execution units 36 may be implemented at a site of a plurality of sites utilized for implementation of DST execution units 36 of the DSTN module 22. At least one DST execution unit 36 of at least one of the primary and secondary DST execution unit sets is implemented at a unique site. For example, as illustrated in FIG. 41A, all DST execution units 36 of the secondary DST execution unit set are implemented at site n+1 and all DST execution units 36 of the primary DST execution unit set are implemented at sites 1-n. As another example, as illustrated in FIG. 41B, one DST execution unit 36 of the secondary DST execution unit set 503 is implemented at site n+1 and all remaining DST execution units 36 of the secondary DST execution unit set and all DST execution units 36 of the primary DST execution unit set 501 are implemented at sites 1-n.

In an embodiment, the dispersed storage and task (DST) processing unit 16 includes at least one module, when operable within a computing device, that causes the computing device to perform the following method steps: encoding input data 502 into a plurality of slices; sending the plurality of slices to a first plurality of distributed storage and task execution units 36 for storage, the first plurality of distributed storage and task execution units 36 being located at a corresponding first plurality of sites; receiving write slice data from the first plurality of distributed storage and task execution units 36; determining when replication is to be applied to the plurality of slices. When replication is to be applied to the plurality of slices: selecting a second plurality of distributed storage and task execution units 36; generating a plurality of replicated slices corresponding to the plurality of slices; and sending the plurality of replicated slices to the second plurality of distributed storage and task execution units 36.

The method described above in conjunction with the DST processing unit 16 can alternatively be performed by other modules of a dispersed storage network, of a dispersed storage and tracking network or by other devices. In addition, at least one memory section that stores operational instructions that can, when executed by one or more processing modules of one or more computing devices of a dispersed storage network (DSN), cause the one or more computing devices to perform any or all of the method steps described above.

In an embodiment, determining when replication is to be applied to the plurality of slices is based on at least one of: analyzing the write slice responses, a requester identification, a data identification, a data type indication, a vault identification, and a replication mode predetermination. Determining when replication is to be applied to the plurality of slices can include analyzing the write slice responses to determine when at least one storage error occurred. Determining when replication is to be applied to the plurality of slices can include analyzing the write slice responses to determine a number of storage errors and to determine when the number of storage errors compares unfavorably to a replication threshold. Determining when replication is to be applied to the plurality of slices can include analyzing the write slice responses to determine a number of favorable write slice responses and to determine when the number of favorable write slice responses compares unfavorably to a replication threshold. The second plurality of distributed storage and task execution units 36 can be selected to correspond to at least one site that is disassociated with the first plurality of sites. The second plurality of distributed storage and task execution units 36 can be selected based on at least one of: a predetermined selection, a column availability, a reliability metric, a storage requirement associated with the plurality of slices, and one or more sites associated with the second plurality of distributed storage and task execution units 36.

The further operation of the dispersed storage network (DSN) system 500, including several optional functions and features can be described in conjunction with the examples that follow.

In an example of storing data in the DSTN module 22, the DST processing unit 16 includes the data using a dispersed storage error coding function to produce a set of encoded data slices and sends the set of encoded data slices to the primary DST execution unit set for storage therein. The DST processing unit 16 receives write slice responses from the primary DST execution unit set with regards to status of writing (e.g., favorable, unfavorable). The DST processing unit 16 determines whether to replicate the set of encoded data slices. The determining may be based on one or more of a requesting entity identifier, a data identifier, a data type indicator, a vault identifier, a predetermination, receiving an error message, and the write slice responses. For example, the DST processing unit 16 determines to replicate the set of encoded data slices when one storage error is detected. As another example, the DST processing unit 16 determines to replicate the set of encoded data slices when not receiving at least a write threshold number of favorable write slice responses from the set of storage units within a response timeframe.

When replicating, the DST processing unit 16 selects one or more alternate DST execution units 36 to form the secondary DST execution unit set, where at least one alternate DST execution unit 36 is implemented at a unique site with regards to implementation of DST execution units 36 of the primary DST execution unit set. The selecting may be based on one or more of a predetermination, current availability, a reliability level, a storage requirement, and a reserved storage unit indicator. For example, the DST processing unit 16 selects a set of DST execution units 36 based on a list of DST execution units 36 associated with a reserved set of DST execution units 36.

Having selected the secondary DST execution unit set, the DST processing unit 16 sends the set of encoded data slices as a replicated set of encoded data slices to the secondary DST execution unit set for storage therein. The sending may include sending a replicated slice to a DST execution unit 36 implemented at a site that is not common to a site where an associated encoded data slice is stored within a DST execution unit 36 of the primary DST execution unit set. For example, the DST processing unit 16 sends a replicated slice 2 to a second DST execution unit 36 of the secondary DST execution unit set that is implemented at site n+1 as illustrated in FIG. 41A. As another example, the DST processing unit 16 sends the replicated slice 2 to a first DST execution unit 36 of the secondary DST execution unit set that is implemented at site 1 as illustrated in FIG. 41B (e.g., since slice 2 is stored in a second DST execution unit 36 of the primary DST execution unit set at site 2).

Having sent the set of replicated encoded data slices to the secondary DST execution unit set, the DST processing unit 16 updates slice location information to enable subsequent data recovery from retrieving a set of encoded data slices from one or more of the primary and secondary DST execution unit sets. The updating includes associating slice names of the encoded data slices with identifiers of associated DST execution units 36.

Figure 41C:
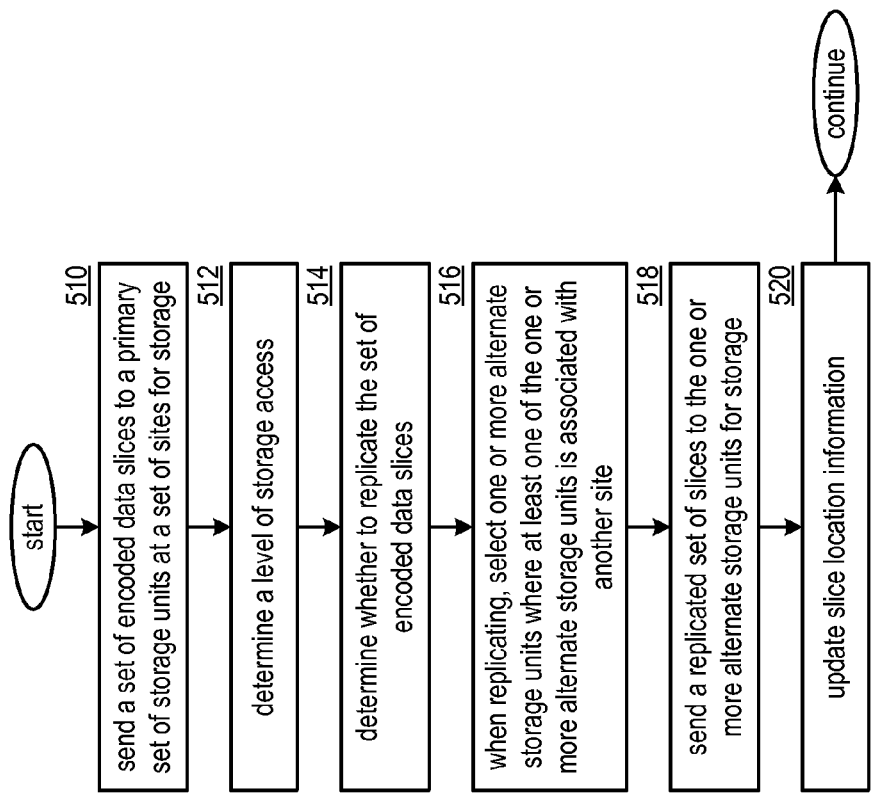
FIG. 41C is a flowchart illustrating an example of replicating encoded data slices in accordance with the present invention.

FIG. 41C is a flowchart illustrating an example of replicating encoded data slices, which includes similar steps to FIG. 40B. In particular a method is presented for use in conjunction with one or more functions and features described in conjunction with FIGS. 1-39 and also FIGS. 40A, 40B, 41A and 41B. The method includes step 510 where a processing module (e.g., of a distributed storage and task (DST) client module) sends a set of encoded data slices to a primary set of storage units and a set of sites for storage. The sending includes issuing a set of write slice requests to the primary set of storage units that includes the set of encoded data slices. The method continues at step 512 where the processing module determines a level of storage access. The determining includes interpreting write slice responses from the primary set of storage units. The method continues at step 514 where the processing module determines whether to replicate the set of encoded data slices. The determining may be based on one or more of a requester identifier, a data identifier, a data type indicator, a vault identifier, a predetermination, a level of storage access, and a received error message. For example, the processing module determines to replicate the set of encoded data slices when the level of storage access indicates that less than a write threshold number of favorable write slice responses has been received from the primary set of storage units.

When replicating, the method continues at step 516 where the processing module selects one or more alternate storage units where at least one of the one or more alternate storage units is associated with another site (e.g., different than the set of sites associated with the primary set of storage units. The selecting includes at least one of utilizing an alternate storage unit from a list of reserved storage units and selecting one or more reserved storage units based on one or more of alternate storage unit availability and reliability to produce the selected one or more alternate storage units. The method continues at step 518 where the processing module sends a replicated set of slices to the one or more alternate storage units for storage. The sending includes one or more of generating an alternate set of slice names, generating replicated write slice requests that includes the set of encoded data slices and the alternate set of slice names, and outputting the replicated write slice requests to the one or more alternate storage units. The method continues at step 520, similar to step 420 of FIG. 40B, where the processing module updates slice location information.

Figure 42A:
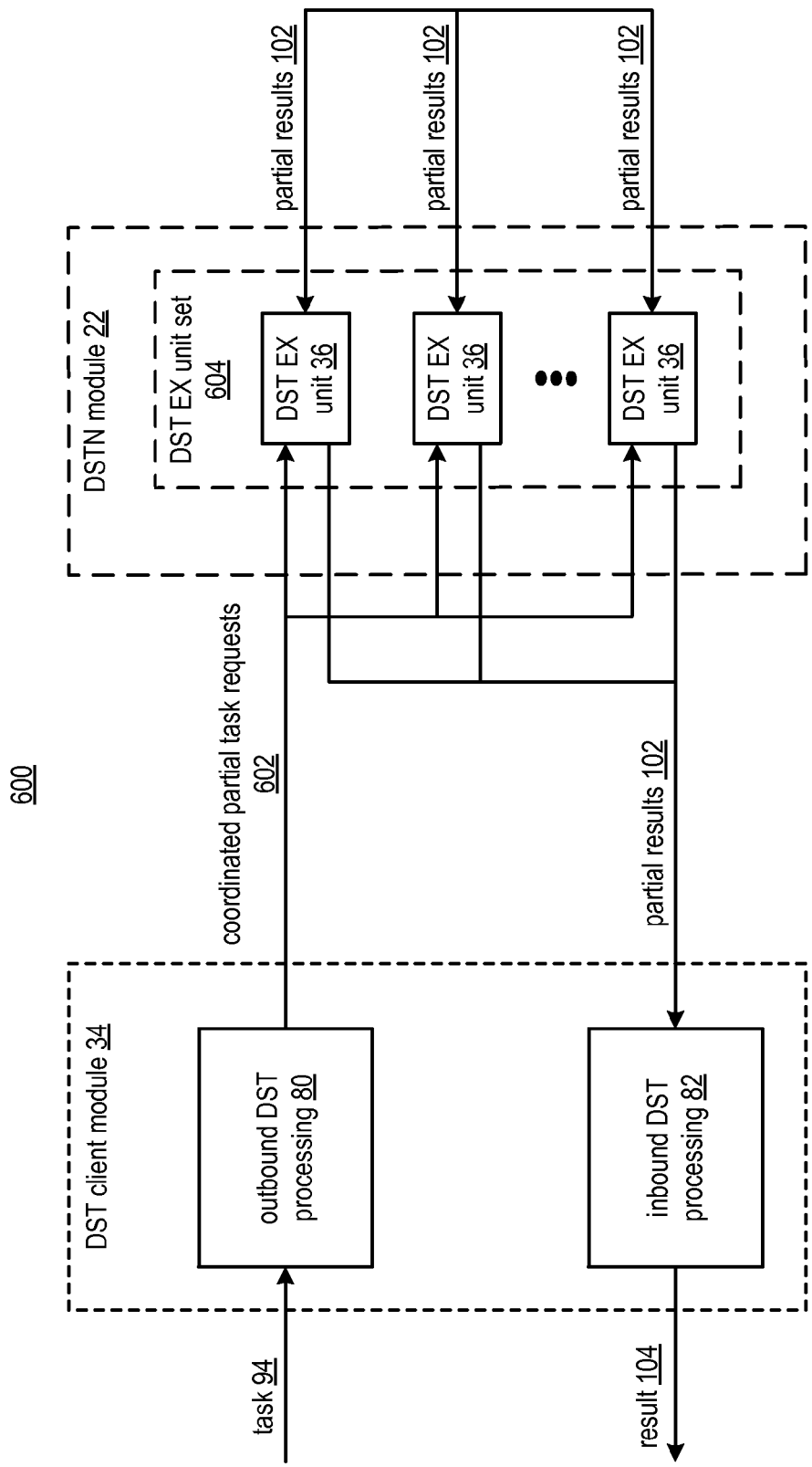
FIG. 42A is a schematic block diagram of another embodiment of a distributed computing system in accordance with the present invention.

FIG. 42A is a schematic block diagram of another embodiment of a distributed computing system 600 that includes the distributed storage and task (DST) client module 34 and the distributed storage and task network (DSTN) module 22 of FIG. 1. The DST client module 34 includes the outbound DST processing 80 and the inbound DST processing 82 of FIG. 3. The DSTN module 22 includes a DST execution unit set 604 that includes a set of DST execution units 36 of FIG. 1. The system functions to process a task 94 by coordinating execution of associated partial tasks by the set of DST execution units 36 to produce a result 104.

In an embodiment, the dispersed storage and task (DST) client module 34 includes at least one module, when operable within a computing device, that causes the computing device to perform the following method steps: receiving a task 94 for execution by a plurality of distributed storage and task execution units 36; determining a priority level for the task 94; generating a plurality of coordinated partial task requests 602 to the plurality of distributed storage and task execution units 36, wherein the plurality coordinated partial task requests 602 indicate a plurality of coordinated partial tasks and the priority level; receiving a plurality of partial task results 102 in response to performance of the plurality of coordinated partial tasks by the plurality of distributed storage and task execution units; and generating a task result 104 for the task 94 based on the plurality of partial task results 102.

The method described above in conjunction with the DST client module 34 can alternatively be performed by other modules of a dispersed storage network, of a dispersed storage and tracking network or by other devices. In addition, at least one memory section that stores operational instructions that can, when executed by one or more processing modules of one or more computing devices of a dispersed storage network (DSN), cause the one or more computing devices to perform any or all of the method steps described above.

In an embodiment, the plurality of distributed storage and task execution units 36 determine when to commence the plurality of coordinated partial tasks based on at least one of: at least one resource availability, and the priority level. At least one of the plurality of distributed storage and task execution units 36 can communicate at least one of the plurality of partial task results 102 with at least one other of the plurality of distributed storage and task execution units 36. At least one other of the plurality of distributed storage and task execution units 36 generates at least one other of the plurality of partial task results 102 based on the at least one of the plurality of partial task results 102 received from the at least one of the plurality of distributed storage and task execution units 36. The task 94 can include one of: aborted transaction clean up from at least one prior aborted task, a data migration, expired data clean up corresponding to stored data that has expired, a snapshot clean up, an index health check, a segment health check, a scan for missing slices, and a system maintenance task. At least one of the plurality of distributed storage and task execution units 36 can communicate processing resource availability information with at least one other of the plurality of distributed storage and task execution units 36; wherein the processing resource availability information includes at least one of: a current processing utilization, an estimated processing utilization, indication of at least one pending one of the plurality of coordinated partial tasks, a completion forecast for the at least one pending one of the plurality of coordinated partial tasks, and a commencement forecast for at least one non-pending one of the plurality of coordinated partial tasks. At least one of the plurality of distributed storage and task execution units 36 can communicate coordination information with at least one other of the plurality of distributed storage and task execution units 36, wherein the coordination information relates to execution of another plurality of coordinated partial tasks.

The further operation of the dispersed storage network (DSN) system 600, including several optional functions and features can be described in conjunction with the examples that follow.

In an example of coordinating execution of the associated partial tasks, the outbound DST processing 80 receives the task 94 and identifies the task 94 to require co-execution of partial tasks by the set of DST execution units. The identifying includes at least one of receiving a request, performing a lookup, initiating a query, receiving a response, and identifying a time criticality component to the partial tasks of the task 94. The task 94 includes at least one of orphan slice detection, aborted transaction cleanup, data migration, expiration policy cleanup, deleting slices, snapshot cleanup, index health check, segment health check, scanning for missing slices, re-encrypting slices, and other similar maintenance tasks.

The outbound DST processing 80 determines a priority level for the task 94 based on one or more of other currently pending tasks, other expected future tasks, an estimated reliability impact, an estimated performance impact, the requested priority level, and a predetermined priority level. For example, the outbound DST processing 80 determines the priority level for the task 94 to be a higher than average priority level when the estimated performance impact indicates that immediate co-execution of associated partial tasks is required.

Having determined the priority level for the task 94, the outbound DST processing 80 generates a set of coordinated partial tasks based on the task 94 and the priority level such that co-execution of the coordinated partial tasks by the set of DST execution units 36 facilitates generation of the result 104. The outbound DST processing 80 sends the set of coordinated partial tasks and the priority level to the DST execution unit set for coordinated execution. The set of DST execution units determines when to commence execution of the set of coordinated partial tasks based on shared processing resource availability information. The shared processing resource availability information includes one or more of current processing utilization levels, estimated processing utilization levels, a list of pending partial tasks, priority levels of pending partial tasks, and a forecast for when another coordinated partial task can be co-executed by the set of DST execution units 36. For example, the set of DST execution units determines to commence execution of the set of coordinated partial tasks in five seconds when other pending tasks are forecasted to have completed and there are no other higher priority pending tasks.

Having determined went to commence the execution of the set of coordinated partial tasks, the set of DST execution units executes the set of coordinated partial tasks. The execution includes one or more of generating partial results 102, sharing the partial results 102 with other DST execution units 36, and sending the partial results 102 to the inbound DST processing 82. For example, a DST execution unit 36 executes an assigned coordinated partial task to generate a interim partial result 102. Next, the DST execution unit 36 sends the interim partial result 102 to another DST execution unit 36. The other DST execution unit 36 executes its own assigned coordinated partial task using the interim partial result 102 to generate another partial result 102. The inbound DST processing 82 receives partial results 102 from the set of DST execution units 36 and aggregates the partial results 102 to produce the result 104.

Figure 42B:
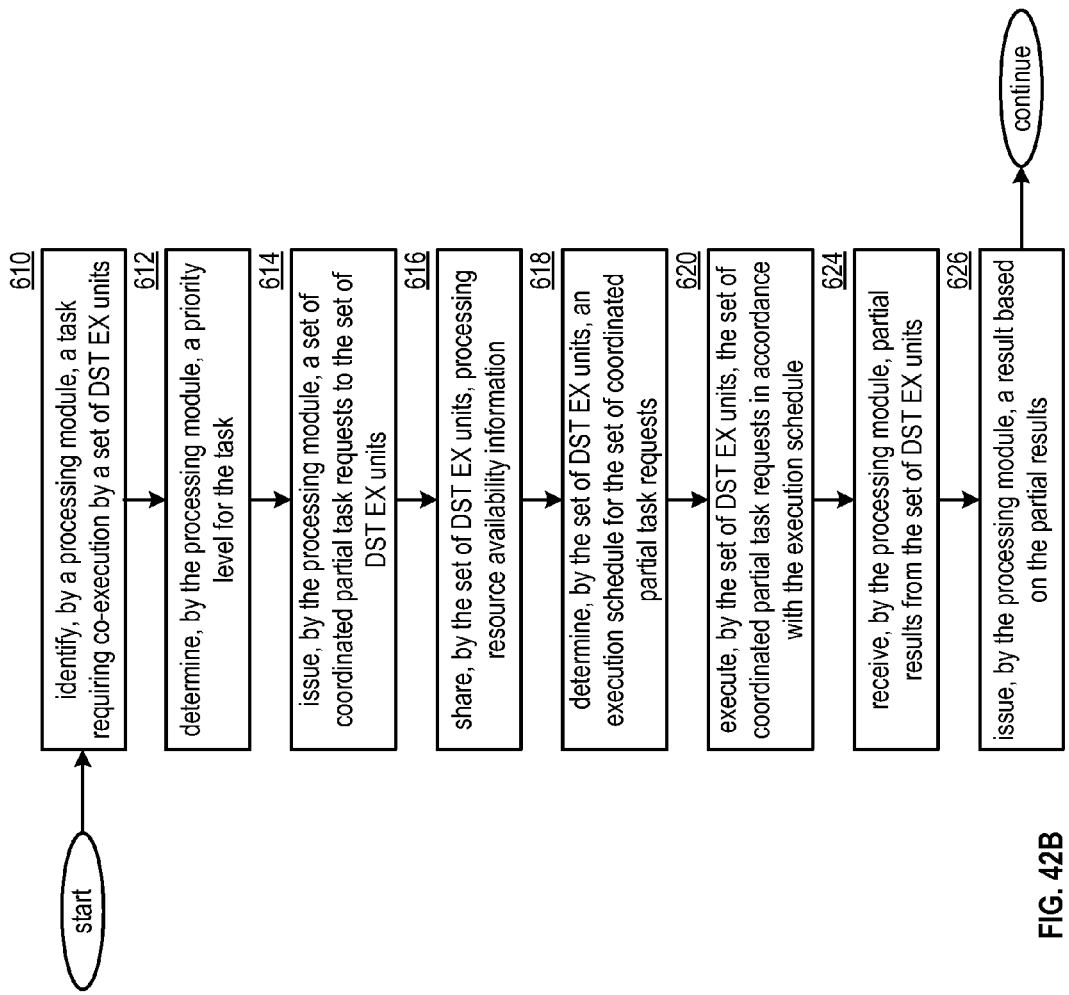
FIG. 42B is a flowchart illustrating an example of coordinating task execution in accordance with the present invention.

FIG. 42B is a flowchart illustrating an example of coordinating task execution. In particular a method is presented for use in conjunction with one or more functions and features described in conjunction with FIGS. 1-39 and also FIGS. 40A, 40B, 41A, 41B, 41C and 42A.

The method includes step 610 where a processing module (e.g., of a distributed storage and task (DST) client module) identifies a task requiring co-execution by a set of DST execution units. The identifying may include one or more of receiving the task, comparing the task to a coordination list, generating a set of partial tasks, and identifying a commonality of the set of partial tasks (e.g., a set of partial tasks associated with a common set of slices stored in the set of DST execution units). The method continues at step 612 where the processing module determines a priority level for the task. The determining may be based on one or more of other currently pending tasks, other expected future tasks, an estimated reliability impact, an estimated performance impact, a requested priority level, and a predetermined priority level.

The method continues at step 614 where the processing module issues a set of coordinated partial task requests to the set of DST execution units. The issuing includes generating the set of coordinated partial tasks based on the task, generating each request to include a coordinated partial task corresponding to the task and the priority level, and sending the set of coordinated partial tasks to the set of DST execution units. The method continues at step 616 where the set of DST execution units share processing resource availability information. For example, from time to time, each DST execution unit generates associated processing resource availability information and outputs the associated processing resource availability information to other DST execution units. Alternatively, timing of the outputting may be based on one or more of a schedule, a request, and a corrugated partial task.

The method continues at step 618 where the set of DST execution units determines an execution schedule for the set of coordinated partial tasks. The determining may be based on the processing resource availability information and the set of coordinated partial tasks. For example, the DST execution units determine to execute the set of coordinated partial tasks when other higher priority tasks are complete. The method continues at step 620 where the set of DST execution units executes the set of coordinated partial task requests in accordance with the execution schedule. For example, each DST execution unit executes its portion of the task by executing a corresponding coordinated partial task to produce a partial result. The execution of the corresponding coordinated partial task may include receiving a partial result from another DST execution unit and utilizing the received partial result to execute the corresponding coordinated partial task. Each DST execution unit sends a resulting partial result to the processing module.

The method continues at step 624 where the processing module receives the partial results from the set of DST execution units. The method continues at step 626 where the processing module issues a result based on a partial results. The issuing includes generating the result based on the set of partial results. For example, the processing module issues a data segment integrity result based on receiving a set of partial results associated with integrity of a set of encoded data slices of the data segment.

Figure 43A:
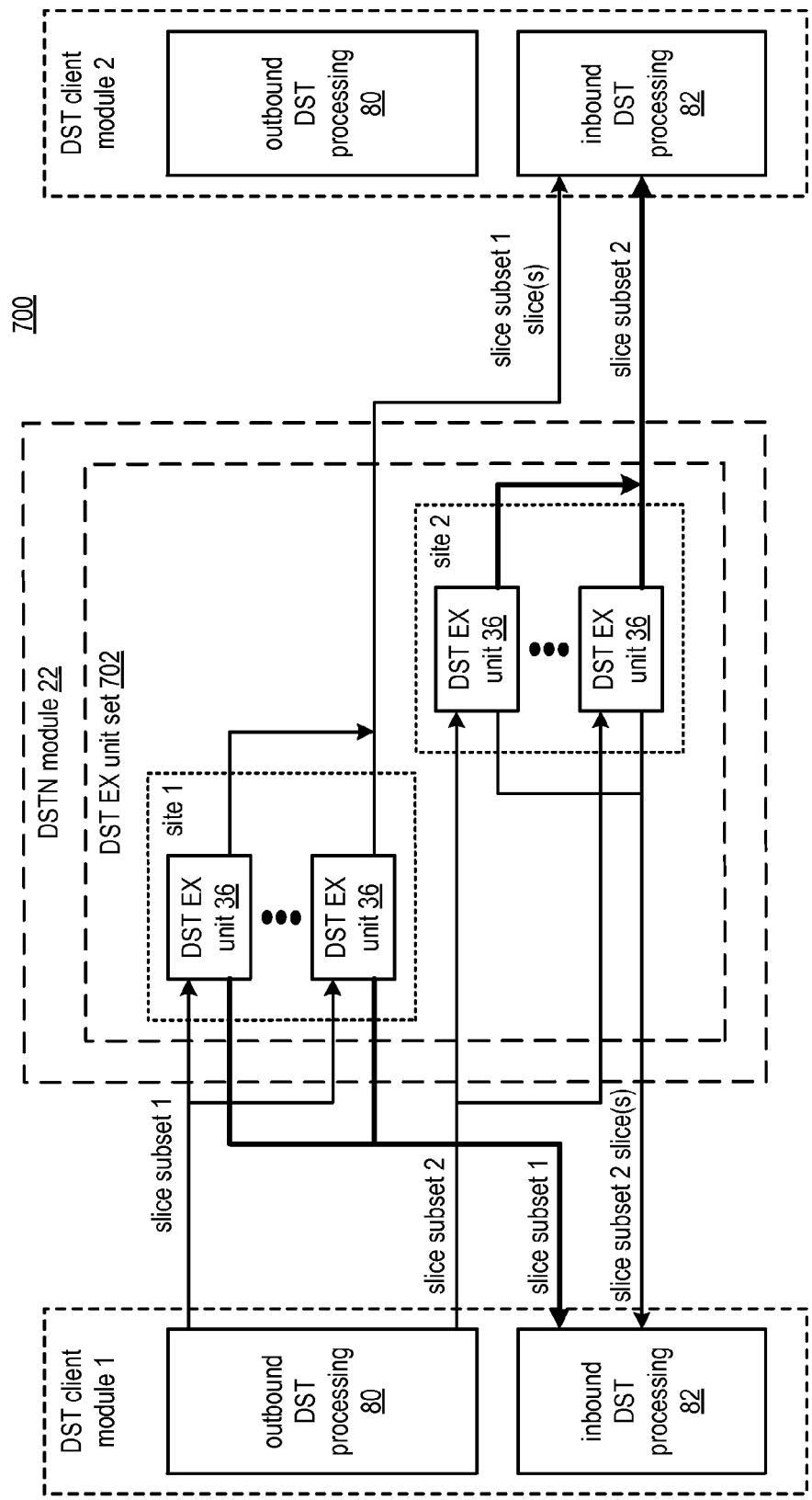
FIG. 43A is a schematic block diagram of another embodiment of a dispersed storage network (DSN) system in accordance with the present invention.

FIG. 43A is a schematic block diagram of another embodiment of a dispersed storage network (DSN) system 700 that includes at least two distributed storage and task (DST) client modules and a distributed storage and task network (DSTN) module 22. The DSTN module 22 includes a DST execution unit set 702. Each DST client module includes the outbound DST processing 80 and the inbound DST processing 82 of FIG. 3. Data is encoded using a dispersed storage error coding function in accordance with dispersal parameters that includes a decode threshold number to produce sets of encoded data slices for storage in the DST execution unit set. The DST execution unit set includes a set of DST execution units 36, where at least a decode threshold number of DST execution units 36 are implemented at a first site and a decode threshold number of other DST execution units are implemented at a second site. Accordingly, the set of DST execution units includes at least twice the number of the decode threshold of DST execution units.

Each DST client module is associated with one site based on an access performance affinity (e.g., lowest access delays compared to other sites) with DST execution units 36 implemented at the one site. For example, a first DST client module is more geographically proximal to the first site than the second site and a second DST client module is more geographically proximal to the second site than the first site. As such, access performance between the first DST client module and DST execution units implemented at the first site is more favorable than access performance between the first DST client module and DST execution units implemented at the second site. Likewise, access performance between the second DST client module and the DST execution units implemented at the second site is more favorable than access performance between the second DST client module and DST execution units implemented at the first site.

In an embodiment, the dispersed storage and task (DST) processing unit 16 includes at least one module, when operable within a computing device, that causes the computing device to perform the following method steps: identifying a plurality of DST client modules (1 and 2) affiliated with data for storage in a DST network; identifying a corresponding subset of a plurality of DST execution units 36 for each of the plurality of DST client modules; encoding the data into a plurality of slices based on at least one dispersal parameter, the number of the plurality of slices corresponding to a number of the plurality of DST execution units 36 included in a superset formed from the union of each subset of a plurality of DST execution units 36 corresponding to each of the plurality of DST client modules, in this fashion a slice is generated for storage in each of a plurality of DST execution units 36 that are included in each DST client module subset; and sending the plurality of slices for storage in the superset of the plurality of DST execution units 36, formed from the union of each subset of the plurality of DST execution units 36.

The method described above in conjunction with the DST processing unit 16 can alternatively be performed by other modules of a dispersed storage network, of a dispersed storage and tracking network or by other devices. In addition, at least one memory section that stores operational instructions that can, when executed by one or more processing modules of one or more computing devices of a dispersed storage network (DSN), cause the one or more computing devices to perform any or all of the method steps described above.

In an embodiment, identifying the corresponding subset of the plurality of DST execution units for each of the plurality of DST client modules includes identifying at least a number of the plurality of DST execution units 36 corresponding to a decode threshold. Identifying the corresponding subset of the plurality of DST execution units 36 for each of the plurality of DST client modules can include identifying ones of the plurality of DST execution units 36 having a favorable access performance level for the corresponding one of the plurality of DST client modules. The at least one dispersal parameter can include at least one of: a number of the plurality of DST execution units 36 corresponding to a decode threshold, a pillar width number that is greater than a multiple (such as two or greater) of the number of the plurality of DST execution units corresponding to a decode threshold. The method can further include attempting retrieval, by one of the plurality of DST client modules, of a first subset of the plurality of slices from the subset of a plurality of DST execution units 36 corresponding to the one of the plurality of DST client modules; determining when the attempted retrieval yields less than a decode threshold number of the plurality of slices; and when the attempted retrieval yields less than the decode threshold number of the plurality of slices, attempting further retrieval from at least one other of the plurality of DST execution units included in the superset formed from the union of each subset of a plurality of DST execution units. The superset formed from the union of each subset of a plurality of DST execution units can include at least one DST execution unit 36 at a plurality of different sites.

The further operation of the dispersed storage network (DSN) system 700, including several optional functions and features can be described in conjunction with the examples that follow.

In an example of storing data, the first DST client module identifies at least one other DST client module affiliated (e.g., expected to subsequently retrieve the data) with data for storage in the DSTN module 22. For instance, the first DST client module identifies the second DST client module. For each of the two or more DST client modules, the first DST client module identifies a subset of DST execution units 36 that includes at least a common decode threshold number of DST execution unit 36, and where the subset of DST execution units 36 is associated with the access performance affinity (e.g., a favorable access performance level) for the affiliated DST client module. The identifying includes at least one of performing a test, initiating a query, performing a lookup, accessing a historical record, and receiving an error message. For example, the first DST client module identifies the DST execution units 36 implemented at site 1 to be affiliated with the first DST client module and identifies the DST execution units 36 implemented at site 2 to be affiliated with the second DST client module based on a performance test.

The first DST client module (e.g., the outbound DST processing 80) encodes the data using the dispersed storage error coding function and the dispersal parameters to produce a set of encoded data slices, where the set of encoded data slices includes a unique subset of at least a decode threshold number of encoded data slices for each DST client module. Accordingly, the dispersal parameters includes a pillar width number that is greater than or equal to a multiple number of common decode threshold numbers. For the example, the pillar width is greater than or equal to 10 when the decode threshold is five and there are two DST client modules. As another example, the pillar width is greater than or equal to 15 when the decode threshold is five and there are three DST client modules. Having encoded the data to produce the set of encoded data slices, the first DST client module sends the set of encoded data slices to the set of DST execution units 36. For instance, a first subset of slices is sent to DST execution units 36 of site 1 and a second subset of slices is sent to DST execution units 36 of site 2.

The data may be retrieved by either of the first or second DST client modules. In an example of retrieving the data by the first DST client module, the inbound DST processing 82 of the first DST client module identifies the DST execution unit set associated with the data (e.g., a directory lookup, a dispersed hierarchical index search). Next, the first DST client module identifies the subset of DST execution units 36 associated with the first DST client module based on the access performance affinity. For instance, the first DST client module identifies the DST execution units 36 implemented at site 1. The first DST client module initiates retrieval of a decode threshold number of encoded data slices from the identified subset of DST execution units 36 at site 1. When the decode threshold number of encoded data slices are not available from the identified subset of DST execution units 36, the first DST client module retrieves one or more further encoded data slices from another subset of DST execution units 36. For example, the first DST client module retrieves the one or more encoded data slices from DST execution units 36 implemented at site 2. When the decode threshold number of encoded data slices are received, the first DST client module decodes the received encoded data slices using the dispersed storage error coding function to reproduce the data.

Figure 43B:
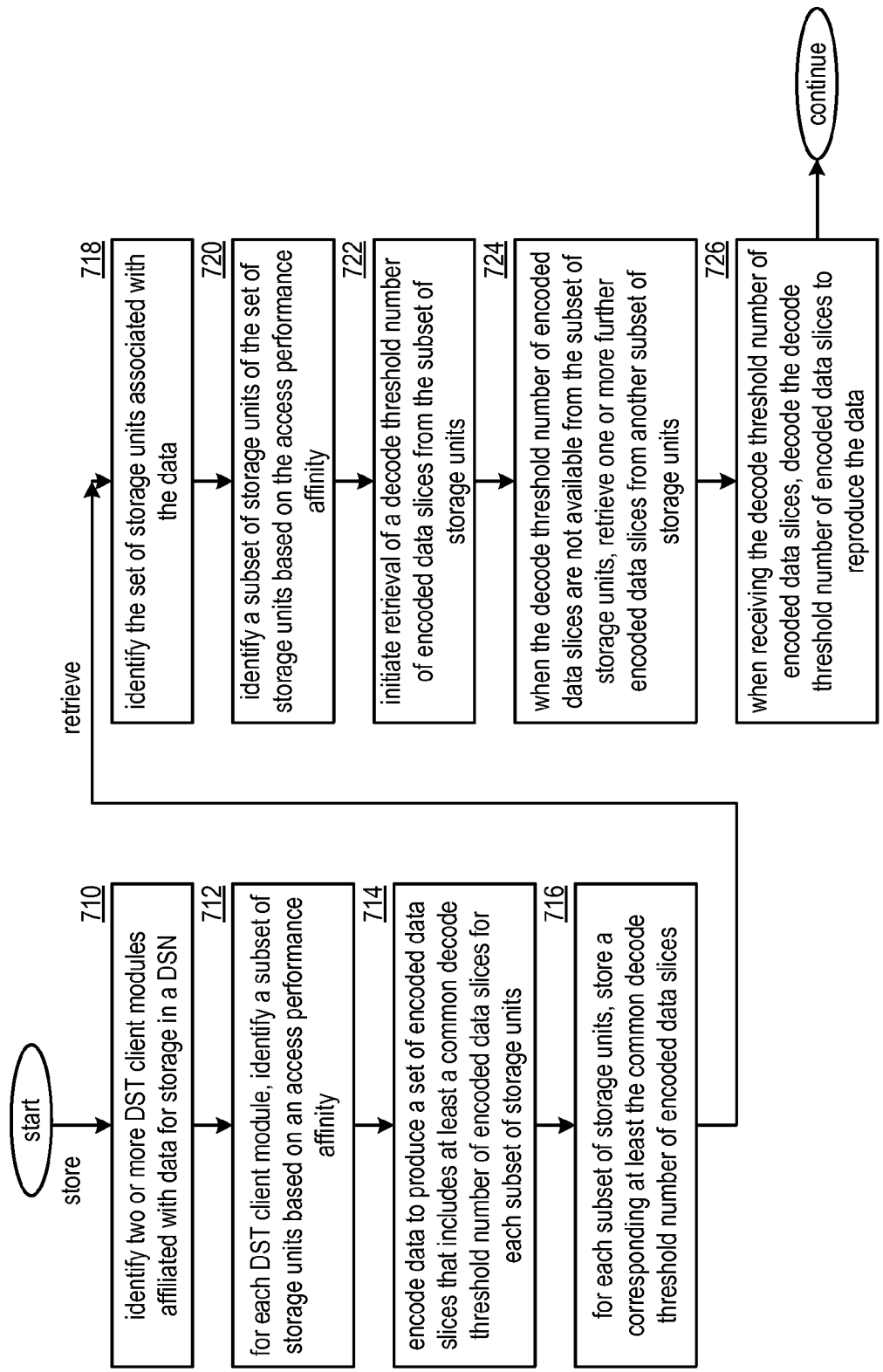
FIG. 43B is a flowchart illustrating an example of accessing data in accordance with the present invention.

FIG. 43B is a flowchart illustrating an example of accessing data. In particular a method is presented for use in conjunction with one or more functions and features described in conjunction with FIGS. 1-39 and also FIGS. 40A, 40B, 41A, 41B, 41C, 42A, 42B and 43A.

The method includes step 710 to store data where a processing module (e.g., of a distributed storage and task (DST) client module) identifies two or more DST client modules affiliated with data for storage in a dispersed storage network (DSN). For each DST client module, the processing module identifies a subset of storage units based on an access performance affinity as shown in step 712. Two or more DST client modules may have an access performance affinity with a common subset of storage units.

The method continues at step 714 where the processing module encodes data to produce a set of encoded data slices that includes at least a common decode threshold number of encoded data slices for each subset of storage units. For each subset of storage units, the method continues at step 716 where the processing module stores a corresponding at least the common decode threshold number of encoded data slices. For example, the processing module stores each unique combination of a decode threshold number of encoded data slices in each subset of storage units.

The method continues at step 718 to retrieve data where the processing module identifies the set of storage units associated with the data. The method continues at step 720 where the processing module identifies a subset of storage units of the set of storage units based on the access performance affinity. The method continues at step 722 where the processing module initiates retrieval of a decode threshold number of encoded data slices from the subset of storage units. For example, the processing module issues a decode threshold number of read slice requests and receives encoded data slices. When the decode threshold number of encoded data slices are not available from the subset of storage units, the method continues at step 724 where the processing module retrieves one or more further encoded data slices from another subset of storage units. The retrieving includes identifying the other subset of storage units based on a next best access performance affinity (e.g., next best compared to the access performance affinity relationship between the DST client module and the subset of storage units). When receiving the decode threshold number of encoded data slices, the method continues at step 726 where the processing module decodes the decode threshold number of received encoded data slices to reproduce the data.

Figure 44B:
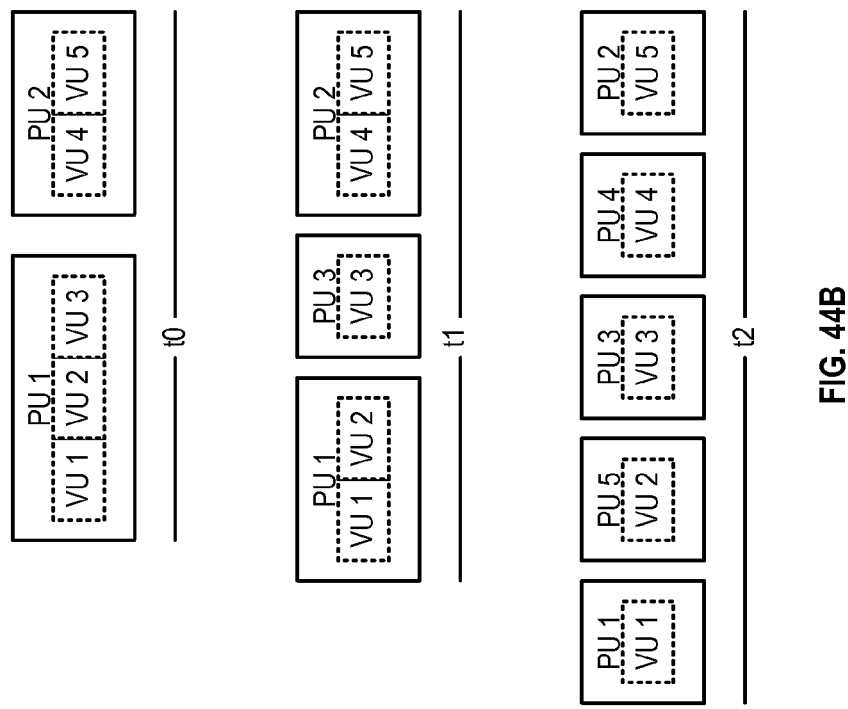
FIG. 44B is a diagram illustrating an example of a migration of virtual storage units within physical storage units in accordance with the present invention.
Figure 44A:
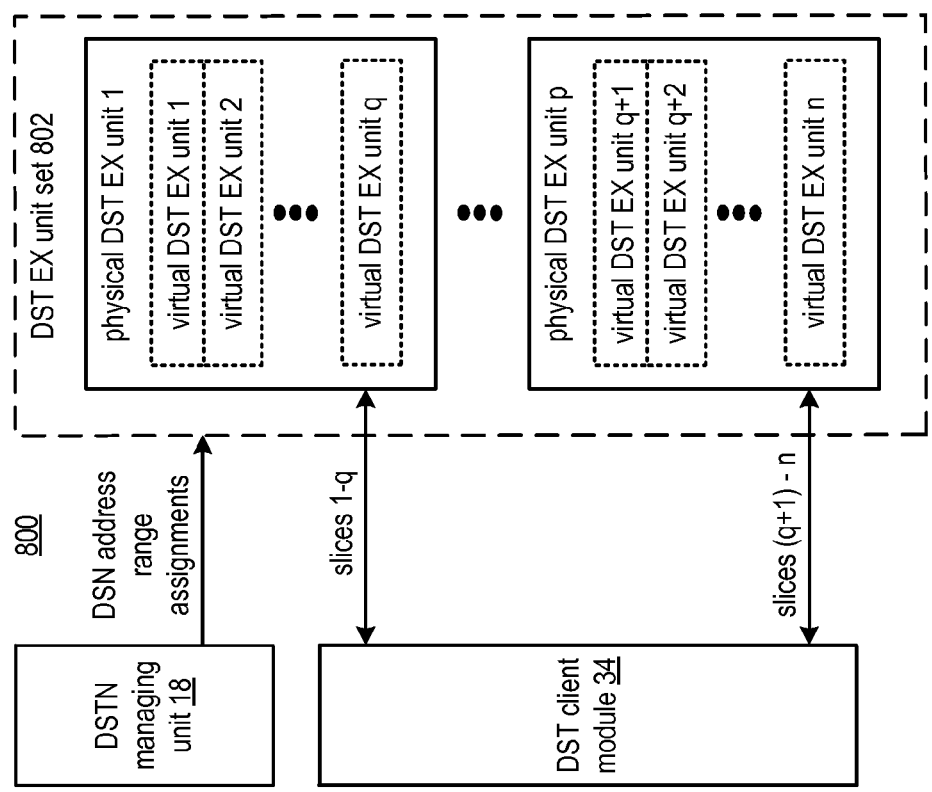
FIG. 44A is a schematic block diagram of another embodiment of a distributed computing system in accordance with the present invention.

FIG. 44A is a schematic block diagram of another embodiment of a distributed computing system 800 that includes a distributed storage and task network (DSTN) managing unit 18, a DST client module 34, and a DST execution unit set 802. The DST execution unit set includes one or more physical DST execution units 1-p. Each physical DST execution unit includes one or more virtual DST execution units of a set of virtual DST execution units 1-n. A virtual DST execution unit includes a logical implementation of functions of the DST execution unit 36 of FIG. 1. Each virtual DST execution unit is associated with a DSN address range assignment with regards to accessing encoded data slices associated with slice names that fall within the DSN address range assignment.

The DSTN managing unit 18 determines the DSN address ranges in accordance with storage capacity and processing capability of the physical DST execution units and forecasted storage loading and task processing loading. For example, the DSTN managing unit 18 assigns virtual DST execution units 1-3 to physical DST execution unit 1 when the storage capacity of the physical DST execution unit is greater than the forecasted storage loading for the three virtual DST execution units. As another example, the DSTN managing unit 18 assigns virtual DST execution units 4-5 to physical DST execution unit 2 when the processing capability of the physical DST execution unit 2 is greater than the forecasted task processing loading for the two virtual DST execution units.

The DSTN managing unit 18 issues DSN address range assignments to the physical DST execution units to establish the DSN address range assignment association with each virtual DST execution unit of each physical DST execution unit. For example, at a first timeframe t0, the DSTN managing unit 18 issues the DSN address range assignments to assign three pillars of a common DSN address range to virtual DST execution units 1-3 of physical DST execution unit 1. For instance, a pillar 1 slices of the common DSN address range are assigned to virtual DST execution unit 1, pillar 2 slices of the common DSN address range are assigned to virtual DST execution unit 2, and pillar 3 slices of the common DSN address range are assigned to virtual DST execution unit 3. As another example, at the first timeframe t0, the DSTN managing unit 18 issues additional DSN address range assignments to assign to more pillars of the common DSN address range to virtual DST execution units 1-2 of physical DST execution unit 2.

The DST client module 34 may access the DST execution unit set in accordance with the DSN address range assignments to access encoded data slices stored within a set of virtual DST execution units. For example, the DST client module 34 sends an access request for pillars 1-3 of the common DSN address range to the physical DST execution 1 and sends remaining access requests for pillars 4-5 to physical DST execution unit 2 to access a set of encoded data slices associated with virtual DST execution units 1-3 within the physical DST execution unit 1 and virtual DST execution units 4-5 associated with physical DST execution unit 2.

In an example of operation, the DSTN managing unit 18 receives a request to commission a set of storage units for a DSN address range. The DSTN managing unit 18 identifies one or more physical storage units for the commissioning based on one or more of a manager input, storage unit availability information, a request, and a query response. The DSTN managing unit 18 determines capability level information for each of the one or more physical storage units. The capability level information includes one or more of available storage capacity, available task processing capability, current utilization levels, and forecasted utilization levels. The determining may be based on one or more of registry information, monitoring activity, performing a test, initiating a query, and receiving information.

The DSTN managing unit 18 determines mapping information (e.g., storage DSN address range, processing DSN address range) of a set of virtual storage units to the one or more physical storage units in accordance with the capability level information. The DSTN managing unit 18 issues DSN address range assignments to the one or more physical storage units that includes the mapping information.

When identifying an additional physical storage unit, the DSTN managing unit 18 determines updated mapping information based on updated capability level information. The DSTN managing unit 18 issues updated DSN address range assignments to update the one or more physical storage units that includes the updated mapping information. An example of updating assignment of virtual storage units to physical storage units is discussed in greater detail with reference to FIG. 44B.

FIG. 44B is a diagram illustrating an example of a migration of virtual storage units within physical storage units that includes mapping information of a set of virtual storage units (VU 1-5) to one or more physical storage units (PU 1-5). At a first timeframe t0, there are two available physical storage units to provide required storage capacity and task processing capacity. An initial mapping includes assignment of virtual storage units 1-3 to physical storage unit 1 and assignment of virtual storage units 4-5 physical storage unit 2.

At a second timeframe t1, there is an additional physical storage unit available to provide a total of three physical storage units. A next mapping includes assignment of virtual storage units 1-2 to physical storage unit 1, virtual storage unit 3 to physical storage unit 3 (e.g., virtual storage unit 3 slices are migrated to storage unit 3), and virtual storage units 4-5 remain mapped to physical storage unit 2 (e.g., not requiring slice migration).

At a third timeframe t2, there are two more additional physical storage units available to provide a total of five physical storage units. A next mapping includes assignment of one virtual storage unit to one physical storage unit. As a result, slices associated with virtual storage unit 2 are moved from physical storage unit 1 to physical storage unit 5, slices associated with virtual storage unit 4 are moved from virtual storage unit 2 to physical storage unit 4.

FIG. 44C is a flowchart illustrating an example of commissioning storage units. The method includes step 810 where a processing module (e.g., of a distributed storage and task network (DSTN) managing unit) receives a request to commission a set of storage units for a dispersed storage network (DSN) address range. The request includes one or more of the DSN address range, dispersal parameters (e.g., a pillar width number), identities of candidate physical storage units, forecasted storage loading levels, and forecasted task processing loading levels.

The method continues at step 812 where the processing module identifies one or more physical storage units to associate with the DSN address range. The method continues at step 814 where, for each physical storage unit, the processing module determines capability level information. The method continues at step 816 where the processing module determines mapping information for mapping the DSN address range to the one or more physical storage units in accordance with the capability level information. The determining includes identifying a pillar width number of DSN address sub-ranges (e.g., by pillar number) of the DSN address range. For each physical storage unit, the processing module allocates a storage DSN address sub-range and a processing DSN address sub-range of the DSN address range based on the capability level information of the one or more physical storage units. For each storage DSN address sub-range, the processing module allocates one or more DSN address sub-ranges. For each processing DSN address sub-range, the processing module allocates one or more of the DSN address sub-ranges.

The method continues at step 818 where the processing module issues DSN address range assignments for the one or more physical storage units that includes the mapping information. When identifying an additional physical storage unit, the method continues at step 820 where the processing module determines updated mapping information based on updated capability level information. For example, the processing module detects the additional physical storage unit based on receiving a message. As another example, the processing module initiates updating capability level information (e.g., capability levels may have changed for one or more of the storage units).

The method continues at step 822 where the processing module issues updated DSN address range assignments to update one or more physical storage units that includes the updated mapping information. For example, the processing module sends the updated DSN address range assignments to each physical storage unit. As another example, the processing module sends the updated DSN address range assignments to physical storage units associated with changes between the mapping information and the updated mapping information. Alternatively, or in addition to, the processing module facilitates migrating the encoded data slices from a first physical storage unit to a second physical storage unit when a virtual storage unit has been reassigned from the first physical storage unit to the second physical storage unit as a result of the updated mapping information.

Figure 45B:
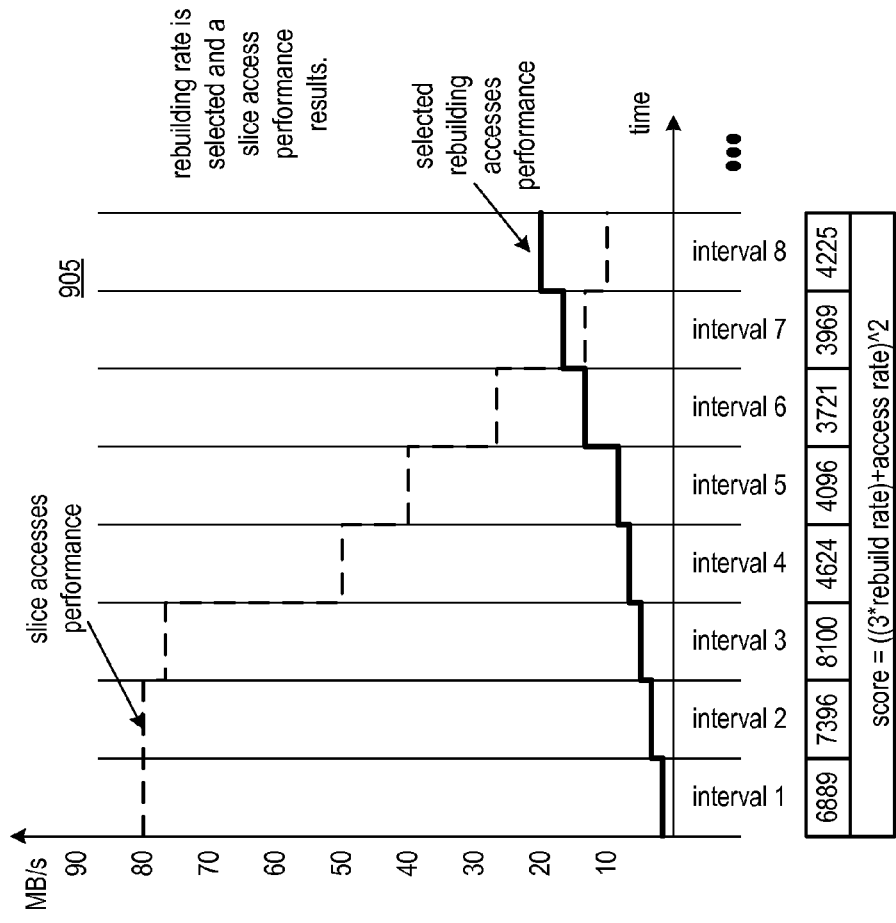
FIG. 45B is a timing diagram illustrating an example of access performance in accordance with the present invention.
Figure 45A:
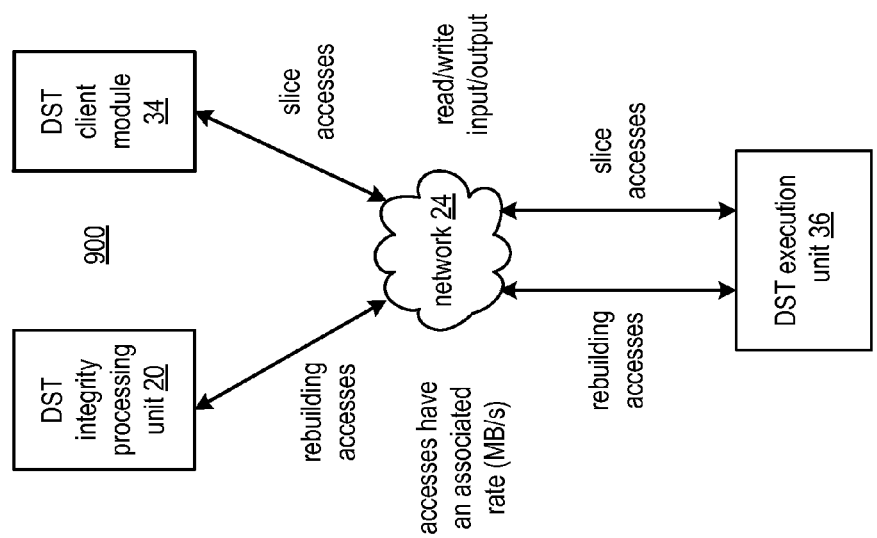
FIG. 45A is a schematic block diagram of another embodiment of a dispersed storage network (DSN) system in accordance with the present invention.

FIG. 45A is a schematic block diagram of another embodiment of a dispersed storage network (DSN) system 900 that includes the distributed storage and task (DST) integrity processing unit 20, the DST client module 34, the network 24, and the DST execution unit 36 of FIG. 1. Alternatively, the DST integrity processing unit 20 may be implemented as the DST execution unit 36. The DST client module 34 may be implemented as the user device 12 or the DST processing unit 16 of FIG. 1.

The DST integrity processing unit 20 issues rebuilding access requests via the network 24 to the DST execution unit 36 to facilitate rebuilding the one or more encoded data slices associated with a slice error. The rebuilding access requests include one or more of a list range request, a list digest of a range request, a read slice request, a write rebuilt slice request. Substantially simultaneously, the DST client module 34 issues slice access requests via the network 24 to the DST execution unit 36 with regards to accessing encoded data slices stored in the DST execution unit 36. The slice access requests include at least one of a read request, a write request, a delete request, and a list request. A rate of the rebuilding access requests may be associated with a controlled rate (e.g., by the DST integrity processing unit 20) of rebuilding encoded data slices based on a rate of detecting the slice errors. A rate of the slice access requests may be associated with a rate of accessing by a plurality of DSN users.

The DST execution unit 36 may be associated with an overall access rate to accommodate both the rebuilding access requests and the slice access requests. As such, the DST execution unit may accommodate more rebuilding access requests when there are fewer slice access requests or may accommodate more slice access requests when there are fewer rebuilding access requests. Accordingly, when the DST integrity processing unit 20 establishes the rate for the rebuilding access requests, a resulting rate of slice access requests may be realized (e.g., roughly as a difference between the overall access rate minus the established rate for the rebuilding access requests).

The DST integrity processing unit 20 determines the rate for the rebuilding access requests to achieve the desired rebuilding access request rate and a resulting acceptable rate of the slice access requests. As an example, the DST integrity processing unit 20 detects resulting slice access performance rates for a corresponding selected rebuilding access performance rates to produce scoring information. When adjusting the rate for the rebuilding access request, the DST integrity processing unit selects the rate for the rebuilding access requests based on a desired rate of slice access requests in accordance with the scoring information. From time to time, the DST integrity processing unit 20 updates the scoring information based on observed rates of slice access requests for corresponding selected rates for the rebuilding access requests. Such scoring information is discussed in greater detail with reference to FIG. 45B.

FIG. 45B is a timing diagram illustrating an example 905 of access performance that includes a graphical indication of resulting slice access performance levels (e.g. megabytes per second) for selected rebuilding access performance levels (e.g., megabytes per second) for a series of time intervals 1-8, and a resulting set of scores for the set of time intervals. The score may be generated based on a function of slice access performance rate and slice rebuilding access rate. For example, the score may be calculated in accordance with a scoring formula: score=$((3*\text{rebuild rate})+\text{access rate})^2$.

For a given selected rebuilding rate, an associated score may be subsequently updated in accordance with a learning rate function when an updated corresponding slice access rate is measured for the given selected rebuilding rate. For example, the associated score may be subsequently updated in accordance with a learning rate function formula of: updated score=(old score)*(1-learning rate)+(new score*learning rate). For instance, updated score=81=80*(1−0.1)+(90*0.1), when the learning rate is 10%, the old score is 80, and the new score is 90.

Figure 45C:
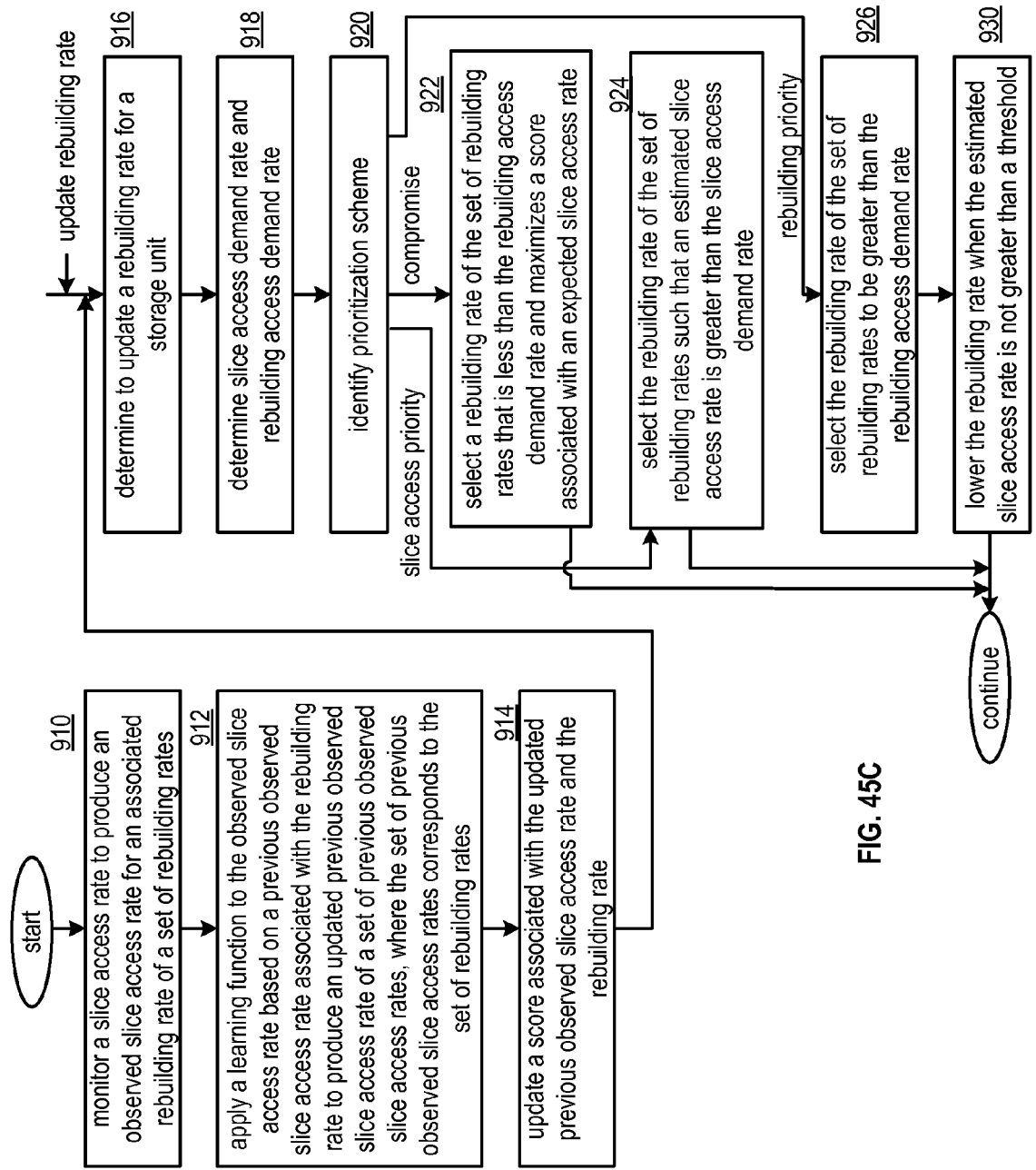
FIG. 45C is a flowchart illustrating an example of prioritizing access rates in accordance with the present invention.

FIG. 45C is a flowchart illustrating an example of prioritizing access rates. The method includes step 910 where a processing module (e.g., of a distributed storage and task (DST) integrity processing unit) monitors a slice access rate to produce an observed slice access rate for an associated rebuilding rate of a set of rebuilding rates. The monitoring includes at least one of performing a test, initiating a query, and receiving access rate information.

The method continues at step 912 where the processing module applies a learning function to the observed slice access rate based on a previous observed slice access rate associated with the rebuilding rate to produce an updated previous observed slice access rate of a set of previous observed slice access rates, where the set of previous observed slice access rates corresponds to the set of rebuilding rates. The method continues at step 914 where the processing module updates a score associated with the updated previous observed slice access rate and the rebuilding rate.

In an example of updating a rebuilding rate, the method continues at step 916 where the processing module determines to update the rebuilding rate for a storage unit. The determining may be based on one or more of detecting an end of a time interval, receiving a request, receiving an error message, and detecting an unfavorable slice access rate. The method continues at step 918 where the processing module determines slice access demand rate and rebuilding access demand rate. The determining may be based on one or more of interpreting a queue, receiving a request, and accessing a historical record.

The method continues at step 920 where the processing module identifies a prioritization scheme of one of a slice access priority scheme, a compromise scheme, and a rebuilding priory scheme. The identifying may be based on one or more of a predetermination, detecting that a demand rate is much greater than a demand threshold level, and receiving a request. For example, the processing module selects the slice access priority scheme when the slice access demand rate is much greater than the rebuilding access demand rate. As another example, the processing module selects the rebuilding priory scheme when the rebuilding access demand rate is much greater than the slice access demand rate. As yet another example, the processing module selects the compromise scheme when the slice access demand rate and the rebuilding access demand rate are similar.

When the processing module selects the compromise prioritization scheme, the method continues at step 922 where the processing module selects a rebuilding rate of the set of rebuilding rates that is less than the rebuilding access demand rate and maximizes a score associated with an expected slice access rate. The selecting may be based on one or more of accessing a table, accessing a record, and calculating the rebuilding rate. When the processing module selects the slice access priority scheme, the method continues at step 924 where the processing module selects the rebuilding rate of the set of rebuilding rates such that an estimated slice access rate is greater than the slice access demand rate. For example, the processing module selects the rebuilding rate from the scoring information such that the rebuilding rate is associated with a slice access rate that is greater than the slice demand rate. When the processing module selects the rebuilding priory scheme, the method continues at step 926 where the processing module selects the rebuilding rate of the set of rebuilding rates to be greater than the rebuilding access demand rate. For example, the processing module selects the rebuilding rate to be just greater than a rebuilding rate of the scoring information. The method continues at step 930 where the processing module lowers the rebuilding rate when the estimated slice access rate is not greater than a threshold. For example, the processing module determines the threshold based on a slice access demand rate and a minimum difference.

FIGS. 46A-B are diagrams illustrating examples 1000 and 1005 of modifying scoring information that includes scoring information at two time frames. The scoring information includes an association of values of a set of rebuilding rates (RR), a set of slice access rates (SAR), and a set of scores (SCR) (e.g., score=$((3*\text{rebuild rate})+\text{slice access rate})^2$). Initial scoring information is represented for a time frame 10 and updated scoring information is represented for a subsequent timeframe 11. The updating of the scoring information is updated in accordance with a score updating scheme.

In particular, FIG. 46A represents an example 1000 when the scoring updating scheme includes updating slice access rates and scores when an observed slice access rate is greater than a previous observed slice access rate for a given rebuilding rate. For example, for a rebuilding rate of 8 MB per second, the observed slice access rate is 79 for timeframe T 11 and the previous observed slice access rate is 40 MB per second at timeframe T 10. The entry for the slice access rate corresponding to the rebuilding rate of 8 MB per second is updated from 40 MB per second to 79 MB per second. Accordingly, the score is updated as well from 4,096 to 10,609. The slice access rate entries for rebuilding rates of 6 MB per second and 4 MB per second are also updated to 79 MB per second since corresponding slice access rates at timeframe T 10 were less than 79 MB per second. Accordingly, scores associated with the rebuilding rates of 4 MB per second and 6 MB per second of T 11 are updated.

FIG. 46B represents another example 1005 when the scoring updating scheme includes updating slice access rates and scores when the observed slice access rate is less than the previous observed slice access rate for the given rebuilding rate. For example, for a rebuilding rate of 6 MB per second, the observed slice access rate is 7 for timeframe T 11 and the previous observed slice access rate is 50 MB per second at timeframe T 10. The entry for the slice access rate corresponding to the rebuilding rate of 6 MB per second is updated from 50 MB per second to 7 MB per second. Accordingly, the score is updated as well from 4,624 to 625. The slice access rate entries for rebuilding rates of 8 MB per second, 12 MB per second, and 16 MB per second are also updated to 7 MB per second since corresponding slice access rates at timeframe T 10 were greater than 7 MB per second. Accordingly, scores associated with the rebuilding rates of 8 MB per second, 12 MB per second, and 16 MB per second of T 11 are updated. The method of operation is discussed in greater detail with reference to FIG. 46C.

FIG. 46C is a flowchart illustrating an example of updating scoring information, which includes similar steps to FIG. 45C. The method begins with step 1010 where a processing module (e.g., of a distributed storage and task (DST) integrity processing unit) monitors a slice access rate to produce an observed slice access rate for an associated rebuilding rate of a set of rebuilding rates and applies a learning function to the observed slice access rate to produce an updated previous observed slice access rate as shown in step 1012. When the updated observed slice access rate is greater than the previous observed slice access rate for the rebuilding rate, the method continues to step 1014 where the processing module updates any remaining previous observed slice access rates that are lower than the updated previous observed slice access rate and are associated with another rebuilding rate that is less than the rebuilding rate (e.g., FIG. 46A example). When the updated observed slice access rate is less than the previous observed slice access rate for the rebuilding rate, the method continues at the step 1016 where the processing module updates any remaining previous observed slice access rates that are greater than the updated previous observed slice access rate and are associated with another rebuilding rate that is greater than the rebuilding rate (e.g., FIG. 46B example). The method continues at step 1018 where the processing module updates a score associated with the updated previous observed slice access rate.

FIG. 47A is a diagram illustrating another example 1100 of modifying scoring information that includes scoring information at three time frames. The scoring information includes an association of values of a set of rebuilding rates (RR), a set of slice access rates (SAR), and a set of scores (SCR). Initial scoring information is represented for a time frame T 20 and updated scoring information is represented for subsequent timeframes T 21 and T 22. The updating of the scoring information is updated in accordance with a score updating scheme, where a formula to generate the score may be updated for each timeframe based on rebuilding activity. The rebuilding activity may include scanning storage of encoded data slices to detect one or more storage errors associated with the encoded data slices. A measure of rebuilding activity includes identifying when a particular DSN address range associated with the encoded data slices has been scanned for slice errors. Periodic scanning for errors may be desired to quickly identify and resolve slice errors. As time goes on, and a particular DSN address range has not been scanned for errors, the formula to generate the score may be updated to facilitate a more timely scanning for slice errors.

In particular, the scoring information at timeframe T 20 may include generating the scores using a formula of: score=((rebuild rate)$^{2.5}$+(slice access rate)$^{2.5}$). As such, similar priority is given to both rebuilding (e.g., scanning) and slice access for routine reads and writes of data. As time goes on, and the particular DSN address range has not been scanned, the scoring formula may be updated to a formula of: score=((rebuild rate)$^{3}$+(slice access rate)$^{2}$). As such, for higher priority is associated with rebuilding and lower priority is associated with slice access for the routine reads and writes of the data. As time goes on, and the particular DSN address range has not been scanned, the scoring formula may be further updated to a formula of: score=((rebuild rate)$^{3.5}$+(slice access rate)$^{1.5}$). As such, an even higher priority is associated with rebuilding and an even lower priority is associated with slice access for the routine reads and writes of the data. Once the particular DSN address range has been scanned, the scoring formula may be returned back to the initial formula: score=((rebuild rate)$^{2.5}$+(slice access rate)$^{2.5}$) when the similar priority is desired. The method of operation is discussed in greater detail with reference to FIG. 47B.

FIG. 47B is a flowchart illustrating another example of updating scoring information, which includes similar steps to FIG. 45C. The method includes step 1110 where a processing module (e.g., of a distributed storage and task (DST) integrity processing unit) determines to update scoring information that includes a set of rebuilding rates, a set of slice access rates, and a corresponding set of scores. The determining may be based on one or more of a time frame has elapsed since a last update, interpreting a schedule, receiving an error message, and detecting that a rate of rebuilding is less than a desired rate of rebuilding (e.g., rebuilding is falling behind).

The method continues at step 1112 where the processing module determines whether a dispersed storage network (DSN) address range associated with the scoring information has been scanned since a last scoring information update. The determining may be based on one or more of receiving an error message, interpreting a schedule, initiating a query, and receiving a query response. When the processing module determines that the DSN address range associated with the scoring information has not been scanned since the last scoring information update, the method branches to step 1116 where the processing module biases for rebuilding. When the processing module determines that the DSN address range associated with the scoring information has been scanned since the last scoring information update, the method continues to step 1114. The method continues at step 1114 where the processing module uses defaults for an updating scoring function. For example, the processing module resets exponents on rebuilding rate and on slice access rate to defaults within a scoring formula. The method branches to step 1118 where the processing module updates the set of scores.

When the processing module determines that the DSN address range associated with the scoring information has not been scanned since the last scoring information update, the method continues at step 1116 where the processing module biases the rebuilding in the updated scoring function. For example, the processing module raises an exponent on the rebuilding rate and lowers the exponent on the slice access rate of the scoring formula.

The method continues at step 1118 where the processing module updates a set of scores based on the updated scoring function. For example, the processing module calculates the scoring formula on the set of scores using the updated scoring function. The method continues with steps 1120, 1122 and 1124, which are similar to steps 916, 918 and 922 of FIG. 45C where the processing module determines to update a rebuilding rate for a storage unit, determine slice access demand rate and rebuilding access demand rate, and selects a rebuilding rate of the set of rebuilding rates that is less than the rebuilding access demand rate and maximizes a score associated with an expected slice access rate.

Figure 48:
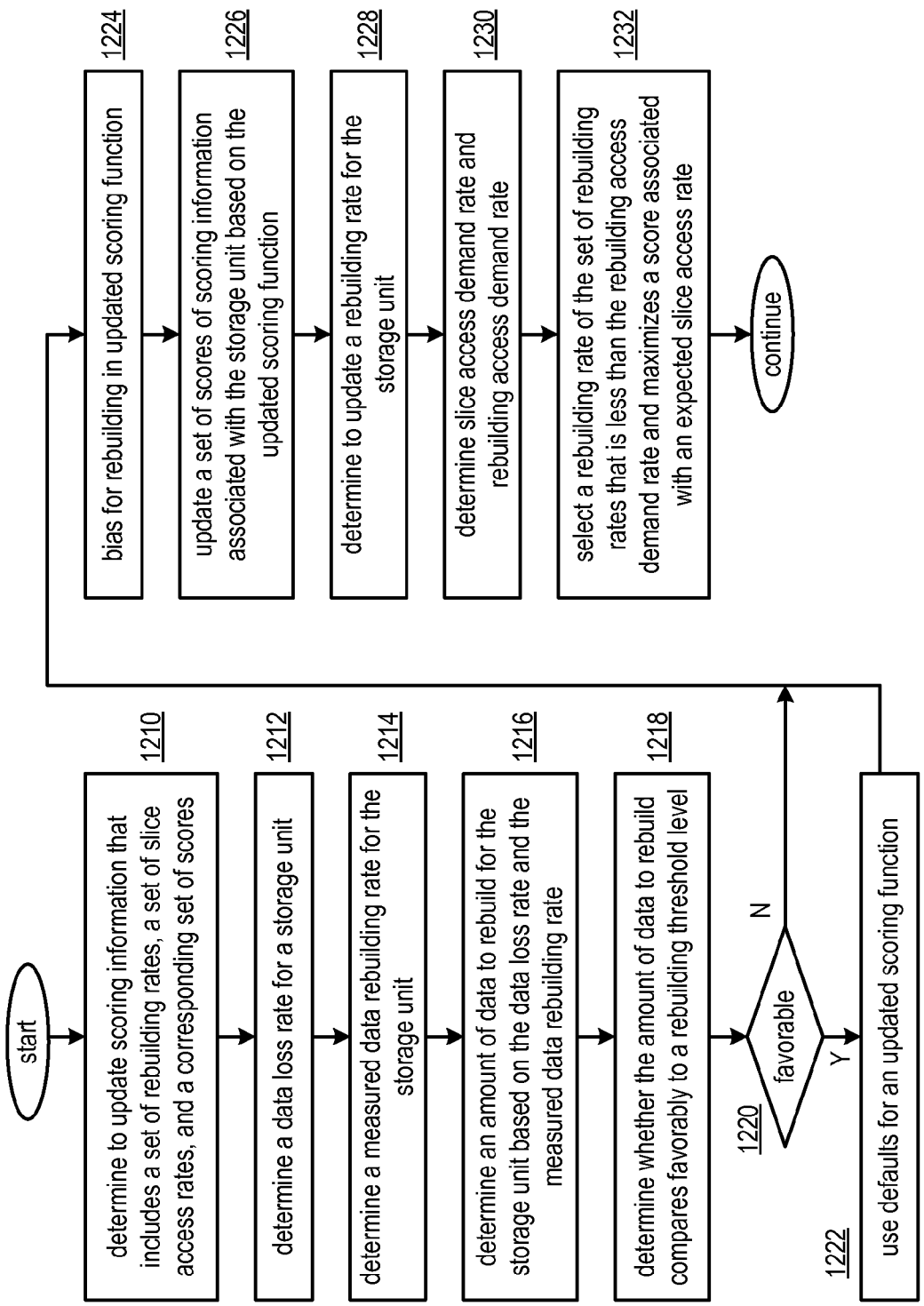
FIG. 48 is a flowchart illustrating another example of updating scoring information in accordance with the present invention.

FIG. 48 is a flowchart illustrating another example of updating scoring information, that includes similar steps to FIGS. 45C and 47B. The method includes step 1210 where a processing module (e.g., of a distributed storage and task (DST) integrity processing unit) determines to update scoring information that includes a set of rebuilding rates, a set of slice access rates, and a corresponding set of scores. The method continues at step 1212 where the processing module determines a data loss rate for a storage unit. The determining may be based on one or more of receiving an error message, initiating a query, receiving a query response, and measuring the data loss rate.

The method continues at step 1214 where the processing module determines a measured data rebuilding rate for the storage unit. The determining includes at least one of interpreting a rebuilding schedule, initiating a query, receiving a query response, and measuring the data rebuilding rate. The method continues at step 1216 where the processing module determines an amount of data to rebuild for the storage unit based on the data loss rate and the measured data rebuilding rate. The determining includes calculating a difference between integrated data loss rate over time and integrated measured data rebuilding rate over time.

The method continues at step 1218 where the processing module determines whether the amount of data to rebuild compares favorably to a rebuilding threshold level. The determining includes indicating unfavorable when the amount of data to rebuild is greater than the rebuilding threshold level. The method branches via decision block 1220 to step 1224 where the processing module biases for rebuilding when the amount of data to rebuild compares unfavorably to the rebuilding threshold level. The method continues to step 1222 when the processing module determines that the amount of data to rebuild compares favorably to the rebuilding threshold level. The method continues with step 1222 of FIG. 47B when the processing module determines that the amount of data to rebuild compares favorably to the rebuilding threshold level where the processing module uses defaults for an updated scoring function.

The method continues with the 1224 and 1226 where the processing module biases for rebuilding in updated scoring function and updates a set of scores of scoring information associated with a storage unit based on the updated scoring function. The method continues with steps 1228, 1230 and 1232 where the processing module determines to update a rebuilding rate for the storage unit, determines slice access demand rate and rebuilding access demand rate, and selects a rebuilding rate of the set of rebuilding rates that is less than the rebuilding access demand rate and maximizes a score associated with an expected slice access rate.

FIG. 49 is a flowchart illustrating another example of updating scoring information, which includes similar steps to FIG. 45C. The method includes step 1310 where a processing module (e.g., of a distributed storage and task (DST) integrity processing unit), when detecting one or more slice errors during rebuilding scanning, prioritizes completion of the rebuilding scanning for a dispersed storage network (DSN) address range over rebuilding one or more encoded data slices associated with the one or more slice errors. The detecting includes scanning for slice errors within an allowed rebuilding rate. For each slice error of an encoded data slice, the method continues at step 1312 where the processing module identifies any other slice errors of other encoded data slices where a set of encoded data slices includes the encoded data slice and the other encoded data slices. The determining includes identifying multiple errors per set of slices of a data segment (e.g., more unreliable when more errors per set of encoded data slices are identified).

For each data object, the method continues at step 1314 where the processing module determines a storage reliability level based on associated one or more slice errors and corresponding other slice errors. The determining includes using a statistical model based on failure rates and current rebuild rates. The method continues at step 1316 where the processing module updates a set of scores based on the storage reliability level, where scoring information includes the set of scores, a set of rebuilding rates, and a set of slice access rates. For example, the processing module updates a scoring function to add emphasis to rebuilding when the reliability level is below a low reliability level threshold. As another example, the processing module reduces emphasis on rebuilding when the reliability level is above a high reliability level threshold. The method continues with steps 1318, 1320 and 1322 where the processing module determines to update a rebuilding rate for a storage unit, determine slice access demand rate and rebuilding access demand rate, and selects a rebuilding rate of the set of rebuilding rates that is less than the rebuilding access demand rate and maximizes a score associated with an expected slice access rate.

It is noted that terminologies as may be used herein such as data, bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
encoding a data segment of input data into a plurality of encoded data slices;
sending the plurality of encoded data slices to a plurality of distributed storage and task execution units for storage, the plurality of distributed storage and task execution units being located at a plurality of sites;
detecting a storage failure corresponding to at least one of the plurality of encoded data slices corresponding to at least one of the plurality of the distributed storage and task execution units;
determining a performance optimized mode or a reliability optimized mode as a foster storage approach;
selecting at least one alternative distributed storage and task execution unit in accordance with the foster storage approach;
generating at least one foster encoded data slice corresponding to the at least one of the plurality of encoded data slices; and
sending the at least one foster encoded data slice to the at least one alternative distributed storage and task execution unit.

2. The method of claim 1 wherein, when the foster storage approach corresponds to the performance optimized mode, the at least one alternative distributed storage and task execution unit is located in at least one of the plurality of sites.

3. The method of claim 1 wherein, when the foster storage approach corresponds to the reliability optimized mode, the at least one alternative distributed storage and task execution unit is located in at an alternative site than the plurality of sites.

4. The method of claim 1 further comprising:
updating slice location information corresponding to the data segment of the input data when the at least one foster encoded data slice is successfully stored in the at least one alternative distributed storage and task execution unit.

5. The method of claim 1 wherein detecting a storage failure corresponding to at least one of the plurality of encoded data slices includes at least one of: detecting at least one device failure in the at least one of the plurality of the distributed storage and task execution units; and detecting at least one communication failure to the at least one of the plurality of the distributed storage and task execution units.

6. The method of claim 1 wherein the foster storage approach is determined based on at least one of: a predetermined mode selection; a vault identifier, a data type corresponding to the input data, an estimated time of storage of the input data, an estimated frequency of retrieval of the input data, a reliability requirement of the input data, and a retrieval performance requirement of the input data.

7. A dispersed storage and task (DST) processing unit comprises:
at least one module, when operable within a computing device, that causes the computing device to:
encode a data segment of input data into a plurality of encoded data slices;
send the plurality of encoded data slices to a plurality of distributed storage and task execution units for storage, the plurality of distributed storage and task execution units being located at a plurality of sites;
detect a storage failure corresponding to at least one of the plurality of encoded data slices corresponding to at least one of the plurality of the distributed storage and task execution units;
determine a performance optimized mode or a reliability optimized mode as a foster storage approach;
select at least one alternative distributed storage and task execution unit in accordance with the foster storage approach;
generate at least one foster encoded data slice corresponding to the at least one of the plurality of encoded data slices; and
send the at least one foster encoded data slice to the at least one alternative distributed storage and task execution unit.

8. The DST processing unit of claim 7 wherein, when the foster storage approach corresponds to the performance optimized mode, the at least one alternative distributed storage and task execution unit is located in at least one of the plurality of sites.

9. The DST processing unit of claim 7 wherein, when the foster storage approach corresponds to the reliability optimized mode, the at least one alternative distributed storage and task execution unit is located in at least one alternative site that is disassociated from the plurality of sites.

10. The DST processing unit of claim 7 wherein the at least one module, when operable within a computing device, further causes the computing device to:
update slice location information corresponding to the data segment of the input data when the at least one foster encoded data slice is successfully stored in the at least one alternative distributed storage and task execution unit.

11. The DST processing unit of claim 7 wherein detecting a storage failure corresponding to at least one of the plurality of encoded data slices includes at least one of: detecting at least one device failure in the at least one of the plurality of the distributed storage and task execution units; and detecting at least one communication failure to the at least one of the plurality of the distributed storage and task execution units.

12. The DST processing unit of claim 7 wherein the foster storage approach is determined based on at least one of: a predetermined mode selection; a vault identifier, a data type corresponding to the input data, an estimated time of storage of the input data, an estimated frequency of retrieval of the input data, a reliability requirement of the input data, and a retrieval performance requirement of the input data.

13. A non-transitory computer readable storage medium comprises:
at least one memory section that stores operational instructions that, when executed by one or more processing modules of one or more computing devices of a dispersed storage network (DSN), causes the one or more computing devices to:
encode a data segment of input data into a plurality of encoded data slices;
send the plurality of encoded data slices to a plurality of distributed storage and task execution units for storage, the plurality of distributed storage and task execution units being located at a plurality of sites;
detect a storage failure corresponding to at least one of the plurality of encoded data slices corresponding to at least one of the plurality of the distributed storage and task execution units;

determine a performance optimized mode or a reliability optimized mode as a foster storage approach;

select at least one alternative distributed storage and task execution unit in accordance with the foster storage approach;

generate at least one foster encoded data slice corresponding to the at least one of the plurality of encoded data slices; and send the at least one foster encoded data slice to the at least one alternative distributed storage and task execution unit.

14. The non-transitory computer readable storage medium of claim 13 wherein, when the foster storage approach corresponds to the performance optimized mode, the at least one alternative distributed storage and task execution unit is located in at least one of the plurality of sites.

15. The non-transitory computer readable storage medium of claim 13 wherein, when the foster storage approach corresponds to the reliability optimized mode, the at least one alternative distributed storage and task execution unit is located in at least one alternative site that is disassociated from the plurality of sites.

16. The non-transitory computer readable storage medium of claim 13 wherein detecting a storage failure corresponding to at least one of the plurality of encoded data slices includes at least one of: detecting at least one device failure in the at least one of the plurality of the distributed storage and task execution units; and detecting at least one communication failure to the at least one of the plurality of the distributed storage and task execution units.

17. The non-transitory computer readable storage medium of claim 13 wherein the foster storage approach is determined based on at least one of: a predetermined mode selection; a vault identifier, a data type corresponding to the input data, an estimated time of storage of the input data, an estimated frequency of retrieval of the input data, a reliability requirement of the input data, and a retrieval performance requirement of the input data.

* * * * *